(12) United States Patent
Okumura

(10) Patent No.: US 7,180,896 B1
(45) Date of Patent: Feb. 20, 2007

(54) METHOD AND SYSTEM FOR PACKET RETRANSMISSION

(75) Inventor: Seiji Okumura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 1053 days.

(21) Appl. No.: 10/069,246

(22) PCT Filed: Jun. 23, 2000

(86) PCT No.: PCT/JP00/04154

§ 371 (c)(1),
(2), (4) Date: Feb. 22, 2002

(87) PCT Pub. No.: WO01/99355

PCT Pub. Date: Dec. 27, 2001

(51) Int. Cl.
H04L 12/56 (2006.01)

(52) U.S. Cl. ...................................... 370/394

(58) Field of Classification Search ............... None
See application file for complete search history.

(56) References Cited

U.S. PATENT DOCUMENTS 5,222,061 A * 6/1993 Doshi et al. ............... 370/394

(Continued)

FOREIGN PATENT DOCUMENTS

JP        59-178831 A      10/1984

(Continued)

OTHER PUBLICATIONS

Audio/Video Transport Working Group, Internet Draft draft-miyazaki-avt-rtp-selret-00.txt, Mar. 1, 2000, Akihiro Miyazaki et al., "RTP Payload Type Format to Enable Selective Retransmissioins".

(Continued)

Primary Examiner—Doris H. To
Assistant Examiner—Robert W. Wilson
(74) Attorney, Agent, or Firm—Birch, Stewart, Kolasch & Birch, LLP

(57) ABSTRACT

In a packet retransmission system for retransmitting a packet where a sequence number is added between the transmission apparatus and the reception apparatus at a loss of the packet in packet transmission, a transmission apparatus for transmitting the packet, a reception apparatus connected to the transmission apparatus through a network, and a requestor (application) connected to the reception apparatus are provided. The transmission apparatus includes a retransmission buffer for storing the packet having been transmitted to the reception apparatus, retransmission-request receiving means for identifying the sequence number and the largest sequence number in a retransmission-request packet received from the reception apparatus and notifying the sequence number and the largest sequence number, retransmission packet detecting means for detecting a packet to be retransmitted based on the notified sequence number, and retransmission means for retransmitting the packet to be retransmitted to the reception apparatus. The reception apparatus includes a reception buffer for storing the packet received from the transmission apparatus, receiving means for storing the packet received from the transmission apparatus in the reception buffer with sorting the packet in order of the sequence number, packet loss detecting means for detecting a packet loss, retransmission sequence number adding means for instructing to add the sequence number of the detected lost packet to a retransmission-request list, retransmission-request list managing means for adding the sequence number to the retransmission-request list based on the instruction to add, retransmission-request transmitting means for putting the sequence number stored in the retransmission-request list, in a retransmission-request packet and sending the retransmission-request packet to the transmission apparatus, and packet providing means for providing the packet in the reception buffer to the requestor.

54 Claims, 20 Drawing Sheets

U.S. PATENT DOCUMENTS 6,587,985 B1 * 7/2003 Fukushima et al. ......... 714/748
6,732,313 B2 * 5/2004 Fukushima et al. ......... 714/748

FOREIGN PATENT DOCUMENTS

| JP | 60-106250 | 6/1985 |
|---|---|---|
| JP | 3-237829 A | 10/1991 |
| JP | 08-331179 | 12/1996 |
| JP | 9-214507 A | 8/1997 |
| JP | 10-70523 A | 3/1998 |
| JP | 10-215294 A | 8/1998 |
| JP | 11-284657 A | 10/1999 |

OTHER PUBLICATIONS

Audio/Video Transport Working Group, Internet Draft draft-miyazaki-avt-rtp-selret-01.txt, (Jul. 14, 2000), Akihiro Miyazaki et al., "RTP Payload Type Format to Enable Selective Retransmissioins".

* cited by examiner

Fig. 8

Nint = 8                    RECEPTION BUFFER

| SEQUENCE NO. | ... | 7 | 8 | 9 | 10 | 12 | 15 | 16 | 18 | 19 | 22 | 23 | 24 | 25 | 26 | ... |
|---|---|---|---|---|---|---|---|---|---|---|---|---|---|---|---|---|

801, 802

Nth PACKET LOSS DETECTING MEANS:

| FSN | 8 | 8 | 8 | 8 | 8 | 8 | | | | | | | |
|---|---|---|---|---|---|---|---|---|---|---|---|---|---|
| Ncur | 16 | 0 | 1 | 2 | 4 | 7 | 8 | | | | | | |
| I | 0 | 0 | 1 | 2 | 4 | 7 | 8 | | | | | | |
| Loss | 0 | 0 | 0 | 0 | 1 | 3 | | | | | | | |
| SN list | □ | □ | □ | □ | [11] | [11,13,14] | | | | | | | |

RESULT OF Nth PACKET LOSS DETECTING MEANS : THE NUMBER OF LOST PACKETS IS 3
SEQUENCE NO. OF LOST PACKETS ARE [11, 13, 14]

803

(N + 1)th PACKET LOSS DETECTING MEANS:

| FSN | | | | | | | 16 | 16 | 16 | 16 | 16 | 16 | | |
|---|---|---|---|---|---|---|---|---|---|---|---|---|---|---|
| Ncur | | | | | | | 24 | 24 | 24 | 24 | 24 | 24 | 8 | |
| I | | | | | | | 0 | 2 | 3 | 6 | 7 | 8 | | |
| Loss | | | | | | | 0 | 1 | 1 | 3 | 3 | 3 | | |
| SN list | | | | | | | □ | [17] | [17] | [17,20,21] | [17,20,21] | | | |

RESULT OF (N + 1)th PACKET LOSS DETECTING MEANS : THE NUMBER OF LOST PACKETS IS 3
SEQUENCE NO. OF LOST PACKETS ARE [17, 20, 21]

Fig. 16

| GENERAL SEQ.NO. | ... | 8 | 9 | 10 | 12 | 15 | 16 | 18 | 19 | 22 | 23 | 24 | 25 | 26 | ... |
|---|---|---|---|---|---|---|---|---|---|---|---|---|---|---|---|
| PRIORITY SEQ.NO. | ... | 4 | 4 | 5 | 7 | 7 | 8 | 8 | 9 | 10 | 11 | 11 | 11 | 12 | ... |

Nint = 8

RECEPTION BUFFER — 1601

Nth PACKET LOSS DETECTING MEANS — 1602

| FSN | 8 | 8 | 8 | 8 | 8 | 16 | | | | | | | | |
|---|---|---|---|---|---|---|---|---|---|---|---|---|---|---|
| Ncur | 16 | 16 | 16 | 16 | 16 | 16 | | | | | | | | |
| I | 0 | 1 | 2 | 4 | 7 | 8 | | | | | | | | |
| MPSN | 4 | 4 | 4 | 5 | 7 | | | | | | | | | |
| Loss | 0 | 0 | 0 | 1 | 3 | | | | | | | | | |
| SN list | □ | □ | □ | [11] | [11] | | | | | | | | | |

RESULT OF Nth PACKET LOSS DETECTING MEANS : THE NUMBER OF LOST PACKETS IS 3
SEQ. NO. OF PACKET TO BE REQUESTED RETRANSMISSION [11]

(N+1)th PACKET LOSS DETECTING MEANS — 1603

| FSN | 16 | 16 | 16 | 16 | 16 | 16 | 16 | 16 | |
|---|---|---|---|---|---|---|---|---|---|
| Ncur | 24 | 24 | 24 | 24 | 24 | 24 | 24 | 24 | |
| I | 0 | 2 | 3 | 6 | 7 | 8 | | | |
| MPSN | 7 | 8 | 8 | 9 | 10 | | | | |
| Loss | 0 | 1 | 1 | 3 | 3 | | | | |
| SN list | □ | □ | □ | [20,21] | [20,21] | | | | |

RESULT OF (N+1)th PACKET LOSS DETECTING MEANS : THE NUMBER OF LOST PACKETS IS 3
SEQ. NO. OF PACKET TO BE REQUESTED RETRANSMISSION [20,21]

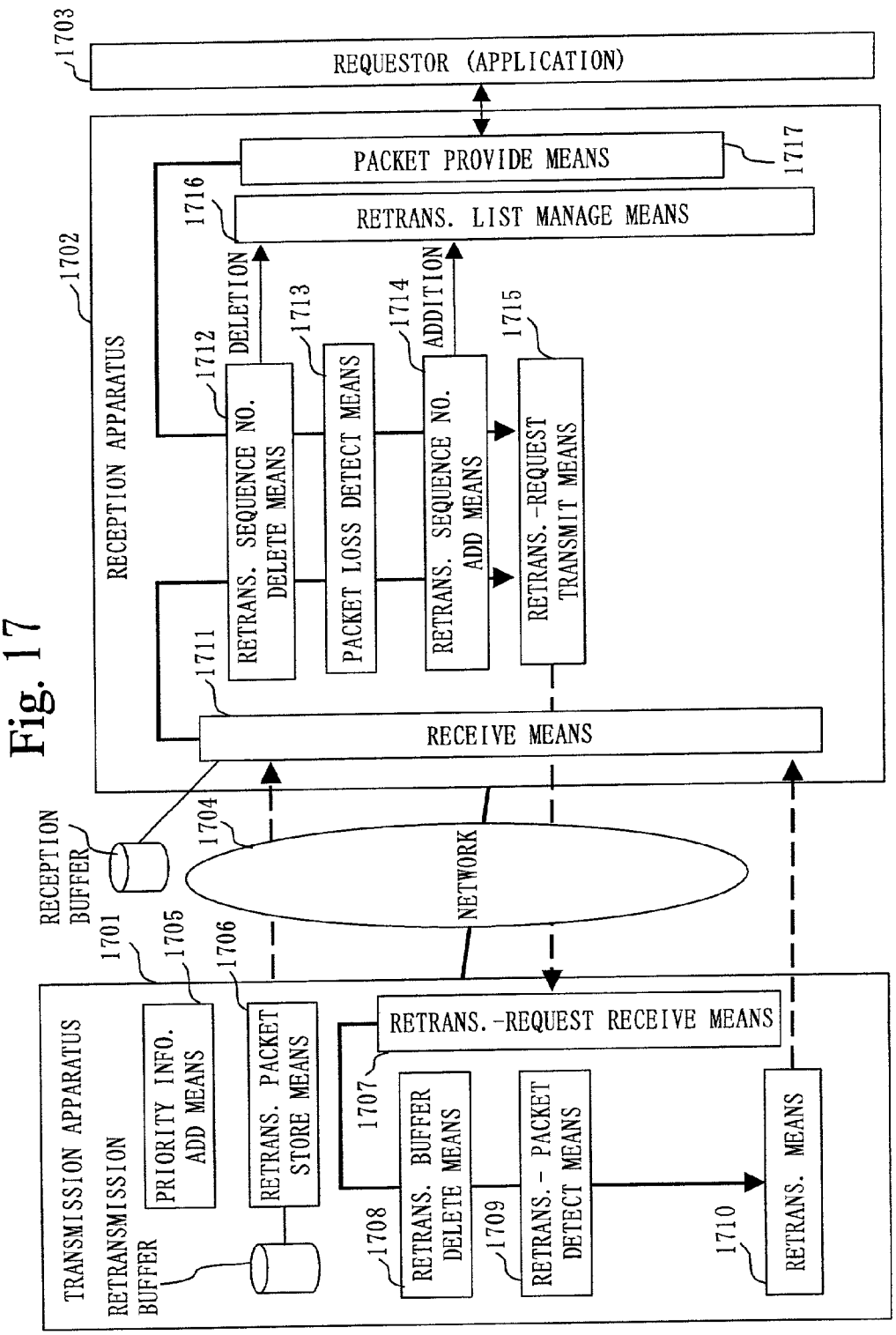

| SEQUENCE NO. | RETRANSMISSION | PRIORITY INFO. | SEQUENCE NO. | RETRANSMISSION | PRIORITY INFO. |
|---|---|---|---|---|---|
| 1 |  |  | 9 |  |  |
| 2 | ● |  | 10 |  |  |
| 3 |  |  | 11 | ● |  |
| 4 | ● | 00001001 (~1803) | 12 | ● |  |
| 5 | ● |  | 13 | ● | 10010011 (~1805) |
| 6 |  |  | 14 |  |  |
| 7 |  |  | 15 | ● |  |
| 8 | ● | 10011001 (~1804) | 16 |  | 00111010 (~1806) |

EX. 2

| SEQUENCE NO. | RETRANSMISSION | PRIORITY INFO. | SEQUENCE NO. | RETRANSMISSION | PRIORITY INFO. |
|---|---|---|---|---|---|
| 1 | ● | 10011001 (~1807) | 9 |  | 00111010 (~1809) |
| 2 |  |  | 10 |  |  |
| 3 |  |  | 11 | ● |  |
| 4 | ● | 10010011 (~1808) | 12 | ● |  |
| 5 | ● |  | 13 | ● | 10100000 (~1810) |
| 6 |  |  | 14 |  |  |
| 7 |  |  | 15 | ● |  |
| 8 | ● |  | 16 |  |  |

Fig. 20

PRIORITY INFO. TABLE (2001)

| SEQ. NO. | ... | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | ... |
|---|---|---|---|---|---|---|---|---|---|---|---|---|---|---|---|---|---|---|---|---|---|---|---|---|---|
| PRIORITY INFO. | ... | 0 | 1 | 0 | 1 | 1 | 1 | 0 | 0 | 0 | 1 | 0 | 0 | 1 | 0 | 1 | 0 | 1 | 0 | 0 | 1 | 0 | 0 | 1 | ... |

RECEPTION BUFFER (2002)

| SEQUENCE NO. | ... | 8 | 9 | 10 | 12 | 15 | 16 | 18 | 19 | 22 | 23 | 24 | 25 | 26 | ... |

Nth PACKET LOSS DETECTING MEANS (2003)
Nint = 8

| FSN | 8 | 8 | 8 | 8 | 8 | 8 | | | | | | | | | |
|---|---|---|---|---|---|---|---|---|---|---|---|---|---|---|---|
| Ncur | 16 | 16 | 16 | 16 | 16 | 16 | | | | | | | | | |
| I | 0 | 1 | 2 | 4 | 7 | 8 | | | | | | | | | |
| Loss | 0 | 0 | 0 | 1 | 3 | 3 | | | | | | | | | |
| SN list | □ | □ | □ | [11] | [11] | [11] | | | | | | | | | |

RESULT OF Nth PACKET LOSS DETECTING MEANS : THE NUMBER OF LOST PACKETS IS 3
SEQ. NO. OF PACKET TO BE REQUESTED RETRANSMISSION [11]

(N+1)th PACKET LOSS DETECTING MEANS (2004)
Nint = 8

| FSN | 16 | 16 | 16 | 16 | 16 | 16 | 16 | 16 | | | | | | | |
|---|---|---|---|---|---|---|---|---|---|---|---|---|---|---|---|
| Ncur | 24 | 24 | 24 | 24 | 24 | 24 | 24 | 24 | | | | | | | |
| I | 0 | 0 | 2 | 3 | 6 | 7 | 8 | | | | | | | | |
| Loss | 0 | 1 | 1 | 3 | 3 | 3 | | | | | | | | | |
| SN list | □ | □ | [21] | [21] | [21] | [21] | | | | | | | | | |

RESULT OF (N+1)th PACKET LOSS DETECTING MEANS : THE NUMBER OF LOST PACKETS IS 3
SEQ. NO. OF PACKET TO BE REQUESTED RETRANSMISSION [21]

METHOD AND SYSTEM FOR PACKET RETRANSMISSION

This application is the national phase under 35 U.S.C. § 371 of PCT International Application No. PCT/JP00/04154 which has an International filing date of Jun. 23, 2000, which designated the United States of America and was published in Japanese.

TECHNICAL FIELD

The present invention relates to a server and a client where the service of streaming delivery of real-time data, such as video and a speech, is performed via the Internet or wireless communications network. The present invention also relates to a packet retransmission system and a packet retransmission method for performing high reliability communications, with making much of real time at a packet loss, in the transmission of real-time data.

BACKGROUND ART

Generally, packets sent on the network are often lost because of an overflow of node (router) on the network or a bit error in the wireless space. To be tolerant of such packet loss, methods of (1) no action (2) error correction or compensation (3) retransmission can be considered.

Relating to the method of (1) "no action", a block noise may be generated because of the packet loss in the video stream, a sound breaking off may be generated in the audio stream, and other media data may not be normally reproduced.

Relating to the method of (2) "error correction or compensation", lost data may be compensated based on frame data before and after the lost data and decoded at the time of video decoding, or it is possible to add in advance a redundant packet necessary for compensating.

Relating to the method of (3) "retransmission", data communications in which real time is not requested generally applies this method. For instance, in TCP protocol which is a protocol of high reliability, an ACK packet is sent to the transmission resource as a confirmation of receiving, and when the ACK packet does not return to the transmission resource because it is judged that a packet has not been received, the packet is retransmitted. However, the retransmission may take time because it is needed to wait for a retransmission packet, or the congestion may happen when an excess of the ACK packets or an increase of the retransmission packets oppresses the band.

On the other hand, according to the multimedia streaming delivery service differing from the data download, data can be reproduced even when all the data has not reached. Therefore, it is possible to request to retransmit only an important data packet or to retransmit such data packet in the case of packet loss. As only the important packet is retransmitted, the band can be effectively utilized and the real time characteristic can be enhanced because it is not needed to wait for retransmission of unnecessary data packet.

As examples of the retransmission control system for achieving the above objects, the one disclosed in the Unexamined Japanese Patent Publication No. 9-214507 (wireless communications method) and the one disclosed in the Unexamined Japanese Patent Publication No. 11-284657 (retransmission control system) are well-known.

The retransmission system described in the Unexamined Japanese Patent Publication No. 9-214507 is a wireless communications method, where the real-time communications can be performed with guaranteeing the quality as much as possible. When a packet is lost, retransmission is tried several times. If the retransmission can not reach after the several trials, a packet of a low priority is discarded in order to perform the retransmission. The retransmission system described in the Unexamined Japanese Patent Publication No. 11-284657 is a retransmission control system of connection establishing type communication, where a packet of communications having a low priority is suppressed at the congestion. In this system, a limitation in the number of times of retransmission to each connection is set up, and the number of times of retransmission is decreased by one when retransmission is performed once. If the number of times of retransmission becomes zero, the communication to the connection is halted for the purpose of securing a band for a high priority connection as much as possible.

RTP (Real-Time Transport Protocol), being a protocol for data transmission in high real time such as the streaming delivery, is used as a standard protocol for Internet Standardization such as RFC 1889. The RTP is a protocol for packet transmission of packet where a sequence number and a time stamp are added to a packet. In the RTP, a retransmission is not performed.

As a proposal for RTP extension to the retransmission function of the RTP, the Internet Draft (draft-miyazaki-avt-rtp-selret-oo.txt) titled "RTP Payload Type Format to Enable Selective Retransmissions" has been introduced. In this proposal for extending the retransmission function of the RTP, a sequence number, differing from the sequence number of the RTP, to be added to only a packet having a high priority for retransmission is disclosed.

Namely, in the system for delivering real-time data such as video or speech, if no measures is taken when a packet is lost it has a problem that the quality of reproduced contents is lowered because of data lacking.

In addition, the method of performing error correction or compensation has a problem that the load at the reception side is increased or the congestion is further deteriorated by redundant data used for compensating.

The method of performing retransmission, as the case of TCP protocol, has a problem that the retransmission takes time because it is needed to wait for a retransmission packet, or congestion may happen when an excess of the ACK packets or an increase of retransmission packets oppresses the band.

The method of retransmitting only the packet of a high priority has a problem that a useless retransmission process may be performed when the reception side requests to retransmit a packet of a low priority, because the reception side waits for the packet of a low priority being retransmitted or performs retransmission requests several times though there is a possibility that the packet of low priority requested by the reception side has already been discarded at the transmission side.

The packet transmission according to the proposal for extending the retransmission function of the RTP, in which a general sequence number is added to each of all the packets and a priority sequence number is added to only a packet being important and being judged to be retransmitted at the packet loss, has an advantage that the reception side can grasp the priorities. However, the packet transmission according to the proposal has a problem that it is impossible to recognize accurate priorities when consecutive packets are lost, which makes it necessary to request to retransmit all the consecutive packets being lost. For instance, FIG. 16 shows a packet loss example in the transmission of packets to which general sequence numbers and priority sequence numbers are added. In FIG. 16, the general sequence numbers 20 and 21 are consecutively lost and the priority sequence number is increased by one between the general sequence numbers 19 and 22. Therefore, it is impossible to judge which of the general sequence numbers 20 and 21 has a high priority to be retransmitted. Consequently, it is necessary to request to retransmit both the general sequence numbers 20 and 21.

One of the objects of the present invention is to solve the above-stated problems and to provide a packet retransmission system and a packet transfer system where the waste of network load generated in the retransmission process can be minimized by way of retransmitting only important packets of high priority, and the transmission capacity for transmitting packets of high priority can be secured even at the network congestion.

DISCLOSURE OF THE INVENTION

A packet retransmission system according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the transmission apparatus comprises:
   a retransmission buffer for storing the packet having been transmitted to the reception apparatus;
   retransmission-request receiving means for identifying the sequence number and a largest (latest) sequence number provided to the request application unit, in a retransmission-request packet received from the reception apparatus, and notifying the sequence number and the largest (latest) sequence number;
   retransmission packet detecting means for detecting whether a notified sequence number exists in the retransmission buffer; and
   retransmission means for retransmitting all packets detected by the retransmission packet detecting means to the reception apparatus.

A packet retransmission system according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the reception apparatus comprises:
   a reception buffer for storing the packet received from the transmission apparatus;
   receiving means for storing the packet received from the transmission apparatus in the reception buffer, with sorting the packet in order of the sequence number;
   packet loss detecting means for detecting a loss of the packet;
   retransmission sequence number adding means for sending an instruction to add the sequence number of a lost packet detected by the packet loss detecting means to a retransmission-request list;
   retransmission-request list managing means for adding the sequence number to the retransmission-request list based on the instruction to add;
   retransmission-request transmitting means for putting the sequence number stored in the retransmission-request list, in a retransmission-request packet and sending the retransmission-request packet to the transmission apparatus; and
   packet providing means for providing the packet in the reception buffer to the request application unit.

A packet retransmission system according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the transmission apparatus comprises:
   a retransmission buffer for storing the packet having been transmitted to the reception apparatus;
   retransmission-request receiving means for identifying the sequence number and a largest (latest) sequence number provided to the request application unit, in a retransmission-request packet received from the reception apparatus, and notifying the sequence number and the largest (latest) sequence number;
   retransmission packet detecting means for detecting whether a notified sequence number exists in the retransmission buffer; and
   retransmission means for retransmitting all packets detected by the retransmission packet detecting means to the reception apparatus, the reception apparatus comprises:
   a reception buffer for storing the packet received from the transmission apparatus;
   receiving means for storing the packet received from the transmission apparatus in the reception buffer, with sorting the packet in order of the sequence number;
   a packet loss detecting means for detecting the loss of the packet;
   retransmission sequence number adding means for sending an instruction to add the sequence number of a lost packet detected by the packet loss detecting means to a retransmission-request list;
   retransmission-request list managing means for adding the sequence number to the retransmission-request list based on the instruction to add;
   retransmission-request transmitting means for putting the sequence number stored in the retransmission-request list, in the retransmission-request packet and sending the retransmission-request packet to the transmission apparatus; and
   packet providing means for providing the packet in the reception buffer to the request application unit.

A packet retransmission system according to the present invention, the transmission apparatus includes:
   retransmission packet storing means for storing one of a specific packet and a packet to be retransmitted at packet loss, in the retransmission buffer, and
   retransmission means for retransmitting one of the specific packet and the packet to be retransmitted at packet loss, the reception apparatus includes:
   receiving means for receiving one of the specific packet and the packet to be retransmitted at packet loss, and storing one of the specific packet and the packet to be retransmitted at packet loss, with sorting in order of the sequence number, in the reception buffer.

A packet retransmission system according to the present invention, the reception apparatus includes retransmission-request list managing means for creating a retransmission-request list which stores a sequence number of a packet currently being requested to retransmit and a sequence number of a packet to be requested retransmission at a next retransmission request time, for adding and deleting the sequence number, and for switching a status of the packet of the sequence number stored in the retransmission-request list to be a retransmission request status.

A packet retransmission system according to the present invention, the reception apparatus includes:

packet loss detecting means for detecting a sequence number of a lost packet based on sequence number inconsistency of packets in the reception buffer, at packet receiving intervals depending upon a number of times of receiving packets and a receiving time, retransmission sequence number adding means for sending an instruction to add the sequence number of the lost packet detected by the packet loss detecting means into the retransmission-request list, to the retransmission-request list managing means, and retransmission-request notifying means for sending an instruction to make a status of the retransmission-request list "READY" indicating a waiting status for receiving a retransmission packet, to the retransmission-request list managing means.

A packet retransmission system according to the present invention, the reception apparatus includes retransmission-request transmitting means for creating one retransmission-request packet including at least one sequence number of packet to be retransmitted existing in the retransmission-request list, and transmitting the retransmission-request packet to the transmission apparatus, the transmission apparatus includes:

retransmission-request receiving means for extracting the sequence number in the retransmission-request packet received from the reception apparatus and notifying the sequence number;

retransmission packet detecting means for detecting whether the packet of notified sequence number exists in the retransmission buffer;

retransmission-request responding means for putting sequence numbers of all packets detected by the retransmission packet detecting means in one retransmission-request response packet and transmitting the retransmission-request response packet to the reception apparatus; and retransmission means for retransmitting all the packets detected by the retransmission packet detecting means to the reception apparatus.

A packet retransmission system according to the present invention, the reception apparatus includes retransmission-request transmitting means for creating a retransmission-request packet including the largest (latest) sequence number of packet provided to the request application unit by the packet providing means, and transmitting the retransmission-request packet to the transmission apparatus, the transmission apparatus includes:

retransmission-request receiving means for extracting the largest sequence number in the retransmission-request packet received from the reception apparatus and notifying the largest sequence number; and retransmission buffer deleting means for deleting packets of sequence numbers smaller than the largest sequence number notified by the retransmission-request receiving means, from the retransmission buffer.

A packet retransmission system according to the present invention, the reception apparatus includes retransmission-request transmitting means for creating a retransmission-request packet including at least one sequence number of packet to be retransmitted existing in the retransmission-request list and the largest (latest) sequence number of packet provided to the request application unit by the packet providing means, and transmitting the retransmission-request packet to the transmission apparatus, the transmission apparatus includes:

retransmission-request receiving means for extracting the sequence number and the largest sequence number in the retransmission-request packet received from the reception apparatus, and notifying the sequence number and the largest sequence number, and retransmission packet detecting means for detecting whether the packet of notified sequence number means exists in the retransmission buffer, retransmission buffer deleting means for deleting packets of sequence numbers smaller than the largest sequence number notified by the retransmission-request receiving means, from the retransmission buffer;

retransmission-request responding means for putting sequence numbers of all packets detected by the retransmission packet detecting means in one retransmission-request response packet and transmitting the retransmission-request response packet to the reception apparatus; and retransmission means for retransmitting packets detected by the retransmission packet detecting means to the reception apparatus.

A packet retransmission system according to the present invention, the reception apparatus includes:

retransmission-request response receiving means for receiving a retransmission-request response packet including the sequence number of the packet to be retransmitted, from the transmission apparatus; and retransmission sequence number deleting means for extracting the sequence number from the retransmission-request response packet, and sending an instruction to delete a same sequence number as an extracted sequence number from the retransmission-request list, to the retransmission-request list managing means.

A packet retransmission system according to the present invention, the reception apparatus includes:

retransmission-request response receiving means for receiving a retransmission-request response packet including the sequence number of the packet to be retransmitted, from the transmission apparatus;

retransmission sequence deleting means for extracting the sequence number from the retransmission-request response packet, and sending an instruction to delete a same sequence number as an extracted sequence number from the retransmission-request list, to the retransmission-request list managing means; and retransmission-request response notifying means for sending an instruction to make a status of the retransmission-request list "ACTIVE" to the retransmission-request list managing means, where the ACTIVE indicates a status that no packet will be retransmitted from the transmission apparatus though retransmission of the packet whose sequence number is in the retransmission-request list has been requested.

A packet retransmission system according to the present invention, the reception apparatus includes:
packet providing means for providing payload (data) of at least one packet out of packets stored in the reception buffer to the request application unit,
deleting sequence numbers smaller than a sequence number of the packet, from the retransmission-request list,
providing payload of packet of next sequence number (N+1) coming after a sequence number (N being a natural number) of a packet provided last time, within a specific time, and
when the packet of next sequence number (N+1) does not exist in the reception buffer and is not inserted into the reception buffer within the specific time, notifying the request application unit of a loss of the packet to be provided.

A packet retransmission system according to the present invention, the reception apparatus includes
packet providing means, when a packet to be provided within a specific time does not exist in the reception buffer, for performing a packet loss detection and a retransmission-request transmission at least once within the specific time.

A packet retransmission system according to the present invention, the reception apparatus includes
packet providing means, when a status of the retransmission-request list is ACTIVE indicating a status that no packet will be retransmitted from the transmission apparatus though retransmission of the packet whose sequence number is in the retransmission-request list has been requested, and when a sequence number of a packet to be provided to the request application unit exists in the retransmission-request list, for judging that no packet will be retransmitted even if retransmission-request is performed, and notifying a requester, without waiting for the specific time having passed, that the packet to be provided is lost.

A packet retransmission system according to the present invention, for the packet transmission between the transmission apparatus and the reception apparatus at the loss of the packet, where a general sequence number is added to each of all packets and a priority sequence number is added to one of a specific packet and a packet to be retransmitted at packet loss, the transmission apparatus includes:
retransmission packet storing means for storing one of the specific packet and the packet to be retransmitted at packet loss, in the retransmission buffer; and
retransmission means for retransmitting one of the specific packet and the packet to be retransmitted at packet loss, the reception apparatus includes
receiving means for receiving one of the specific packet and the packet to be retransmitted at packet loss, and storing one of the specific packet and the packet to be retransmitted at packet loss, with sorting in order of the general sequence number, in the reception buffer.

A packet retransmission system according to the present invention, the reception apparatus includes
retransmission list managing means for creating a retransmission list which stores the general sequence number of packet to be retransmitted, and adding and deleting the general sequence number.

A packet retransmission system according to the present invention, the reception apparatus includes:
retransmission sequence number deleting means, when the general sequence number of packet received by the receiving means exists in a retransmission list, for sending an instruction to delete the general sequence number from the retransmission list to retransmission list managing means;
packet loss detecting means for detecting a general sequence number of a specific packet of high priority which has been lost and the general sequence number of the packet to be retransmitted at packet loss, which has been lost, based on the general sequence number and the priority sequence number of the packet in the reception buffer and of a received packet, at packet receiving intervals depending upon a number of times of receiving packets and a receiving time and at every loss of packet of high priority found based on inconsistency of priority sequence numbers, and
retransmission sequence number adding means for sending an instruction to add the general sequence number of the specific packet of high priority whose loss is detected by the packet loss detecting means and the general sequence number of the packet to be retransmitted at packet loss, whose loss is detected by the packet loss detecting means, into the retransmission list, to the retransmission list managing means.

A packet retransmission system according to the present invention, the reception apparatus includes
retransmission-request transmitting means for creating a retransmission-request packet including at least one general sequence number of packet existing in the retransmission list, and transmitting the retransmission-request packet to the transmission apparatus, the transmission apparatus includes:
retransmission-request receiving means for extracting the general sequence number in the retransmission-request packet received from the reception apparatus and notifying the general sequence number,
retransmission packet detecting means for detecting whether a packet of notified general sequence number exists in the retransmission buffer, and
retransmission means for retransmitting the packet of the general sequence number detected by the retransmission packet detecting means to the reception apparatus.

A packet retransmission system according to the present invention, the reception apparatus includes
retransmission-request transmitting means for creating a retransmission-request packet including a largest (latest) general sequence number of packet provided to the request application unit by the packet providing means, and transmitting the retransmission-request packet to the transmission apparatus, the transmission apparatus includes:
retransmission-request receiving means for extracting the largest general sequence number in the retransmission-request packet received from the reception apparatus, and notifying the largest general sequence number; and
retransmission buffer deleting means for deleting packets of general sequence numbers smaller than the largest general sequence number notified by the retransmission-request receiving means, from the retransmission buffer.

A packet retransmission system according to the present invention, the reception apparatus includes
retransmission-request transmitting means for creating a retransmission-request packet including at least one general sequence number in the retransmission list and a largest (latest) general sequence number of packet provided to the request application unit by the packet providing means, and transmitting the retransmission-request packet to the transmission apparatus, the transmission apparatus includes:
retransmission-request receiving means for extracting the general sequence number and the largest general sequence number in the retransmission-request packet received from the reception apparatus and notifying the general sequence number and the largest general sequence number,
retransmission buffer deleting means for deleting packets of general sequence numbers smaller than the largest general sequence number notified by the retransmission-request receiving means, from the retransmission buffer,
retransmission packet detecting means for detecting whether the packet of notified general sequence number exists in the retransmission buffer, and
retransmission means for retransmitting packets of the general sequence numbers detected by the retransmission packet detecting means, to the reception apparatus, A packet retransmission system according to the present invention, the reception apparatus includes:
packet providing means for providing payload (data) of at least one packet out of packets stored in the reception buffer to the request application unit,
deleting general sequence numbers smaller than a general sequence number of the packet, from the retransmission-request list,
providing payload of packet of next general sequence number (N+1) coming after a general sequence number (N being a natural number) of a packet provided last time, within a specific time, and
when the packet of next general sequence number (N+1) does not exist in the reception buffer and is not inserted into the reception buffer within the specific time, notifying the request application unit of a loss of the packet to be provided.

A packet retransmission system according to the present invention, the reception apparatus includes
packet providing means, when a packet to be provided within a specific time does not exist in the reception buffer, for performing a packet loss detection and a retransmission-request transmission several times within the specific time.

A packet retransmission system according to the present invention, the reception apparatus includes
packet providing means, when a general sequence number of a packet to be provided does not exist in the retransmission list, for notifying the request application unit that the packet to be provided is lost, without waiting for the specific time having passed.

A packet retransmission system according to the present invention, the transmission apparatus includes
priority information adding means for adding priority information to an optional packet p coming every m packets (m≦n, m and n are natural numbers), wherein the priority information is information about packets of high priority and packets to be retransmitted at a packet loss, which are located in a range of n (n being a natural number) packets from the packet p, and for deciding values of m and n depending upon a network congestion status, the reception apparatus includes
packet loss detecting means for detecting a sequence number of a packet of high priority which has been lost and a sequence number of packet to be retransmitted at packet loss which has been lost, based on a packet in the reception buffer and sequence number of a received packet and on the priority information, at packet receiving intervals depending upon a number of times of receiving packets and a receiving time and at every loss of important packet found based on inconsistency of sequence numbers.

A packet retransmission method according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the transmission apparatus comprises:
a retransmission buffer for storing the packet having been transmitted to the reception apparatus;
a retransmission-request receiving step of identifying the sequence number and a largest (latest) sequence number provided to the request application unit, in a retransmission-request packet received from the reception apparatus, and notifying the sequence number and the largest (latest) sequence number;
a retransmission packet detecting step of detecting whether a notified sequence number exists in the retransmission buffer; and
a retransmitting step of retransmitting all packets detected by the retransmission packet detecting step to the reception apparatus.

A packet retransmission method according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the reception apparatus comprises:
a reception buffer for storing the packet received from the transmission apparatus;
a receiving step of storing the packet received from the transmission apparatus in the reception buffer, with sorting the packet in order of the sequence number;
a packet loss detecting step of detecting a loss of the packet;
a retransmission sequence number adding step of sending an instruction to add the sequence number of a lost packet detected by the packet loss detecting step to a retransmission-request list;
a retransmission-request list managing step of adding the sequence number to the retransmission-request list based on the instruction to add;
a retransmission-request transmitting step of putting the sequence number stored in the retransmission-request list, in a retransmission-request packet and sending the retransmission-request packet to the transmission step; and a packet providing step of providing the packet in the reception buffer to the request application unit.

A packet retransmission method according to the present invention, which includes a transmission apparatus for transmitting a packet where a sequence number is added, a reception apparatus connected to the transmission apparatus through a network, and a request application unit connected to the reception apparatus, for retransmitting the packet where the sequence number is added between the transmission apparatus and the reception apparatus at a loss of the packet in packet transmission, the transmission apparatus comprises:
  a retransmission buffer for storing the packet having been transmitted to the reception apparatus;
  a retransmission-request receiving step of identifying the sequence number and a largest (latest) sequence number provided to the request application unit, in a retransmission-request packet received from the reception apparatus, and notifying the sequence number and the largest (latest) sequence number;
  a retransmission packet detecting step of detecting whether a notified sequence number exists in the retransmission buffer; and
  a retransmitting step of retransmitting all packets detected by the retransmission packet detecting step to the reception apparatus, the reception apparatus comprises:
  a reception buffer for storing the packet received from the transmission apparatus;
  a receiving step of storing the packet received from the transmission apparatus in the reception buffer, with sorting the packet in order of the sequence number;
  a packet loss detecting step of detecting a loss of the packet;
  a retransmission sequence number adding step of sending an instruction to add the sequence number of a detected lost packet to a retransmission-request list;
  a retransmission-request list managing step of adding the sequence number to the retransmission-request list based on the instruction to add;
  a retransmission-request transmitting step of putting the sequence number stored in the retransmission-request list, in a retransmission-request packet and sending the retransmission-request packet to the transmission apparatus; and
  a packet providing step of providing the packet in the reception buffer to the request application unit.

A packet retransmission method according to the present invention, the transmission apparatus includes:
  a retransmission packet storing step of storing one of a specific packet and a packet to be retransmitted at packet loss, in the retransmission buffer, and
  a retransmitting step of retransmitting one of the specific packet and the packet to be retransmitted at packet loss, the reception apparatus includes:
  a receiving step of receiving one of the specific packet and the packet to be retransmitted at packet loss, and storing one of the specific packet and the packet to be retransmitted at packet loss, with sorting in order of the sequence number, in the reception buffer.

A packet retransmission method according to the present invention, the reception apparatus includes
  a retransmission-request list managing step of creating a retransmission-request list which stores a sequence number of a packet currently being requested to retransmit and a sequence number of a packet to be requested retransmission at a next retransmission request time, of adding and deleting the sequence number, and of switching a status of the packet of the sequence number stored in the retransmission-request list to be a retransmission request status.

A packet retransmission method according to the present invention, the reception apparatus includes:
  a packet loss detecting step of detecting a sequence number of a lost packet based on sequence number inconsistency of packets in the reception buffer, at packet receiving intervals depending upon a number of times of receiving packets and a receiving time;
  a retransmission sequence number adding step of sending an instruction to add the sequence number of the lost packet detected by the packet loss detecting step into the retransmission-request list, to the retransmission-request list managing step; and
  a retransmission-request notifying step of sending an instruction to make a status of the retransmission-request list "READY" indicating a waiting status for receiving a retransmission packet, to the retransmission-request list managing step.

A packet retransmission method according to the present invention, the reception apparatus includes
  a retransmission-request transmitting step of creating one retransmission-request packet including at least one sequence number of packet to be retransmitted existing in the retransmission-request list, and transmitting the retransmission-request packet to the transmission apparatus, the transmission apparatus includes:
  a retransmission-request receiving step of extracting the sequence number in the retransmission-request packet received from the reception apparatus and notifying the sequence number;
  a retransmission packet detecting step of detecting whether the packet of notified sequence number exists in the retransmission buffer;
  a retransmission-request responding step of putting sequence numbers of all packets detected by the retransmission packet detecting step in one retransmission-request response packet and transmitting the retransmission-request response packet to the reception apparatus; and
  a retransmitting step of retransmitting all the packets detected by the retransmission packet detecting step to the reception apparatus.

A packet retransmission method according to the present invention, the reception apparatus includes
  a retransmission-request transmitting step of creating a retransmission-request packet including the largest (latest) sequence number of packet provided to the request application unit by the packet providing step, and transmitting the retransmission-request packet to the transmission apparatus, the transmission apparatus includes:
  a retransmission-request receiving step of extracting the largest sequence number in the retransmission-request packet received from the reception apparatus and notifying the largest sequence number; and
  a retransmission buffer deleting step of deleting packets of sequence numbers smaller than the largest sequence number notified by the retransmission-request receiving step, from the retransmission buffer.

A packet retransmission method according to the present invention, the reception apparatus includes a retransmission-request transmitting step of creating a retransmission-request packet including at least one sequence number of packet to be retransmitted existing in the retransmission-request list and the largest (latest) sequence number of packet provided to the request application unit by the packet providing step, and transmitting the retransmission-request packet to the transmission apparatus, the transmission apparatus includes a retransmission-request receiving step of extracting the sequence number and the largest sequence number in the retransmission-request packet received from the reception apparatus, and notifying the sequence number and the largest sequence number;

a retransmission packet detecting step of detecting whether the packet of notified sequence number exists in the retransmission buffer;

a retransmission buffer deleting step of deleting packets of sequence numbers smaller than the largest sequence number notified by the retransmission-request receiving step, from the retransmission buffer;

a retransmission-request responding step of putting sequence numbers of all packets detected by the retransmission packet detecting step in one retransmission-request response packet and transmitting the retransmission-request response packet to the reception apparatus; and a retransmitting step of retransmitting packets detected by the retransmission packet detecting step to the reception apparatus.

A packet retransmission method according to the present invention, the reception apparatus includes:

a retransmission-request response receiving step of receiving a retransmission-request response packet including the sequence number of the packet to be retransmitted, from the transmission apparatus; and a retransmission sequence number deleting step of extracting the sequence number from the retransmission-request response packet, and sending an instruction to delete a same sequence number as an extracted sequence number from the retransmission-request list, to the retransmission-request list managing step.

A packet retransmission method according to the present invention, the reception apparatus includes:

a retransmission-request response receiving step of receiving a retransmission-request response packet including the sequence number of the packet to be retransmitted, from the transmission apparatus;

a retransmission sequence number deleting step of extracting the sequence number from the retransmission-request response packet, and sending an instruction to delete a same sequence number as an extracted sequence number from the retransmission-request list, to the retransmission-request list managing step; and a retransmission-request response notifying step of sending an instruction to make a status of the retransmission-request list "ACTIVE" to the retransmission-request list managing step, where the ACTIVE indicates a status that no packet will be retransmitted from the transmission apparatus though retransmission of the packet whose sequence number is in the retransmission-request list has been requested.

A packet retransmission method according to the present invention, the reception apparatus includes:

a packet providing step of providing payload (data) of at least one packet out of packets stored in the reception buffer to the request application unit, deleting sequence numbers smaller than a sequence number of the packet, from the retransmission-request list, providing payload of packet of next sequence number (N+1) coming after a sequence number (N being a natural number) of a packet provided last time, within a specific time, and when the packet of next sequence number (N+1) does not exist in the reception buffer and is not inserted into the reception buffer within the specific time, notifying the request application unit of a loss of the packet to be provided.

A packet retransmission method according to the present invention, the reception apparatus includes a packet providing step, when the packet to be provided within a specific time does not exist in the reception buffer, of performing a packet loss detection and a retransmission-request transmission at least once within the specific time.

A packet retransmission method according to the present invention, the reception apparatus includes a packet providing step, when a status of the retransmission-request list is ACTIVE indicating a status that no packet will be retransmitted from the transmission apparatus though retransmission of the packet whose sequence number is in the retransmission-request list has been requested, and when a sequence number of a packet to be provided to the request application unit exists in the retransmission-request list, of judging that no packet will be retransmitted even if retransmission-request is performed, and notifying a requestor, without waiting for the specific time having passed, that the packet to be provided is lost.

A packet retransmission method according to the present invention, for the packet transmission between the transmission apparatus and the reception apparatus at the loss of the packet, where a general sequence number is added to each of all packets and a priority sequence number is added to one of a specific packet and a packet to be retransmitted at packet loss, the transmission apparatus includes:

a retransmission packet storing step of storing one of the specific packet and the packet to be retransmitted at packet loss, in the retransmission buffer; and a retransmitting step of retransmitting one of the specific packet and the packet to be retransmitted at packet loss, the reception apparatus includes a receiving step of receiving one of the specific packet and the packet to be retransmitted at packet loss, and storing one of the specific packet and the packet to be retransmitted at packet loss, with sorting in order of the general sequence number, in the reception buffer.

A packet retransmission method according to the present invention, the reception apparatus includes a retransmission list managing step of creating a retransmission list which stores the general sequence number of packet to be retransmitted, and adding and deleting the general sequence number.

A packet retransmission method according to the present invention, the reception apparatus includes:

a retransmission sequence number deleting step, when the general sequence number of packet received by the receiving step exists in a retransmission list, of sending an instruction to delete the general sequence number from the retransmission list to retransmission list managing step;

a packet loss detecting step of detecting a general sequence number of a specific packet of high priority which has been lost and the general sequence number of the packet to be retransmitted at packet loss, which has been lost, based on the general sequence number and the priority sequence number of the packet in the reception buffer and of a received packet, at packet receiving intervals depending upon a number of times of receiving packets and a receiving time and at every loss of packet of high priority found based on inconsistency of priority sequence numbers, and a retransmission sequence number adding step of sending an instruction to add the general sequence number of the specific packet of high priority whose loss is detected by the packet loss detecting step and the general sequence number of the packet to be retransmitted at packet loss, whose loss is detected by the packet loss detecting step, into the retransmission list, to the retransmission list managing step.

A packet retransmission method according to the present invention, the reception apparatus includes a retransmission-request transmitting step of creating a retransmission-request packet including at least one general sequence number of packet existing in the retransmission list, and transmitting the retransmission-request packet to the transmission apparatus, the transmission apparatus includes:

a retransmission-request receiving step of extracting the general sequence number in the retransmission-request packet received from the reception apparatus and notifying the general sequence number;

a retransmission packet detecting step of detecting whether a packet of notified general sequence number exists in the retransmission buffer; and a retransmitting step of retransmitting the packet of the general sequence number detected by the retransmission packet detecting step to the reception apparatus.

A packet retransmission method according to the present invention, the reception apparatus includes a retransmission-request transmitting step of creating a retransmission-request packet including a largest (latest) general sequence number of packet provided to the request application unit by the packet providing step, and transmitting the retransmission-request packet to the transmission apparatus, the transmission apparatus includes:

a retransmission-request receiving step of extracting the largest general sequence number in the retransmission-request packet received from the reception apparatus, and notifying the largest general sequence number; and a retransmission buffer deleting step of deleting packets of general sequence numbers smaller than the largest general sequence number notified by the retransmission-request receiving step, from the retransmission buffer.

A packet retransmission method according to the present invention, the reception apparatus includes:

a retransmission-request transmitting step of creating a retransmission-request packet including at least one general sequence number in the retransmission list and a largest (latest) general sequence number of packet provided to the request application unit by the packet providing step, and transmitting the retransmission-request packet to the transmission apparatus, the transmission apparatus includes:

a retransmission-request receiving step of extracting the general sequence number and the largest general sequence number in the retransmission-request packet received from the reception apparatus and notifying the general sequence number and the largest general sequence number;

a retransmission buffer deleting step of deleting packets of general sequence numbers smaller than the largest general sequence number notified by the retransmission-request receiving step, from the retransmission buffer;

a retransmission packet detecting step of detecting whether the packet of notified general sequence number exists in the retransmission buffer; and a retransmitting step of retransmitting packets of the general sequence numbers detected by the retransmission packet detecting step, to the reception apparatus.

A packet retransmission method according to the present invention, the reception apparatus includes:

a packet providing step of providing payload (data) of at least one packet out of packets stored in the reception buffer to the request application unit, deleting general sequence numbers smaller than a general sequence number of the packet, from the retransmission-request list, providing payload of packet of next general sequence number (N+1) coming after a general sequence number (N being a natural number) of a packet provided last time, within a specific time, and when the packet of next general sequence number (N+1) does not exist in the reception buffer and is not inserted into the reception buffer within the specific time, notifying the request application unit of a loss of the packet to be provided.

A packet retransmission method according to the present invention, the reception apparatus includes a packet providing step, when a packet to be provided within a specific time does not exist in the reception buffer, of performing a packet loss detection and a retransmission-request transmission several times within the specific time.

A packet retransmission method according to the present invention, the reception apparatus includes a packet providing step, when a general sequence number of a packet to be provided does not exist in the retransmission list, of notifying the request application unit that the packet to be provided is lost, without waiting for the specific time having passed.

A packet retransmission method according to the present invention, the transmission apparatus includes a priority information adding step of adding priority information to an optional packet p coming every m packets ($m \leq n$, m and n are natural numbers), wherein the priority information is information about packets of high priority and packets to be retransmitted at a packet loss, which are located in a range of n (n being a natural number) packets from the packet p, and for deciding values of m and n depending upon a network congestion status, the reception apparatus includes a packet loss detecting step of detecting a sequence number of a packet of high priority which has been lost and a sequence number of packet to be retransmitted at packet loss which has been lost, based on a packet in the reception buffer and sequence number of a received packet and on the priority information, at packet receiving intervals depending upon a number of times of receiving packets and a receiving time and at every loss of important packet found based on inconsistency of sequence numbers.

BRIEF DESCRIPTION OF THE DRAWINGS

FIG. 8 shows an example of a packet loss and a packet loss detecting process according to Embodiment 1;

FIG. 16 shows an example of a packet loss and a packet loss detecting process according to Embodiment 2;

FIG. 17 shows a configuration of a retransmission system and packet transfer system according to Embodiment 3;

FIG. 18 shows an example of a packet to which priority information is added;

FIG. 20 shows an example of a packet loss and a packet loss detecting process according to Embodiment 3.

BEST MODE FOR CARRYING OUT THE INVENTION

Referring to the attached drawings, embodiments of the present invention will be described hereinafter.

Embodiment 1

Figure 1:
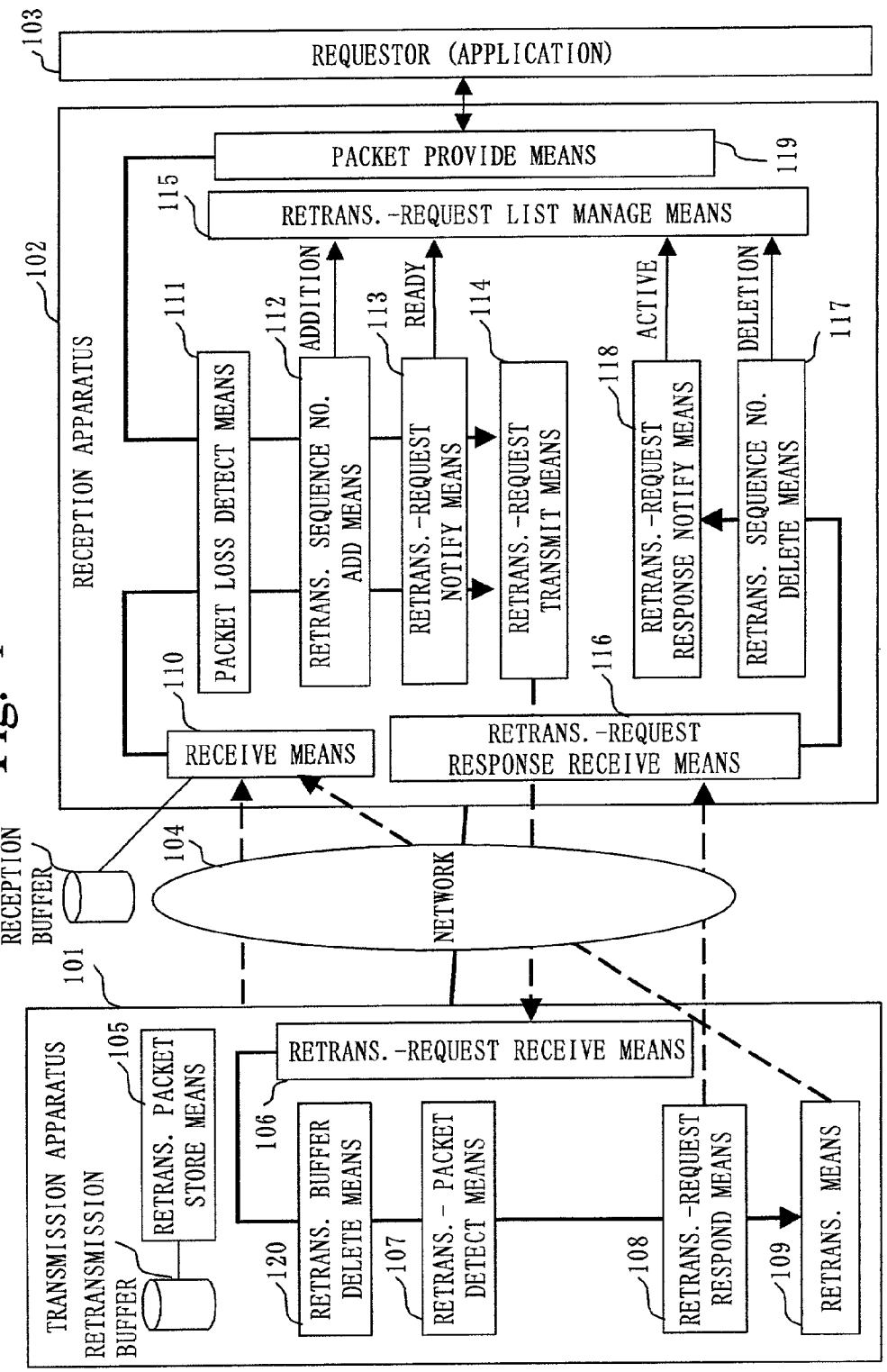
FIG. 1 shows a configuration of a retransmission system according to Embodiment 1.

FIG. 1 shows a configuration illustrating a packet retransmission system and a packet transfer system according to Embodiment 1 of the present invention. The packet retransmission and packet transfer between the transmission side and the reception side at a packet loss in the packet transmission where sequence numbers are added to packets is shown in FIG. 1. The retransmission system and the packet transfer system according to Embodiment 1 is composed of a network 104 such as the Internet and a wireless network, a transmission apparatus 101 for transmitting packets, a reception apparatus 102 for receiving the packets sent from the transmission apparatus 101 through the network 104, and a requester (application) 103 for requesting packet data from the reception apparatus 102.

In the transmission apparatus 101, the following are provided:

retransmission packet storing means 105 for storing only packets to be retransmitted out of packets having been transmitted to the reception apparatus 102, in a retransmission buffer, retransmission-request receiving means 106 for receiving a retransmission-request packet from the reception apparatus 102, extracting sequence numbers of packets requested to be retransmitted out of the retransmission-request packet, and notifying retransmission packet detecting means 107 of the extracted sequence numbers and retransmission buffer deleting means 120 of the largest sequence number provided to the requestor (the largest sequence number indicates a sequence number of the latest packet), the retransmission buffer deleting means 120 for deleting packets of sequence numbers smaller than the largest (latest) sequence number provided to the requestor 103, from the retransmission buffer, the retransmission packet detecting means 107 for detecting sequence numbers notified by the retransmission-request receiving means 106 out of the retransmission buffer, retransmission-request responding means 108 for putting all the sequence numbers detected by the retransmission packet detecting means 107 in one retransmission-request response packet and transmitting the retransmission-request response packet to the reception apparatus 102, and retransmission means 109 for retransmitting packets of the sequence numbers detected by the retransmission packet detecting means 107 to the reception apparatus 102.

In the reception apparatus 102, the following are provided:

receiving means 110 for receiving packets from the transmission apparatus 101, and storing the packets, with sorting them in order of the sequence number, in a reception buffer, retransmission-request list managing means 115 for adding or deleting sequence numbers in a retransmission-request list which stores sequence numbers of packets to be requested retransmission at the next retransmission request time and packets currently being requested to retransmit, and changing the status of the retransmission-request list, packet loss detecting means 111 for detecting a sequence number of lost packet based on sequence number inconsistency of packets in the reception buffer, at packet receiving intervals depending upon the number of times of receiving packets and a receiving time, retransmission sequence number adding means 112 for sending an instruction to add the sequence number of the lost packet detected by the packet loss detecting means 111 into the retransmission-request list to the retransmission-request list managing means 115, retransmission-request notifying means 113 for sending an instruction to make the status of the retransmission-request list "READY" to the retransmission-request list managing means 115, (the READY indicates the status that it is unknown whether all the packets corresponding to the sequence numbers in the retransmission-request list will be retransmitted or not because a response to the retransmission-request has not returned yet after requesting the retransmission), retransmission-request transmitting means 114 for putting a plurality of sequence numbers in the retransmission-request list in one retransmission-request packet and sending the retransmission-request packet to the transmission apparatus 101 at the intervals of the packet loss detecting means 111 performing a packet loss detection, and, retransmission-request response receiving means 116 for receiving a retransmission-request response packet, and notifying retransmission sequence number deleting means 117 of sequence numbers of the packets to be retransmitted from the transmission apparatus 101 extracted from the retransmission-request response packet, the retransmission sequence number deleting means 117 for sending an instruction to delete the sequence number notified by the retransmission-request response receiving means 116 to the retransmission-request list, retransmission-request response notifying means 118 for sending an instruction to make the status of the retransmission-request list "ACTIVE" to the retransmission-request list managing means 115, (the ACTIVE indicates the status that no packet has been retransmitted from the transmission apparatus 102 though retransmission of the packets whose sequence numbers are in the retransmission-request list has been requested), and packet providing means 119 for providing payload of one packet and a plurality of packets out of packets stored in the reception buffer to the requester (application) 103.

Figure 2:
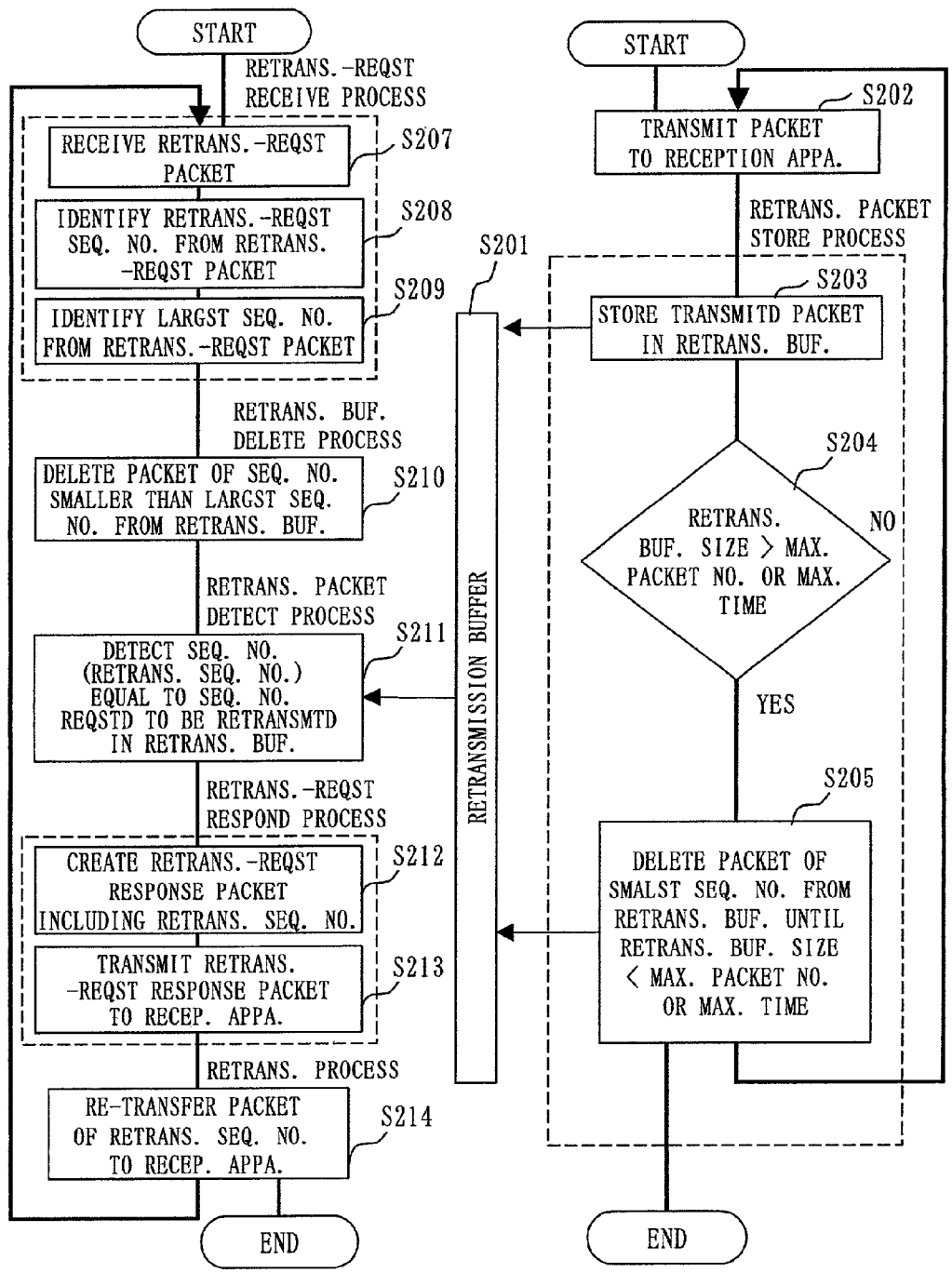
FIG. 2 shows a flowchart of a transmission apparatus according to Embodiment 1.
Figure 3:
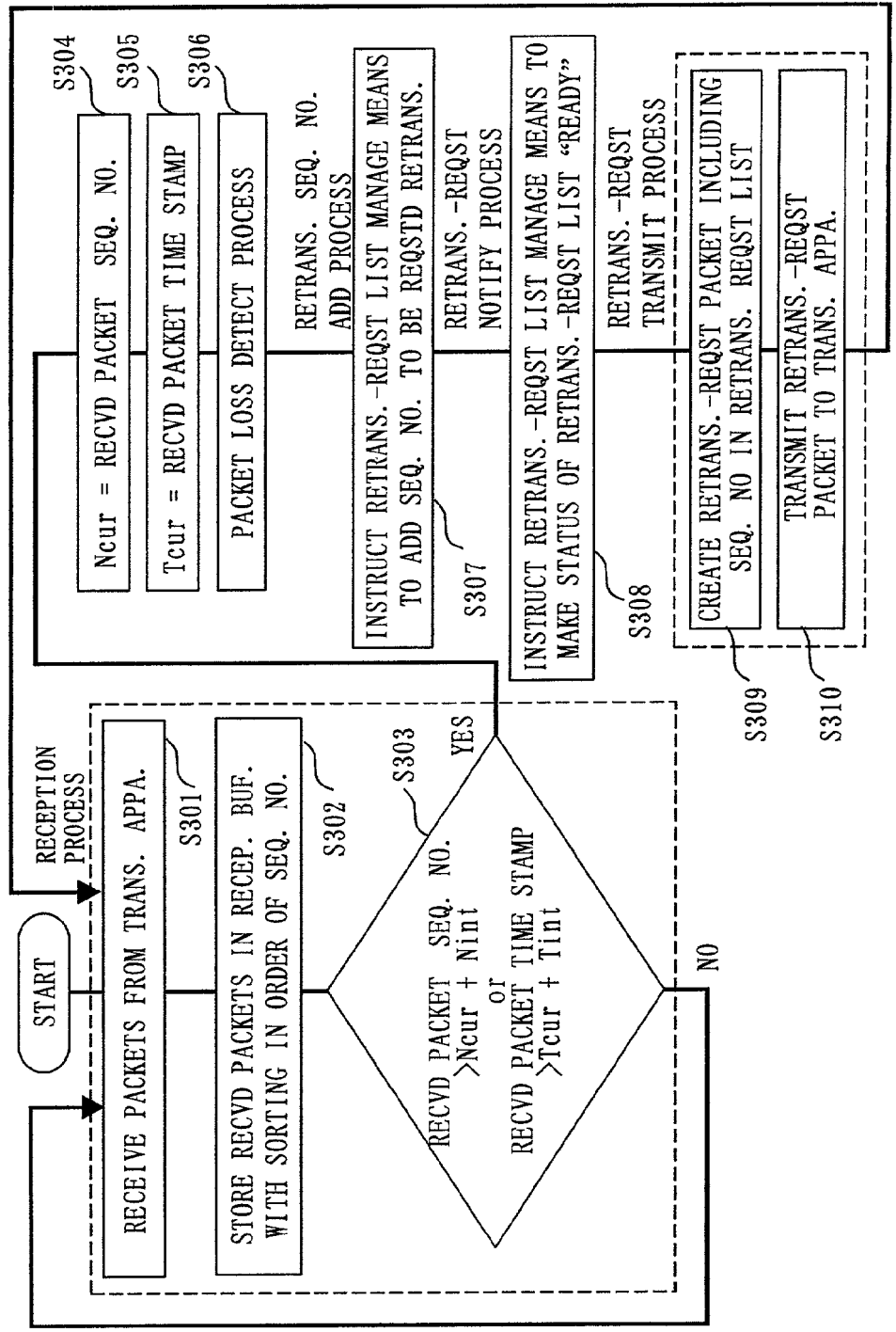
FIG. 3 shows a flowchart of packet receiving of a reception apparatus according to Embodiment 1.
Figure 4:
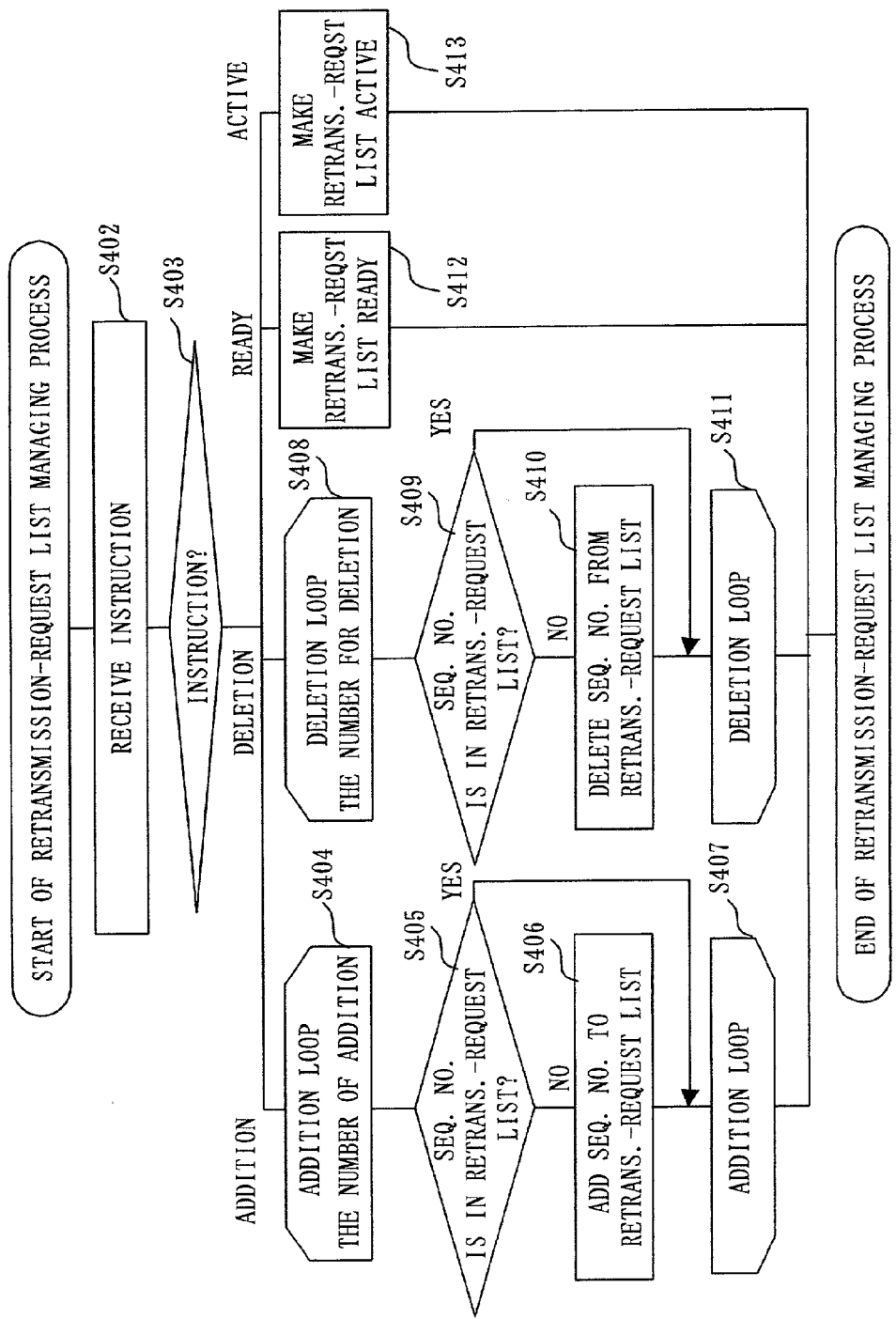
FIG. 4 shows a flowchart of a retransmission-request list managing process of the reception apparatus according to Embodiment 1.
Figure 5:
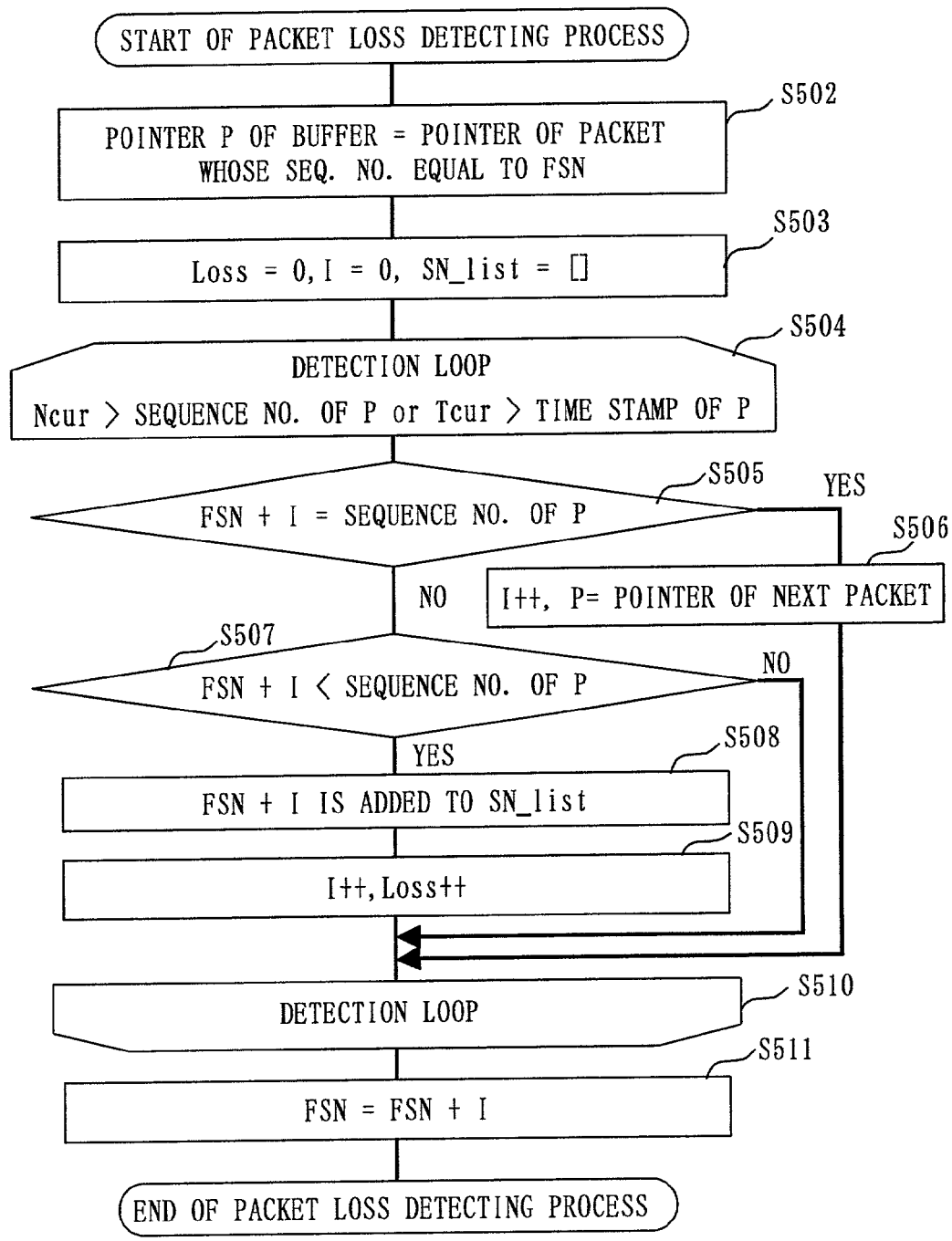
FIG. 5 shows a flowchart of a packet loss detecting process of the reception apparatus according to Embodiment 1.
Figure 6:
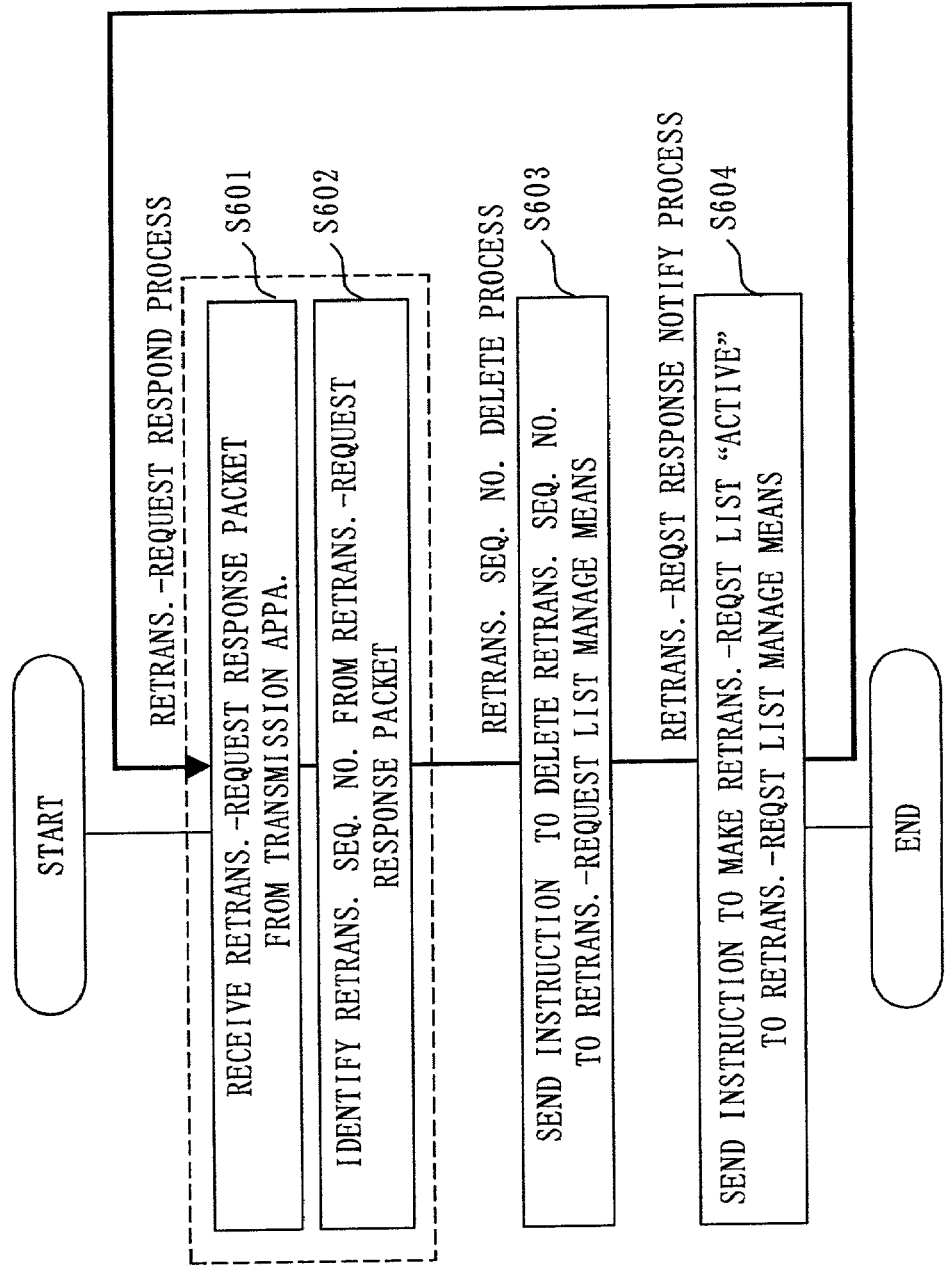
FIG. 6 shows a flowchart of retransmission-request response receiving of the reception apparatus according to Embodiment 1.
Figure 7:
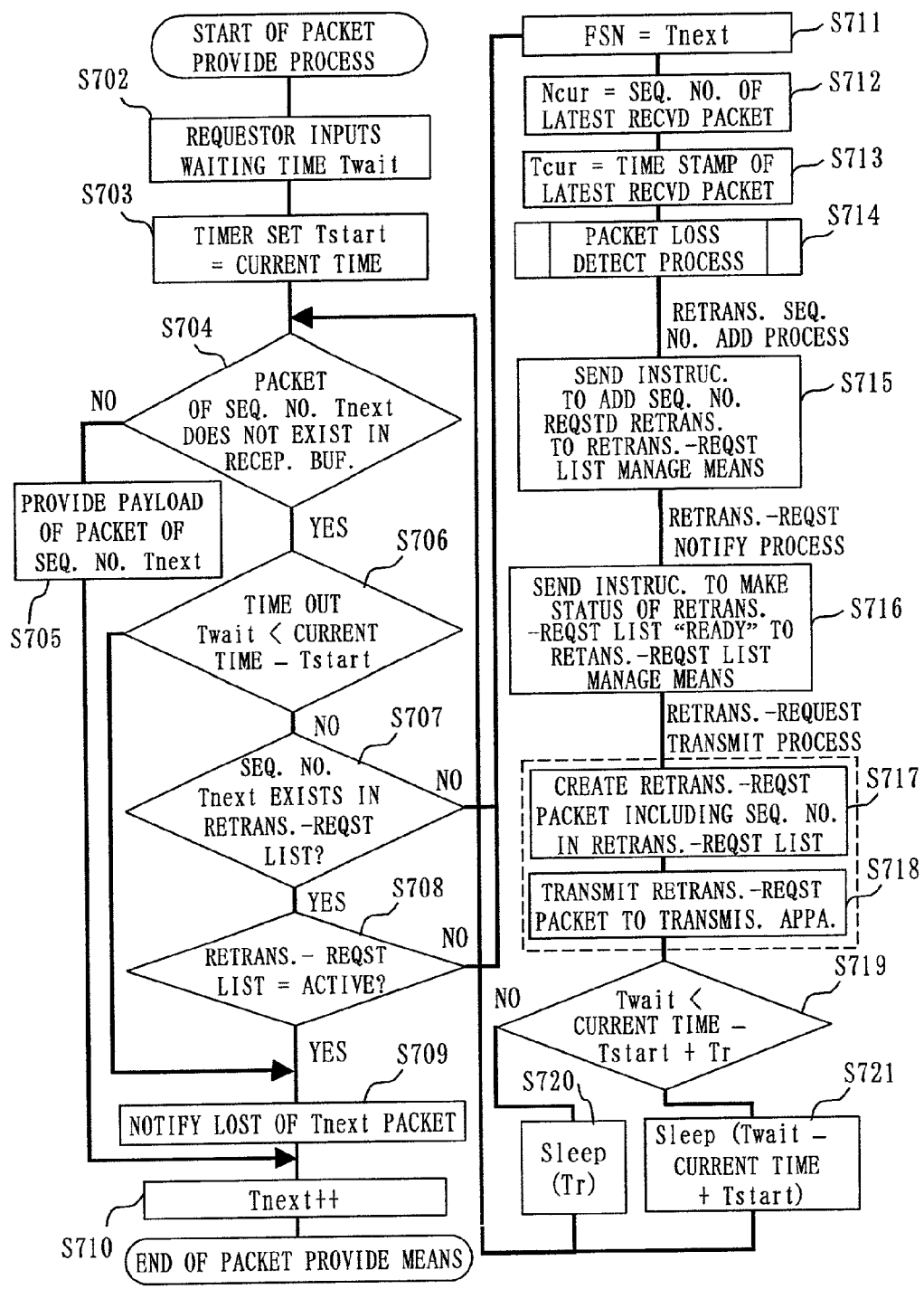
FIG. 7 shows a flowchart of packet providing of the reception apparatus according to Embodiment 1.

FIG. 2 is a flowchart explaining the transmission apparatus, and FIGS. from 3 to 7 are flowcharts explaining the reception apparatus. FIG. 3 illustrates a flow from the process of the receiving means 110 receiving a packet to the process of the retransmission-request transmitting means 114 performing a retransmission request. FIG. 4 illustrates a process flow of the retransmission-request list managing means 115 of the reception apparatus 102. FIG. 5 illustrates a process flow of the packet loss detecting means 111 of the reception apparatus 102. FIG. 6 illustrates a process flow of the retransmission-request response receiving means 116 receiving a retransmission-request response packet. FIG. 7 illustrates a process flow when the requester (application) requests to be provided a packet through the packet providing means 119.

Now, operations will be described. In the configuration of FIG. 1, the transmission apparatus 101 transmits packets to the reception apparatus 102 (step S202). The transmission apparatus 101 stores the transmitted packets in the retransmission buffer (step S203). At this time, it is acceptable to store all the packets in a retransmission buffer 201 or to store only important packets to be retransmitted in the retransmission buffer 201. However, if the size of the retransmission buffer 201 becomes larger than the maximum number of packets, or if the accumulated time amount of the retransmission buffer 201 becomes more than the maximum time when the time management is performed depending upon time stamps (step S204), a packet of the smallest sequence number is deleted from the retransmission buffer 201 until the size of the retransmission buffer 201 becomes smaller than the maximum number of packets or the accumulated time amount of the retransmission buffer 201 becomes less than the maximum time (step S205).

After receiving the packets from the transmission apparatus 101 as shown in FIG. 3 (step S301), the receiving means 110 of the reception apparatus 102 stores the received packets in the reception buffer with sorting them in order of the sequence number (step S302).

After having received a specific number of packets, the packet loss detecting means 111 checks whether there is a lost packet or not. This checking process is called a packet loss detecting process. The interval of the packet loss detecting process (step S306) by the packet loss detecting means 111 is decided based on, for instance, a difference between the sequence number or the time stamp of the last packet in the last packet loss detecting process (step S306) and the sequence number or the time stamp of the packet being currently received (step S303). It is supposed that the interval between the sequence numbers for performing the packet loss detecting process (step S306) is Nint, the interval between the time stamps is Tint, the sequence number of the last packet in the last packet loss detecting process (step S306) is Ncur, and the time stamp of the last packet in the last packet loss detecting process (step S306) is Tcur.

When the sequence number of the packet being currently received by the receiving means 110 is equal to or greater than Ncur+Nint, or when the time stamp of the packet being currently received by the receiving means 110 is equal to or greater than Tcur+Tint, the packet loss detecting process (step S306) is performed after substituting the sequence number and the time stamp of the packet being currently received for Ncur and Tcur. By this substitution, the values of Ncur and Tcur become the last sequence number and the last time stamp of the new packets being currently received. Regarding Nint and Tint, it is acceptable to use fixed values for them or to decide variable values for them depending upon the congestion status of the network.

Referring to the reception buffer in which packets are sorted in order of sequence number, the packet loss detecting means 111 checks the consistency of the sequence numbers and detects an omitted sequence number, at the range from the packet coming next after the last packet in the last packet loss detecting process (S306) to the packet of the sequence number of Ncur (the sequence number of the last packet out of the packets being currently received), but the packet of Ncur being excluded from the range, or to the packet of the time stamp of Tcur (the time stamp of the last packet out of the packets being currently received), but the packet of Tcur being excluded from the range.

FIG. 5 shows a detailed flow of the packet loss detecting process (step S306) performed by the packet loss detecting means 111. In FIG. 5, the packet loss detecting means 111 firstly sets the pointer of the packet whose sequence number equals FSN to be P out of packets in the reception buffer (step S502). FSN is the sequence number of the packet coming next after the last packet in the last packet loss detecting process. It is defined that the number of lost packets is Loss, the distance from FSN is I, and a list of sequence numbers of lost packets is SN_list. Loss and FSN are set to be 0 as initial values, and blank (blank list) is set as an initial value of the SN_list (step S503).

Next, at the range shown in the step 504 of the packet loss detecting process, that is the range from the packet coming next after the last packet in the last packet loss detecting process (S306) to the packet of sequence number of Ncur (the sequence number of the last packet out of the packets being currently received), but the packet of Ncur being excluded from the range, or to the packet of time stamp of Tcur (the time stamp of the last packet out of the packets being currently received), but the packet of Tcur being excluded from the range, the sequence number of the packet stored in the pointer P in the reception buffer is compared with FSN+I (step S505). When FSN+I is equal to the sequence number of the packet stored in the pointer P at the step S505, it indicates that the packet of the sequence number of FSN+I has been received without loss. Then, I is incremented (step S506), and the pointer of the next packet is set to be P (step S506). If FSN+I is not equal to the sequence number of the packet stored in the pointer P at the step S505, it goes to the step S507. When FSN+I is smaller than the sequence number of the packet stored in the pointer P (step S507), it indicates that the packet of sequence number of FSN+I is lost. Then, FSN+I is added to the SN_list (step S508), and I and Loss are incremented (step S509).

After the sequence number comparison is finished (step S510) at the range shown in the step S504, that is the range from the packet coming next after the last packet in the last packet loss detecting process (S306) to the packet of the sequence number of Ncur (the sequence number of the last packet out of the packets being currently received), but the packet of Ncur being excluded from the range, or to the packet of time stamp of Tcur (the time stamp of last packet out of the packets being currently received), but the packet of Tcur being excluded from the range, I is added to FSN and the added FSN is defined to be the starting sequence number of the next packet loss detecting process (step S511). In this situation, numbers in the $Sn_{13}$ list are the sequence numbers of the lost packets at the above range and Loss is the number of lost packets.

FIG. 8 shows an example of the reception buffer in which a packet loss is occurred and the result of the packet loss detecting process execution. In FIG. 8, the reception buffer in the case of Nint=8 is denoted by 801, the status of FSN, Ncur, I, Loss, and $Sn_{13}$ list in the Nth packet loss detecting process is denoted by 802, and the status of FSN, Ncur, I, Loss, and Sn_list in the (N+1)th packet loss detecting process is denoted by 803. The packet sequence numbers in the reception buffer 801 are 1, 2, 3, . . . , 7, 8, 9, 10, 12, 15, 16, 18, 19, 22, 23, 24, 25, 26, . . . , and Nint=8 in FIG. 8. In the case of FSN=8 and Ncur=16 at the Nth packet loss detecting process execution (802), a lost number is detected within the range of sequence numbers from 8 to 15.

In this example, three sequence numbers 11, 13, and 14 are omitted, and it is concluded that these three packets are lost. In the (N+1)th packet loss detecting process (803), FSN is (Nth FSN+I)=8+8=16 and Ncur is (Nth Ncur+Nint)=16+8=24.

In the same way, a lost number is detected within the range of sequence numbers from 16 to 23. In this example, three sequence numbers 17, 20, and 21 are omitted, and it is concluded that these three packets are lost.

Referring to FIG. 5, the operation of Nth packet loss detecting process will be described in detail. In this case, it is supposed that FSN=8 and Ncur has already been set to be (Nth Ncur+Nint)=8+8=16.

In the Nth packet loss detecting process, the packet loss detecting means 111 sets the pointer of the packet with a sequence number corresponding to FSN+I=8+0=8 in the reception buffer to be P (step S502).

Loss is set to be 0 as an initial value, I is set to be 0 as an initial value, and SN_list is set to be 0 as an initial value. (step S503).

In the range of P<Ncur=16, the following process is executed (step S504). First, FSN+I is compared with the sequence number stored in the pointer P (step S505). As the result of the comparison of FSN+I=8+0=8 and the sequence number stored in the pointer P being 8, it is concluded that "FSN+I=the sequence number stored in the pointer P", and it goes to the step S506. The pointer of the next packet is set based on incrementing I by 1 and also incrementing the pointer P by 1 (step S506). Consequently, I=1 and the sequence number stored in the pointer P is 9.

Then, it goes back to the loop, and FSN+I is compared with the sequence number stored in the pointer P (step S505). As the result of the comparison of FSN+I=8+1=9 and the sequence number stored in the pointer P being 9, it is concluded that "FSN+I=the sequence number stored in the pointer P", and it goes to the step S506. The pointer of the next packet is set based on incrementing I by 1 and also incrementing the pointer P by 1 (step S506). Consequently, I=2 and the sequence number stored in the pointer P is 10.

Again, it goes back to the loop, and FSN+I is compared with the sequence number stored in the pointer P (step S505). As the result of the comparison of FSN+I=8+2=10 and the sequence number stored in the pointer P being 10, it is concluded that "FSN+I=the sequence number stored in the pointer P", and it goes to the step S506. The pointer of the next packet is set based on incrementing I by 1 and also incrementing the pointer P by 1 (step S506). Consequently, I=3 and the sequence number stored in the pointer P is 12.

Again, it goes back to the loop, and FSN+I is compared with the sequence number stored in the pointer P (step S505). As the result of the comparison of FSN+I=8+3=11 and the sequence number stored in the pointer P being 12, it is concluded that "FSN+I≠the sequence number stored in the pointer P", and it goes to the step S507. At the step S507, it is concluded, as the result of the comparison, that "FSN+I<the sequence number stored in the pointer P", and it goes to the step S508. At the step S508, FSN+I=8+3=11 is added to the $Sn_{13}$ list (step S508). Consequently, the value of the SN_list is switched to 11 from the blank. I is incremented by 1 and Loss is also incremented by 1 (step S509). As a result, I=4 and Loss=1.

Then, it goes back to the loop, and FSN+I is compared with the sequence number stored in the pointer P (step S505). As the result of the comparison of FSN+I=8+4=12 and the sequence number stored in the pointer P being 12, it is concluded that "FSN+I=the sequence number stored in the pointer P", and it goes to the step S506. The pointer of the next packet is set based on incrementing I by 1 and also incrementing the pointer P by 1 (step S506). Consequently, I=5 and the sequence number stored in the pointer P is 15.

Again, it goes back to the loop, and FSN+I is compared with the sequence number stored in the pointer P (step S505). As the result of the comparison of FSN+I=8+5=13 and the sequence number stored in the pointer P being 15, it is concluded that "FSN+I≠the sequence number stored in the pointer P", and it goes to the step S507. At the step S507, it is concluded, as the result of the comparison, that "FSN+I<the sequence number stored in the pointer P", and it goes to the step S508. At the step S508, FSN+I=8+5=13 is added to the SN_list (step S508). Consequently the value of the SN_list is switched to "11, 13" from "11". I is incremented by 1 and Loss is also incremented by 1 (step S509). As a result, I=6 and Loss=2.

Again, it goes back to the loop, and FSN+I is compared with the sequence number stored in the pointer P (step S505). As the result of the comparison of FSN+I=8+6=14 and the sequence number stored in the pointer P being 15, it is concluded that "FSN+I≠the sequence number stored in the pointer P", and it goes to the step S507.

At the step S507, it is concluded, as the result of the comparison, that "FSN+I<the sequence number stored in the pointer P", and it goes to the step S508. At the step S508, FSN+I=8+6=14 is added to the $Sn_{13}$ list (step S508). Consequently the value of the SN_list is switched to "11, 13, 14" from "11, 13". I is incremented by 1 and Loss is also incremented by 1 (step S509). As a result, I=7 and Loss=3.

Then, it goes back to the loop, and FSN+I is compared with the sequence number stored in the pointer P (step S505). As the result of the comparison of FSN+I=8+7=15 and the sequence number stored in the pointer P being 15, it is concluded that "FSN+I=the sequence number stored in the pointer P", and it goes to the step S506. The pointer of the next packet is set based on incrementing I by 1 and also incrementing the pointer P by 1 (step S506). Consequently, I=8 and the sequence number stored in the pointer P is 16. As this does not meet the loop condition Ncur>P, it goes out of the loop, and FSN is set to be FSN+1=15+1=16 (step S511).

As described above, it is detected that the sequence numbers 11, 13, and 14 are lost. The operation of (N+1)th packet loss detecting process is performed in the same way.

After executing the packet loss detecting process (step S306), when Loss>0, it is concluded that packet loss is detected. Then, the retransmission sequence number adding means 112 sends an instruction to add the sequence numbers of the lost packets registered in the $SN_{13}$ list to the retransmission-request list managing means 115 (step S307).

Receiving the add instruction, the retransmission-request list managing means 115 adds the sequence numbers in the SN_list to the retransmission-request list (steps S402 through S407). In this case, however, no double registration is performed.

When all the sequence numbers in the SN_list are in the retransmission-request list of "ACTIVE" status and no sequence number can be added to the retransmission-request list, the following retransmission-request notifying process and retransmission-request transmitting process are not performed.

The retransmission-request notifying means 113 sends an instruction to make the status of the retransmission-request list "READY" to the retransmission-request list managing means 115 (step S308). The retransmission-request list of READY status indicates a sequence number list where sequence numbers requested to be retransmitted are included but it is unknown whether all of them will be retransmitted or not. Receiving the READY instruction, the retransmission-request list managing means 115 makes the status of retransmission-request list "READY" (steps S402, S403, and S412).

The retransmission-request transmitting means 114 sends a retransmission-request about the sequence numbers in the retransmission-request list to the transmission apparatus 101 (step S309). In this case, the retransmission-request transmitting means 114 puts the sequence numbers in the retransmission-request list and the largest (latest) sequence number of packet provided to the requestor (application) 103 in one retransmission-request packet and transmits the retransmission-request packet to the transmission apparatus 101 (step S310).

As shown in FIG. 2, the retransmission-request receiving means 106 of the transmission apparatus 101 receives the retransmission-request packet (step S207), and identifies the sequence number requested to be retransmitted and the largest (latest) sequence number provided to the requester (application) 103 from the retransmission-request packet (steps S208 and S209).

The retransmission buffer deleting means 120 deletes packets of sequence numbers smaller than the largest (latest) sequence number, provided to the requestor (application) 103, in the retransmission buffer 201, because the packets of sequence numbers smaller than the largest one are not requested to be retransmitted any more (step S210).

The retransmission packet detecting means 107 searches the retransmission buffer and detects sequence numbers equal to the sequence numbers requested to be retransmitted (step S211). These sequence numbers indicating sequence numbers of the packets to be retransmitted are called retransmission sequence numbers.

The retransmission-request responding means 108 creates a retransmission-request response packet which includes retransmission sequence numbers detected by the retransmission packet detecting means 107, and transmits the retransmission-request response packet to the reception apparatus 102 (step S212).

The retransmission means 109 re-transfers the packet of retransmission sequence numbers to the reception apparatus 102 (step S214).

As shown in FIG. 6, the retransmission-request response receiving means 116 of the reception apparatus 102 receives the retransmission-request response packet including the retransmission sequence numbers from the transmission apparatus 101 (step S601) and identifies the retransmission sequence numbers from the retransmission-request response packet (step S602).

The retransmission sequence number deleting means 117 sends the retransmission-request list managing means 115 an instruction to delete retransmission sequence numbers of packets which do not need to be requested retransmission because of having been received, from the retransmission-request list (step S603).

Receiving the deletion instruction, the retransmission-request list managing means 115 deletes the retransmission sequence numbers from the retransmission-request list as shown in FIG. 4 (steps S402, S403, S408 through S411). Consequently, the sequence numbers remained in the retransmission-request list indicate the sequence numbers of packets requested retransmission because of loss of the packets and not having been retransmitted from the transmission apparatus 101.

As shown in FIG. 6, the retransmission-request response notifying means 118 sends an instruction to make the status of the retransmission-request list "ACTIVE" to the retransmission-request list managing means 115 (step S604).

As shown in FIG. 4, after receiving the ACTIVE instruction, the retransmission-request list managing means 115 changes the status of the retransmission-request list to be ACTIVE (steps S402, S403, and S413). The retransmission-request list of the ACTIVE status indicates the sequence numbers which have not been retransmitted from the transmission apparatus though the retransmission request was performed.

The requestor (application) 103 requests payload of the packets received by the reception apparatus 102. When the requestor (application) 103 requests the payload of the packets and a waiting time for the payload being provided, the packet providing means 119 of the reception apparatus 102 provides the payload of the next packet (whose sequence number being Tnext) coming after the last provided packet before the waiting time has passed. However, if it is impossible to provide the payload of the packet of Tnext within the waiting time because of a packet loss or an absence of retransmission, the packet providing means 119 notifies the requestor (application) 103 that the packet of Tnext is lost.

As shown in FIG. 7, when the packet providing means 119 is requested to provide the packet payload and the waiting time for the payload being provided by the requestor (application) 103 (step S702) the packet providing means 119 sets the current time to be Tstart (step S703), and inquires whether the packet of the sequence number Tnext exists in the reception buffer or not (step S704). When the packet of Tnext exists in the reception buffer, the packet providing means 119 provides the payload for the packet of Tnext (step S705).

When the packet of Tnext does not exist in the reception buffer, the time-out is checked whether the current time is over the waiting time or not (step S706). If the time-out case, the packet providing means 119 notifies the requestor (application) 103 of the packet of Tnext being lost (step S709). If not the time-out case, the packet providing means 119 inquires whether the sequence number Tnext exists in the retransmission-request list or not (step S707).

In the case that the Tnext exists in the retransmission-request list and the status of the retransmission-request is ACTIVE (step S708), the packet providing means 119 notifies the requestor (application) 103 of the Tnext packet being lost (step S709), because this case means that no packet is retransmitted from the transmission apparatus 101 though the retransmission request was performed.

In the case that the Tnext does not exist in the retransmission-request list, Tnext is set to be FSN (step S711), the sequence number of the latest packet currently received is set to be Ncur (step S712), and the time stamp of the latest packet currently received is set to be Tcur (step S713). Then, again, the Tnext is requested to be retransmitted, and the latest packet loss is detected and retransmission is requested for the latest packet loss by performing a packet loss detecting process (step S714), a retransmission sequence number adding process (step S715), a retransmission-request response notifying process (step S716), and a retransmission-request transmitting process (step S717, S718).

When 0 (zero) is set as the waiting time, the packet providing means 119 inquires only whether the Tnext is in the reception buffer or not. If the Tnext does not exist in the reception buffer, requesting the retransmission of the Tnext packet is not performed. Instead, the requestor (application) 103 is immediately notified of the loss of the packet Tnext. In contrast, when the waiting time is set to be unlimited, if the Tnext does not exist in the reception buffer, the retransmission request is performed several times until the Tnext packet is retransmitted.

In the case that the Tnext exists in the retransmission-request list of ACTIVE status, requesting the retransmission of the Tnext packet is not performed. Instead, the requestor (application) 103 is notified of the packet loss of Tnext. After the retransmission request transmitting means having transmitted the retransmission-request packet, the packet providing means 119 waits for Tr being an interval for performing the retransmission request (step S720) and inquires whether Tnext is in the reception buffer or not again. It is acceptable to change the Tr at every retransmission request.

At the steps S719, S720, and S721, the waiting time is determined in connection with a sleep time. Referring to a simple example, this will be explained below. It is supposed that Twait=five seconds and Tr=two seconds. In this case, the reception buffer checking and the packet loss detecting process are performed at every two seconds during the five seconds. It is supposed that the packet providing process is started at 0 second, namely Tstart=0. Therefore, the current time passes such as one second, two seconds, three seconds, . . . . Until the current time becomes three seconds, it is judged "No" at the step S719, and it goes to the step S720. At the step S720, it sleeps (delay) for two seconds.

Then, after two seconds have passed, the reception buffer checking and the packet loss detecting process (step S714) are performed again. Namely, the reception buffer checking and the packet loss detecting process (step S714) can be periodically performed within a permitted time, that is the waiting time. However, after the current time has passed three seconds, it becomes over the waiting time Twait if it further sleeps for two seconds (=Tr). In this case, it sleeps (delay) for the difference time (ex. in the case of the current time being four seconds, the difference time is Twait−current time+Tstart=5−4=1 second) at the step S721. After the sleep finished, the reception buffer checking is performed, but the packet loss detecting process is not performed because it is judged to be "time-out" at the step S706. Immediately, the next sequence number is provided at the step S705, which enables to provide packet data within the waiting time.

According to Embodiment 1, since the retransmission packet storing means, the retransmission-request receiving means, the retransmission packet detecting means and the retransmission means are provided in the transmission apparatus, it is possible to retransmit only important packets having high priority. Accordingly, it is possible to minimize the network load waste generated by the retransmission process, and to secure transmission amount for the packets having high priority even at the network congestion. Since the retransmission packet storing means is provided, it is possible to store only the important packets having high priority in the retransmission buffer in advance instead of selecting the packets having high priority out of all the transmitted packets. Accordingly, it is possible to reduce the load of detection process for detecting packets to be retransmitted, to minimize the retransmission buffer in the transmission apparatus and to suppress the waste in resource.

In the reception apparatus, since the packets received by the receiving means from the transmission apparatus are stored in the reception buffer with being sorted in order of the sequence number, it is possible to detect a lost packet out of packets in the reception buffer at the packet loss detecting process at high speed.

Moreover, since the retransmission-request list and the retransmission-request list managing means are provided, it is possible to easily identify sequence numbers having been requested retransmission and sequence numbers of packets to be retransmitted.

Furthermore, since the packet loss detecting means, the retransmission sequence number adding means, the retransmission-request notifying means and the retransmission-request transmitting means are provided, it is possible to perform retransmission request for a plurality of packet losses. Since the transmission apparatus retransmits only important packets having high priority and the reception apparatus can identify sequence numbers of packets to be retransmitted from the transmission apparatus, a real-time transfer system can be realized because it is possible to cut down useless retransmission requests for packets not having been retransmitted and it is not necessary to wait for the retransmission of the packets not having been retransmitted.

In addition, since the retransmission-request receiving means and the retransmission buffer deleting means are provided, it is possible to reduce the retransmission buffer in the transmission apparatus. Since the retransmission packet detecting means and the retransmission means are provided, it is possible to retransmit only the packets having high retransmission priority and to prevent deterioration of congestion even at the network congestion, by way of transferring minimum retransmission packets. Since the retransmission-request responding means is provided, the reception apparatus can know the sequence numbers having high retransmission priority, which makes it possible for the reception apparatus to prevent useless retransmission request.

Furthermore, since the retransmission-request response receiving means the retransmission sequence number deleting means, and the retransmission-request response notifying means are provided, it is possible for the reception apparatus side not to perform useless retransmission request for packets of low retransmission priority not having been retransmitted from the transmission apparatus.

Since the packet providing means is provided, it is possible for the requestor (application) to set waiting time for each packet, and to be provided a payload of packet or a packet loss notification before the waiting time has passed.

Moreover, in addition to the retransmission request periodically performed by the packet loss detecting means and the retransmission-request transmitting means, the packet providing means, by using the packet loss detecting means and the retransmission-request transmitting means, performs retransmission request several times during the waiting time-out on the request from the requester (application). Therefore, the possibility of packets to be retransmitted within the waiting time becomes high, which realizes the providing means of higher reliability.

In the case that the requestor (application) requests to retransmit a packet of low priority not having been retransmitted from the transmission apparatus and the packet of low priority not having been retransmitted from the transmission apparatus does not exist in the reception buffer, it is possible to obtain providing means being able to respond faster, since the packet providing means which immediately notifies the packet loss without performing a useless retransmission request is provided.

In addition, since the packet loss detecting means which can properly recognize the priority of lost packet based on sequence number inconsistency and priority information is provided in the reception apparatus, it is possible to prevent a useless retransmission request for the packets of low priority not having been retransmitted, which reduces the waste of the network and the load of retransmission packet detecting process of the transmission apparatus.

Embodiment 2

Figure 9:
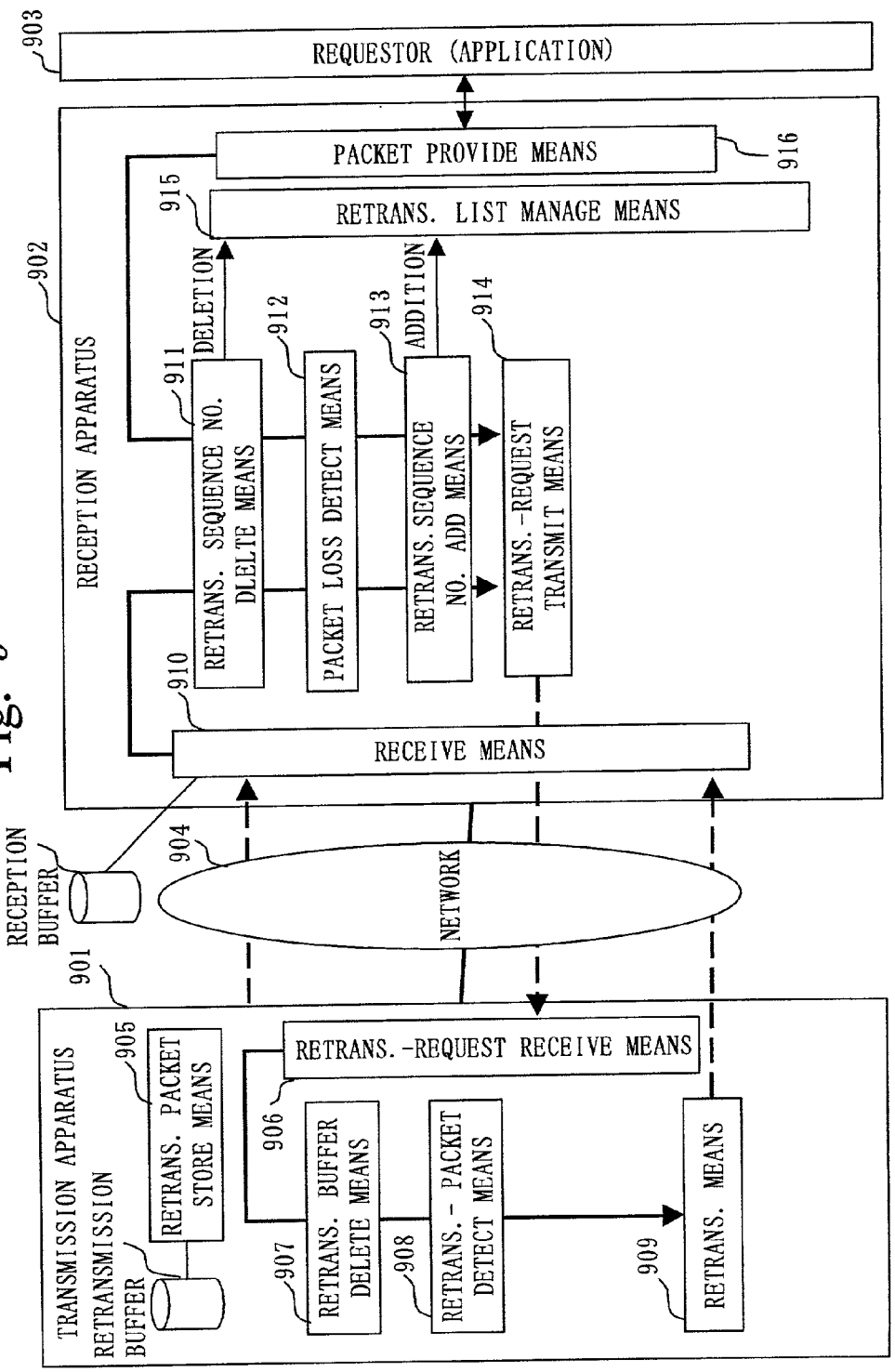
FIG. 9 shows a configuration of a retransmission system and packet transfer system according to Embodiment 2.

FIG. 9 shows a configuration illustrating a packet retransmission system and a packet transfer system according to Embodiment 2 of the present invention. The packet retransmission and packet transfer between the transmission side and the reception side at a packet loss in the packet transmission where general sequence numbers are added to all packets and priority sequence numbers are added to only important packets or packets judged to be retransmitted at the packet loss is shown in FIG. 9. The retransmission system and the packet transfer system according to Embodiment 2 is composed of a network 904 such as the Internet and a wireless network, a transmission apparatus 901 for transmitting packets, a reception apparatus 902 for receiving the packets sent from the transmission apparatus 901 through the network 904, and a requestor (application) 903 for requesting packet data from the reception apparatus 902.

In the transmission apparatus 901, the following are provided:

retransmission packet storing means 905 for storing only packets to be retransmitted out of packets having been transmitted to the reception apparatus 902, in a retransmission buffer, retransmission-request receiving means 906 for receiving a retransmission-request packet from the reception apparatus 902, extracting general sequence numbers of packets requested to be retransmitted out of the retransmission-request packet, and notifying retransmission packet detecting means 908 of the extracted general sequence numbers and retransmission buffer deleting means 907 of the largest general sequence number provided to the requestor (the largest general sequence number indicates a general sequence number of the latest packet), the retransmission buffer deleting means 907 for deleting packets of general sequence numbers smaller than the largest (latest) general sequence number provided to the requestor 903, from the retransmission buffer, the retransmission packet detecting means 908 for detecting general sequence numbers notified by the retransmission-request receiving means 906 out of the retransmission buffer, and retransmission means 909 for retransmitting packets of the general sequence numbers detected by the retransmission packet detecting means to the reception apparatus 902.

In the reception apparatus 902, the following are provided:

receiving means 910 for receiving packets from the transmission apparatus 901, and storing the packets, with sorting them in order of the general sequence number, in a reception buffer, retransmission list managing means 915 for adding or deleting general sequence numbers in a retransmission list which stores general sequence numbers of packets to be requested retransmission at the next retransmission request time and packets currently being requested to retransmit, retransmission sequence number deleting means 911, when general sequence numbers of the received packet are in the retransmission list, for sending an instruction to delete the general sequence numbers to the retransmission list managing means 915, packet loss detecting means 912 for detecting a general sequence number of lost packet based on inconsistency in both of the general sequence numbers and priority sequence numbers of packets in the reception buffer or of received packets, at packet receiving intervals depending upon the number of packet receiving times and a packet receiving time or at every packet loss of important packet found based on inconsistency of priority sequence numbers, retransmission sequence number adding means 913 for sending an instruction to add the general sequence number of the lost packet detected by the packet loss detecting means 912 into the retransmission list to the retransmission list managing means 915, retransmission-request transmitting means 914 for putting a plurality of general sequence numbers in the retransmission list in one retransmission-request packet and sending the packet to the transmission apparatus 901 at the intervals of the packet loss detecting means 912 performing a packet loss detection, and packet providing means 916 for providing payload of one packet and a plurality of packets out of packets stored in the reception buffer to the requestor (application) 903.

Figure 10:
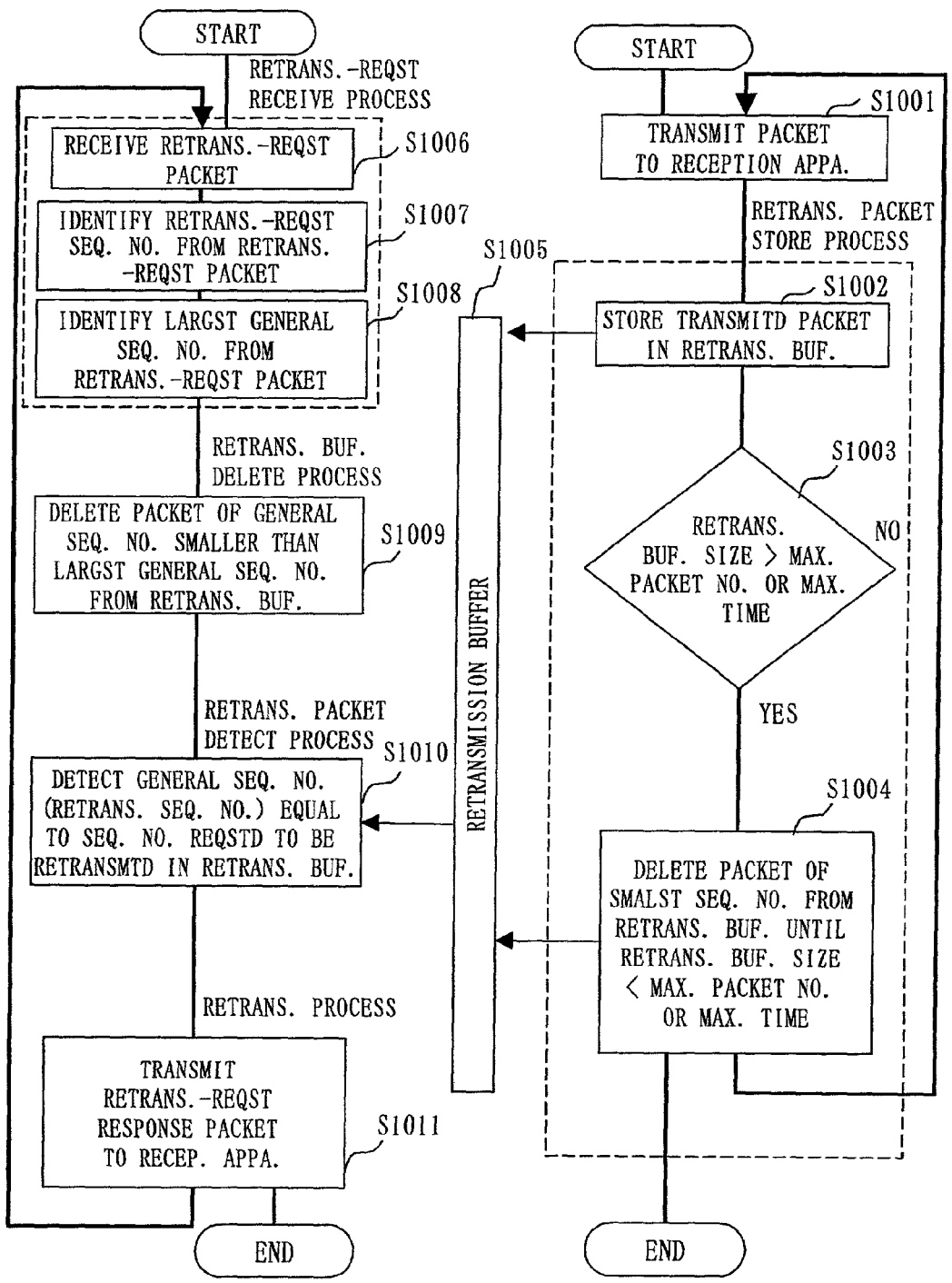
FIG. 10 shows a flowchart of a transmission apparatus according to Embodiment 2.
Figure 11:
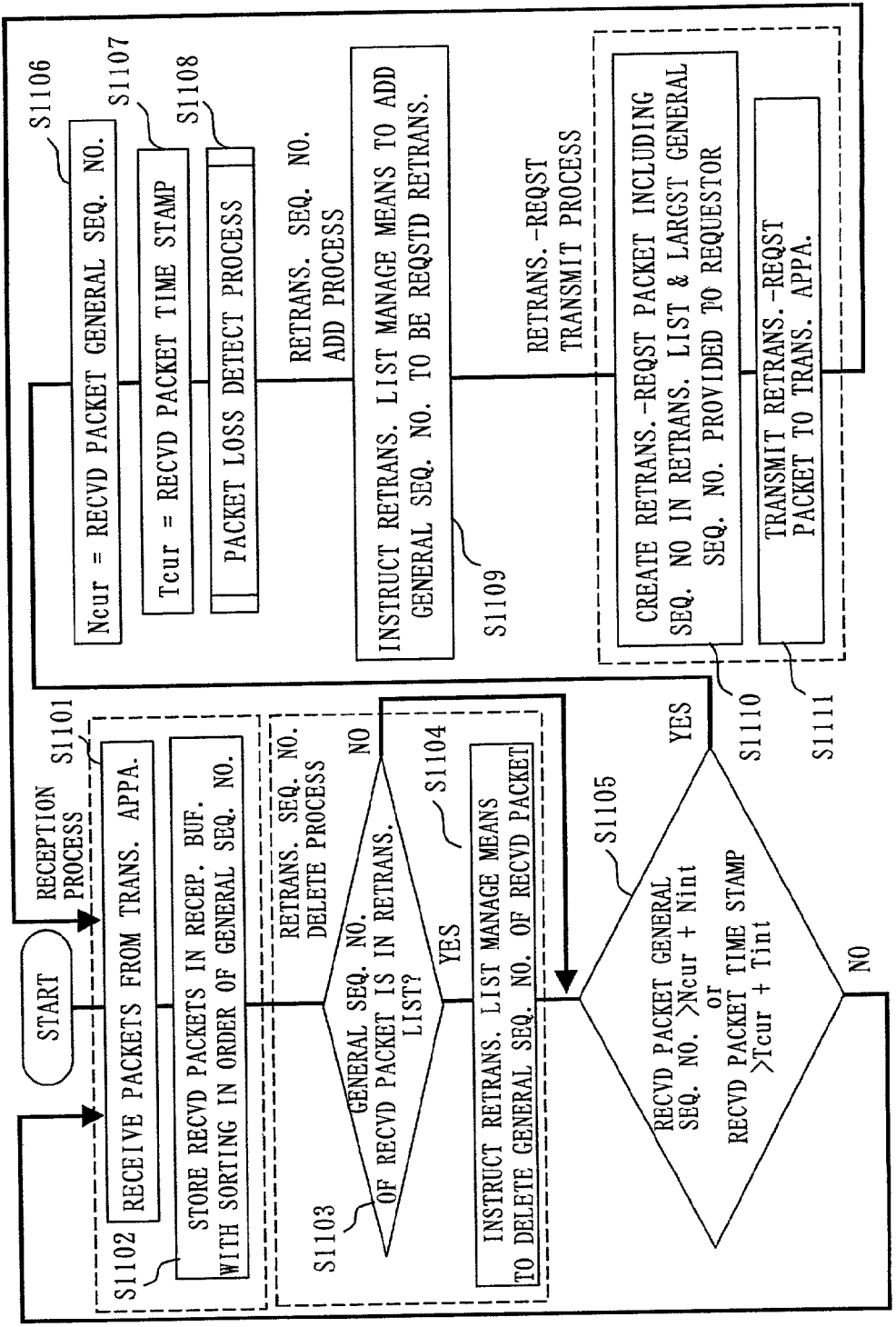
FIG. 11 shows a flowchart of packet receiving (Example 1) of a reception apparatus according to Embodiment 2.
Figure 12:
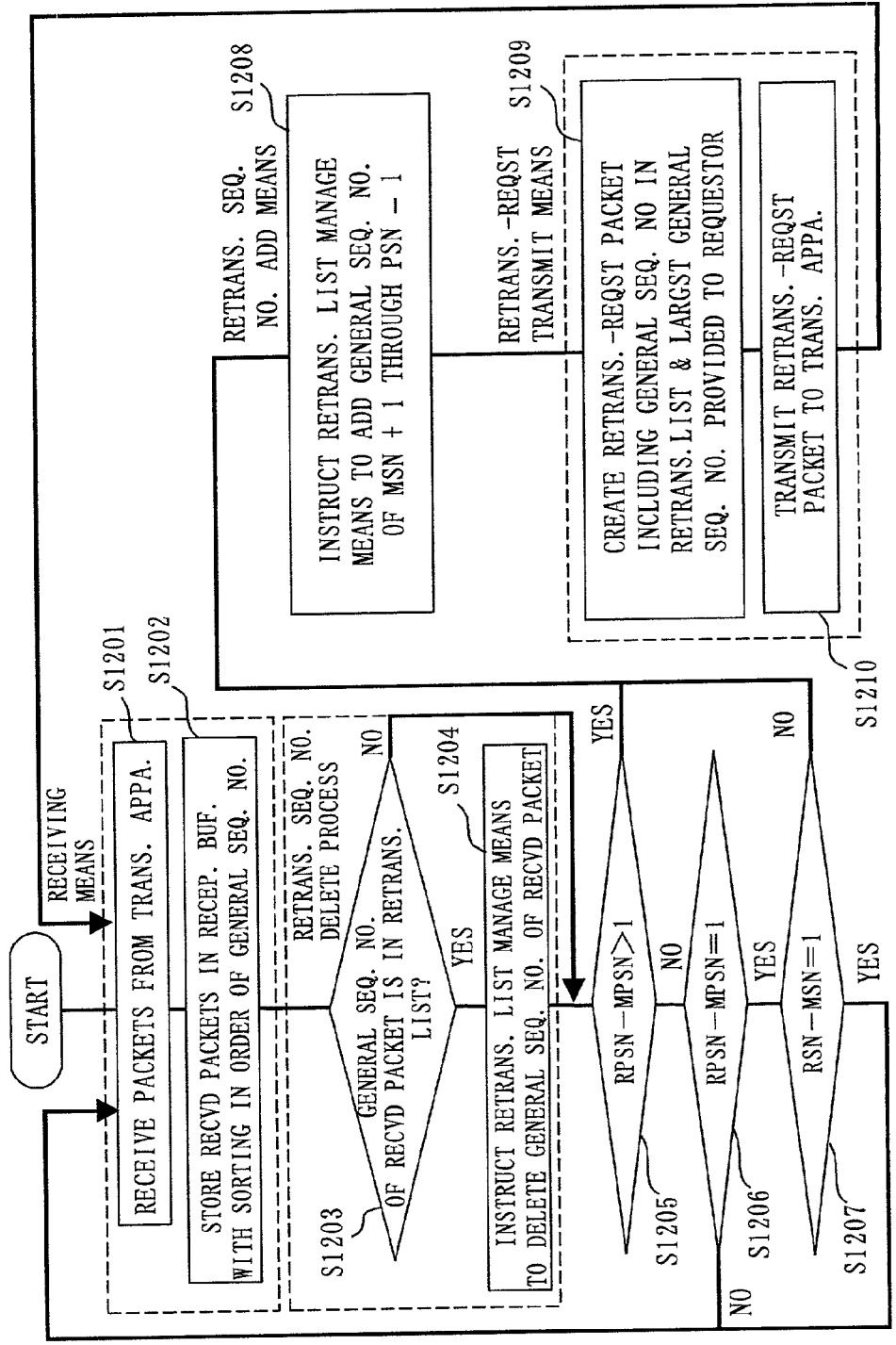
FIG. 12 shows a flowchart of packet receiving (Example 2) of the reception apparatus according to Embodiment 2.
Figure 13:
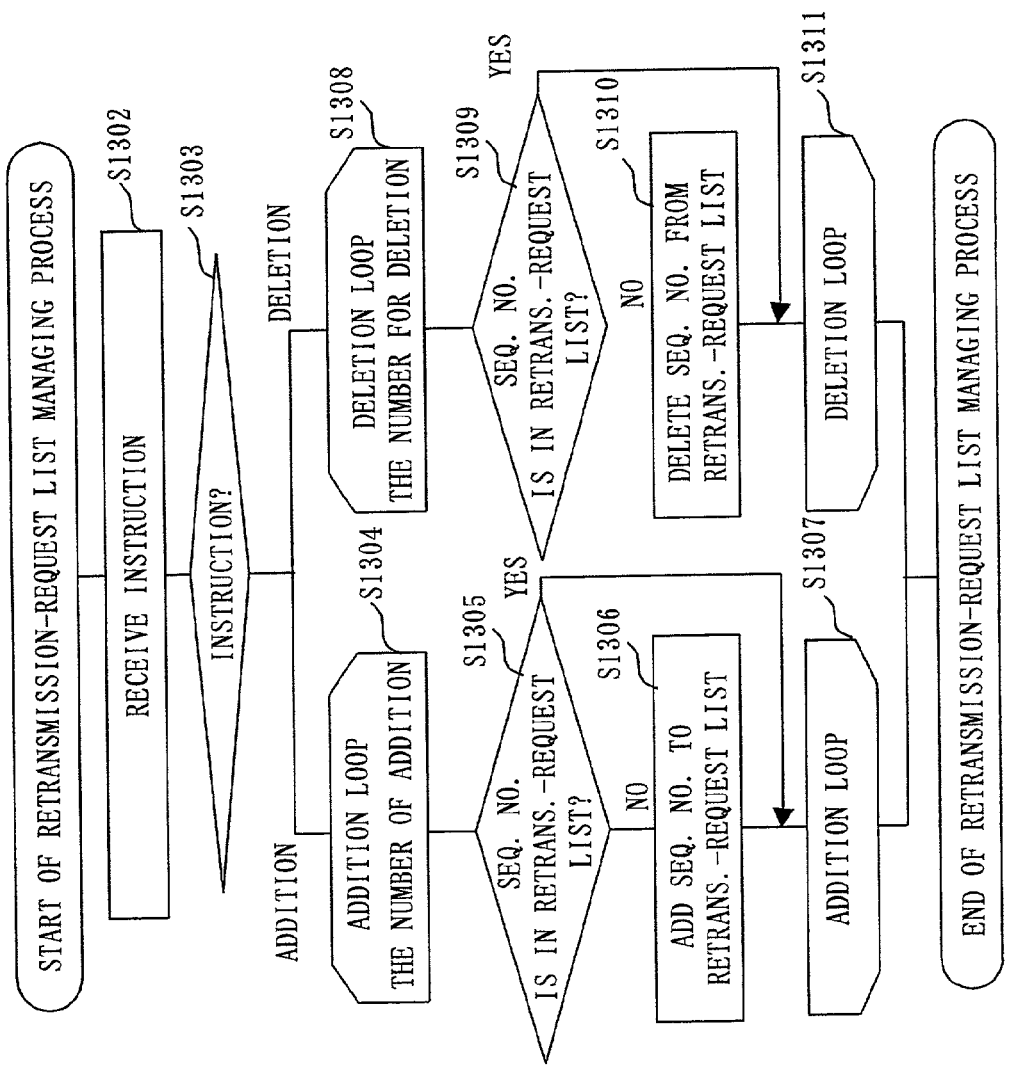
FIG. 13 shows a flowchart of a retransmission-request list managing process of the reception apparatus according to Embodiment 2.

FIG. 10 is a flowchart explaining the transmission apparatus, and FIGS. from 11 to 15 are flowcharts explaining the reception apparatus. FIGS. 11 and 12 illustrate two examples of process flow from the process of the receiving means receiving a packet to the process of the retransmission-request transmitting means performing a retransmission request. FIG. 13 illustrates a process flow of the retransmission list managing means 915 of the reception apparatus.

Figure 14:
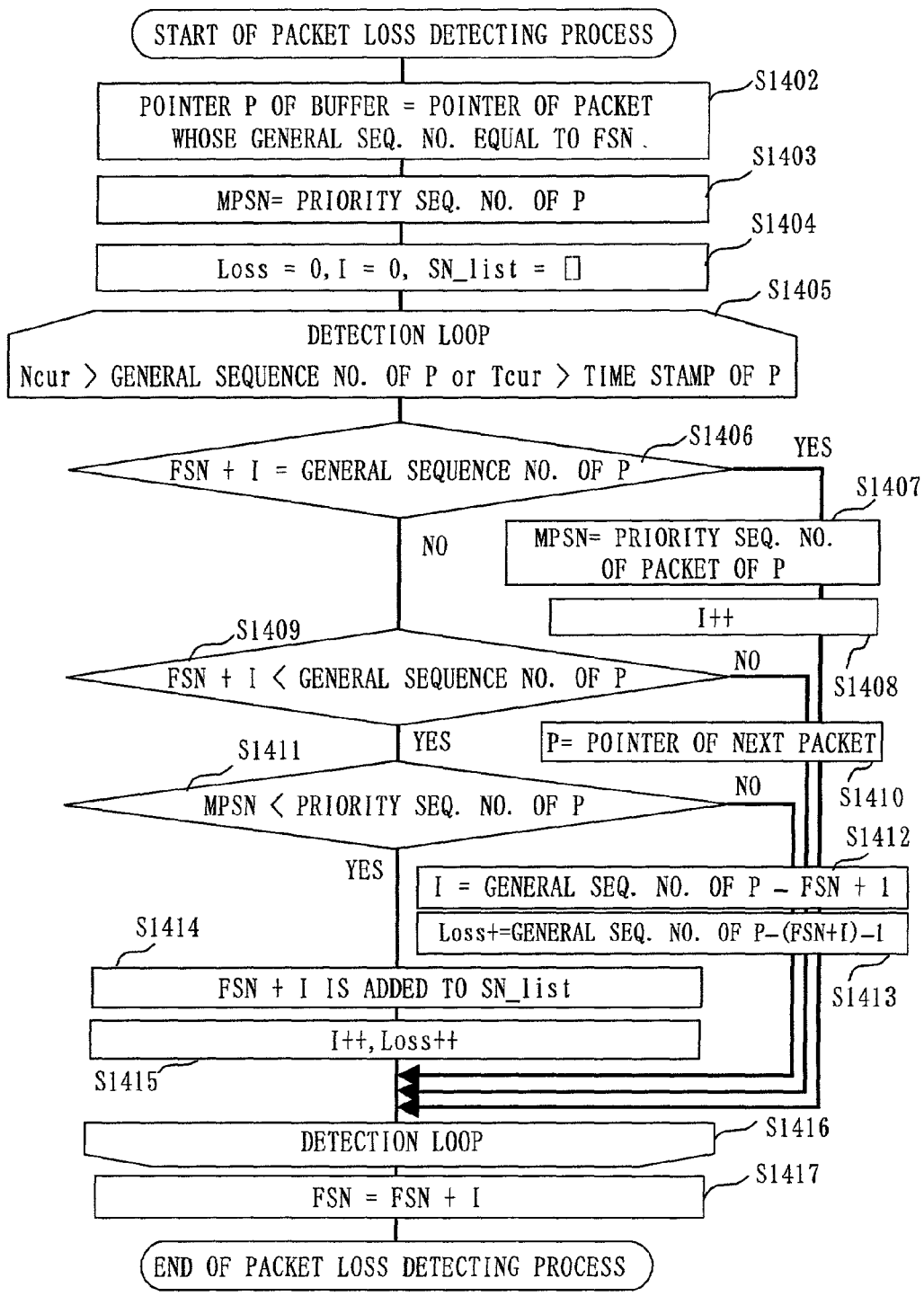
FIG. 14 shows a flowchart of a packet loss detecting process of the reception apparatus according to Embodiment 2.
Figure 15:
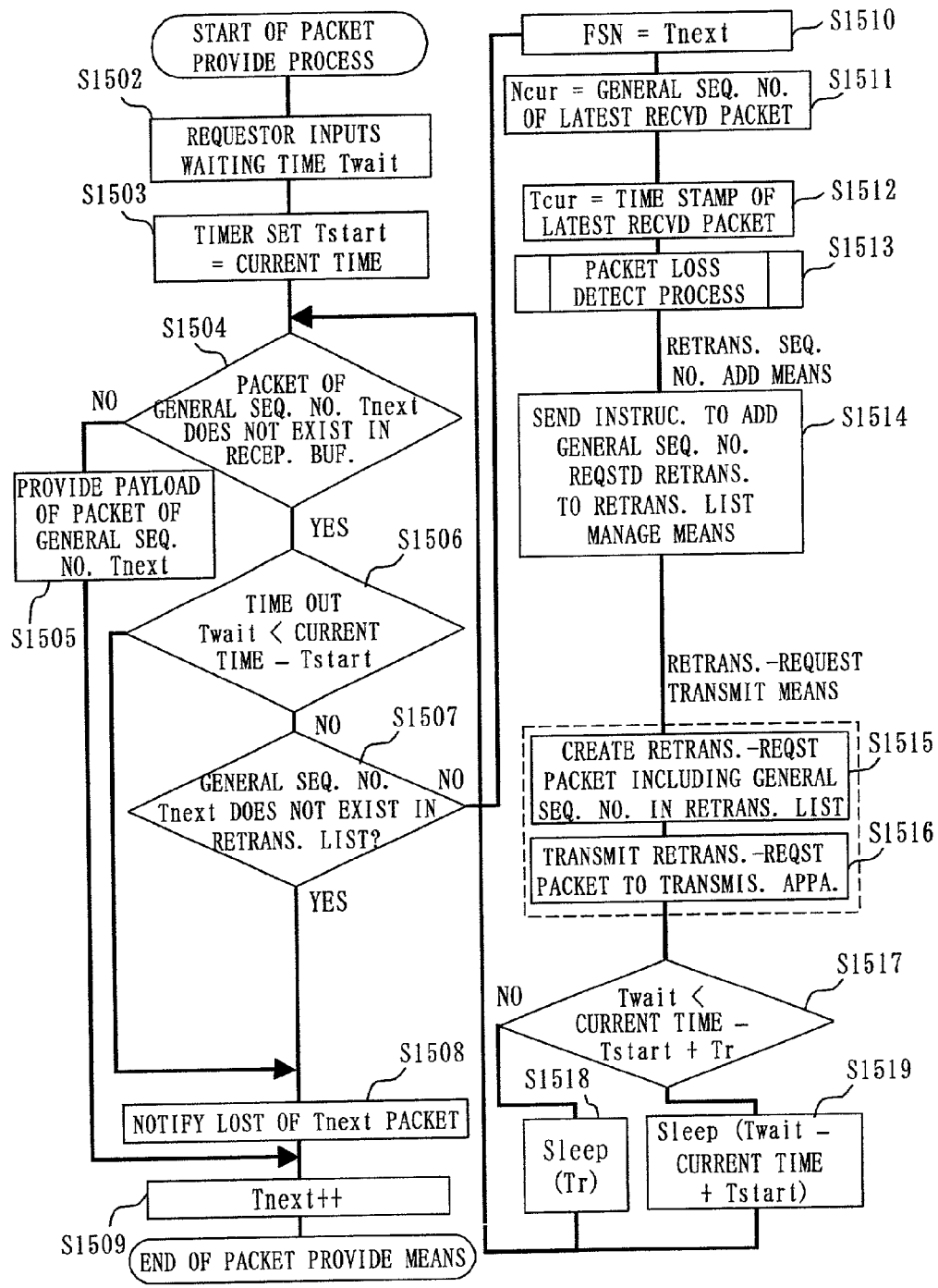
FIG. 15 shows a flowchart of packet providing of the reception apparatus according to Embodiment 2.

FIG. 14 illustrates a process flow of the packet loss detecting means 912 of the reception apparatus. FIG. 15 illustrates a process flow when the requestor (application) 903 requests to be provided a packet through the packet providing means 916.

In the configuration of FIG. 9, the transmission apparatus 901 transmits packets to the reception apparatus 902 (step S1001). The transmission apparatus 901 stores the transmitted packets in the retransmission buffer (step S1002). At this time, it is acceptable to store all the packets in a retransmission buffer 1005 or to store only important packets to be retransmitted in the retransmission buffer 1005. However, if the size of the retransmission buffer 1005 becomes larger than the maximum number of packets, or if the accumulated time amount of the retransmission buffer 1005 becomes more than the maximum time when the time management is performed depending upon time stamps (step S1003), a packet of the smallest general sequence number is deleted from the retransmission buffer 1005 until the size of the retransmission buffer 1005 becomes smaller than the maximum number of packets or the accumulated time amount of the retransmission buffer 1005 becomes less than the maximum time (step S1004).

After receiving the packets from the transmission apparatus 901 as shown in FIG. 11 (step S1101, S1201), the receiving means 910 of the reception apparatus 902 stores the received packets in the reception buffer with sorting them in order of the general sequence number (steps S1102, S1202).

The retransmission sequence number deleting means 911, at every packet receiving time, checks whether the received packet exists in the retransmission list or not. When a general sequence number of the received packet exists in the retransmission list (step S1103, S1203), it indicates that this received packet is a packet which has been retransmitted. Consequently, it is not necessary to request to retransmit this packet any more. Therefore, the retransmission sequence number deleting means 911 sends an instruction to delete the general sequence number of this received packet to the retransmission list managing means 915 (step S1104, S1204).

After having received a specific number of packets, the packet loss detecting means 912 checks whether there is a lost packet or not. This checking process is called a packet loss detecting process. Two examples of the packet loss detecting process performed by the packet loss detecting means 912 after the packet reception will be explained. As shown in the flowchart of FIG. 11 (Example 1), the interval of the packet loss detecting process (step S1108) by the packet loss detecting means 912 is decided based on, for instance, a difference between the general sequence number or the time stamp of the last packet in the last packet loss detecting process (step S1108) and the general sequence number or the time stamp of the packet being currently received (step S1105). It is supposed that the interval between general sequence numbers for performing the packet loss detecting process (step S1108) is Nint, the interval between the time stamps is Tint, the general sequence number of the last packet in the last packet loss detecting process (step S1108) is Ncur, and the time stamp of the last packet in the last packet loss detecting process (step S1108) is Tcur. When the general sequence number of the packet being currently received by the receiving means 910 is equal to or greater than Ncur+Nint, or when the time stamp of the packet being currently received by the receiving means 910 is equal to or greater than Tcur+Tint (step S1105), the packet loss detecting process (step S1108) is performed after substituting the general sequence number and the time stamp of the packet being currently received for Ncur and Tcur (steps S1106, S1107). Namely, the values of Ncur and Tcur become the last general sequence number and the last time stamp of the new packets being currently received. Regarding the Nint and Tint, it is acceptable to use fixed values for them or to decide variable values for them depending upon the congestion status of the network.

Referring to the reception buffer in which packets are sorted in order of general sequence number, the packet loss detecting means 912 checks the consistency of the general sequence numbers and the priority sequence numbers and detects a packet loss of high priority to be retransmitted, at the range from the packet coming next after the last packet in the last packet loss detecting process (step S1108) to the packet of the general sequence number of Ncur (the general sequence number of the last packet out of the packets being currently received), but the packet of Ncur being excluded from the range, or to the packet of the time stamp of Tcur (the time stamp of the last packet out of the packets being currently received), but the packet of Tcur being excluded from the range.

FIG. 14 shows a detailed flow of the packet loss detecting process (step S1108) performed by the packet loss detecting means 912. In FIG. 14, the packet loss detecting means 912 firstly sets the pointer of the packet whose general sequence number equals FSN to be P out of packets in the reception buffer (step S1402). FSN is the general sequence number of the packet coming next after the last packet in the last packet loss detecting process. Secondly, the packet loss detecting means 912 retains the priority sequence number of the packet stored in the pointer P, in MPSN (step S1403). MPSN indicates the largest (latest) priority sequence number in the packet loss detecting process.

It is defined that the number of lost packets is Loss, the distance from FSN is I, and a list of general sequence numbers of lost packets of high priority to be retransmitted is $SN_{13}$ list. Loss and FSN are set to be 0 as initial values, and blank (blank list) is set as an initial value of the $SN_{13}$ list (step S1404).

Next, at the range shown in the step 1405 of the packet loss detecting process, that is the range from the packet coming next after the last packet in the last packet loss detecting process (step S1108) to the packet of general sequence number of Ncur (the general sequence number of the last packet out of the packets being currently received), but the packet of Ncur being excluded from the range, or to the packet of time stamp of Tcur (the time stamp of the last packet out of the packets being currently received), but the packet of Tcur being excluded from the range, the general sequence number of the packet stored in the pointer P in the reception buffer is compared with (FSN+I) (step S1406). When (FSN+I) is equal to the general sequence number of the packet stored in the pointer P at the step S1406, it indicates that the packet of the general sequence number of (FSN+I) has been received without loss. The priority sequence number of packet stored in the pointer P is set as the MPSN (step S1407). Then, I is incremented (step S1408), and the pointer of the next packet is set to be P (step S1410). If (FSN+I) is not equal to the general sequence number of the packet stored in the pointer P at the step S1406, it goes to the step S1409. When (FSN+I) is smaller than the general sequence number of the packet stored in the pointer P (step S1409) and MPSN is smaller than the priority sequence number of the packet stored in the pointer P (step 1411), it indicates that the packet of general sequence number (FSN+I) is lost and this lost packet is a packet of high priority to be retransmitted. Then, (FSN+I) is added to the $SN_{13}$ list (step S1414), and I and Loss are incremented (step S1415).

At the step S1411, if MPSN is not smaller than the priority sequence number of the packet stored in the pointer P (step 1411), it indicates that the lost packet has a low priority and is not needed to be retransmitted. Consequently, no retransmission request is performed and the lost general sequence number is not added to the_$SN_{13}$ list.

After the general sequence number comparison is finished (step S1416) at the range shown in the step S1405, that is the range from the packet coming next after the last packet in the last packet loss detecting process (S1108) to the packet of the general sequence number of Ncur (the general sequence number of the last packet out of the packets being currently received), but the packet of Ncur being excluded from the range, or to the packet of time stamp of Tcur (the time stamp of the last packet out of the packets being currently received), but the packet of Tcur being excluded from the range, I is added to FSN and the added FSN is defined to be the starting general sequence number of the next packet loss detecting process (step S1417). In this situation, numbers in the SN_list are the general sequence numbers of the lost packets at the above range which have high priority to be retransmitted, and Loss is the number of lost packets.

FIG. 16 shows an example of the reception buffer in which a packet loss is occurred and the result of the packet loss detecting process execution. In FIG. 16, the reception buffer in the case of Nint=8 is denoted by 1601, the status of FSN, Ncur, I, Loss, and Sn list in the Nth packet loss detecting process is denoted by 1602, and the status of FSN, Ncur, I, Loss, and $Sn_{13}$ list in the (N+1)th packet loss detecting process is denoted by 1603. The packet general sequence numbers in the reception buffer 801 are . . . , 8, 9, 10, 12, 15, 16, 18, 19, 22, 23, 24, 25, 26, . . . , and priority sequence numbers are 4, 4, 5, 7, 7, 8, 8, 9, 10, 11, 11, 11, 12, . . . , and Nint=8 in FIG. 16. In the case of FSN=8 and Ncur=16 at the Nth packet loss detecting process execution (1602), a lost number is detected within the range of general sequence numbers from 8 to 15.

In this example, three general sequence numbers 11, 13, and 14 are omitted, and it is concluded that these three packets are lost. As the priority sequence number of the packet of general sequence number 12 and the priority sequence number of the packet of general sequence number 15 are the same to be 7, it is concluded that no priority packet exists for the general sequence numbers from 12 to 15. Namely, the packets of the general sequence numbers 13 (=12+1) and 14 have low priority not to be retransmitted. Consequently, no retransmission request is performed and no number is added to the SN list. In the (N+1)th packet loss detecting process (step 1603), FSN is to be (Nth FSN+I) =8+8=16 and Ncur is to be (Nth Ncur+Nint)=16+8=24.

In the same way, a lost number is detected within the range of general sequence numbers from 16 to 23. In this example, three general sequence numbers 17, 20, and 21 are omitted, and it is concluded that these three packets are lost. However, as the priority sequence number of the packet of general sequence number 17 and the priority sequence numbers of the packets of general sequence numbers 16 and 18 are the same to be 8, it is concluded that no priority packet exists for the general sequence numbers from 16 to 18. Namely, the packet of the general sequence number 17 (=16+1) has low priority not to be retransmitted. Consequently, no retransmission request is performed and no number is added to the SN_list.

However, as the priority sequence numbers of the packets of general sequence numbers 19 and 22 are 9 and 10, the priority sequence number of the packet of general sequence number 22 is larger by one than that of the packet of general sequence number 19. Therefore, one priority packet exists for the general sequence numbers from 19 to 22. In this case, there is a possibility that one of the lost packets of general sequence numbers 20 and 21 may have high priority to be retransmitted, or another possibility that the packets of general sequence numbers 20 and 21 may have low priority not to be retransmitted because the packet of general sequence number 22 may have high priority to be retransmitted. Namely, when packets are consecutively lost and the priority sequence numbers before and after the lost packets are different, it is impossible to judge which the packet of high priority is. Therefore, general sequence numbers of all the consecutive lost packets are added to the SN_list.

Referring to FIGS. 14 and 16, the operation of the Nth packet loss detecting process will be described in detail. In this case, it is supposed that FSN=8 and Ncur has already been set to be (Nth Ncur+Nint)=8+8=16.

In the Nth packet loss detecting process, the packet loss detecting means 912 sets the pointer of the packet with a general sequence number corresponding to FSN=8 in the reception buffer to be P (step S1402).

The packet loss detecting means 912 sets the priority sequence number 4 of packet stored in the pointer P of the reception buffer as the MPSN (step S1403). Consequently, MPSN=4.

Loss is set to be 0 as an initial value, I is set to be 0 as an initial value, and $SN_{13}$ list is set to be 0 as an initial value. (step S1404).

In the range of P<Ncur=16, the following process is executed (step S1405). First, FSN+I is compared with the general sequence number stored in the pointer P (step S1406). As the result of the comparison of FSN+I=8+0=8 and the general sequence number stored in the pointer P being 8, it is concluded that "FSN+I=the general sequence number stored in the pointer P", and it goes to the step S1407. The priority sequence number 4 of packet stored in the pointer P is set as MPSN (step S1407), and the pointer of the next packet is set based on incrementing I by 1 (step S1408) and also incrementing the pointer P by 1 (step S1410). Consequently, I=1, MPSN=4, and the general sequence number stored in the pointer P is 9.

Then, it goes back to the loop, and FSN+I is compared with the general sequence number stored in the pointer P (step S1406). As the result of the comparison of FSN+I=8+ 1=9 and the general sequence number stored in the pointer P being 9, it is concluded that "FSN+I=the general sequence number stored in the pointer P", and it goes to the step S1407 and the priority sequence number 4 of packet stored in the pointer P is set as MPSN (step S1407). The pointer of the next packet is set based on incrementing I by 1 (step S1408) and also incrementing the pointer P by 1 (step S1410). Consequently, I=2, MPSN=4, and the general sequence number stored in the pointer P is 10.

Again, it goes back to the loop, and FSN+I is compared with the general sequence number stored in the pointer P (step S1406). As the result of the comparison of FSN+I=8+ 2=10 and the general sequence number stored in the pointer P being 10, it is concluded that "FSN+I=the general sequence number stored in the pointer P", and it goes to the step S1407. The priority sequence number 4 of packet stored in the pointer P is set as the MPSN (step S1407). The pointer of the next packet is set based on incrementing I by 1 (step S1408) and also incrementing the pointer P by 1 (step S1410). Consequently, I=3, MPSN=5, and the general sequence number stored in the pointer P is 12.

Again, it goes back to the loop, and FSN+I is compared with the general sequence number stored in the pointer P (step S1406). As the result of the comparison of FSN+I=8+3=11 and the general sequence number stored in the pointer P being 12, it is concluded that "FSN+I≠the general sequence number stored in the pointer P", and it goes to the step S1409. At the step S1409, it is concluded, as the result of the comparison, that "FSN+1<the general sequence number stored in the pointer P", and it goes to the step S1411. At the step S1411, MPSN is compared with the priority sequence number of packet stored in the pointer P. Since MPSN=5 and the priority sequence number of packet stored in the pointer P is 7, it is concluded, as the result of the comparison, that "MPSN<the priority sequence number of packet stored in the pointer P", and it goes to the step S1414. At the step S1414, FSN+I=8+3=11 is added to the $SN_{13}$ list. Consequently, the value of the SN list is switched to 11 from the blank. I is incremented by 1 and Loss is also incremented by 1 (step S1415). As a result, I=4 and Loss=1.

Then, it goes back to the loop, and FSN+I is compared with the general sequence number stored in the pointer P (step S1406). As the result of the comparison of FSN+I=8+4=12 and the general sequence number stored in the pointer P being 12, it is concluded that "FSN+I=the general sequence number stored in the pointer P", and it goes to the step S1407. The priority sequence number 7 of packet stored in the pointer P is set as the MPSN (step S1407). The pointer of the next packet is set based on incrementing I by 1 (step S1408) and also incrementing the pointer P by 1 (step S1410). Consequently, I=5, MPSN=7, and the general sequence number stored in the pointer P is 15.

Again, it goes back to the loop, and FSN+I is compared with the general sequence number stored in the pointer P (step S1406). As the result of the comparison of FSN+I=8+5=13 and the general sequence number stored in the pointer P being 15, it is concluded that "FSN+I≠the general sequence number stored in the pointer P", and it goes to the step S1409. At the step S1409, it is concluded, as the result of the comparison, that "FSN+1<the general sequence number stored in the pointer P", and it goes to the step S1411.

At the step S1411, MPSN is compared with the priority sequence number of packet stored in the pointer P. Since MPSN=7 and the priority sequence number of packet stored in the pointer P is 7, it is concluded, as the result of the comparison, that "MPSN=the priority sequence number of packet stored in the pointer P", and it goes to the step S1412. At the step S1412, (the general sequence number of packet stored in the pointer P)–FSN=15–8=7 is set as I (step S1412). (The general sequence number of packet stored in the pointer P)–(FSN+I)=15–13=2 is set as the Loss (step S1413). As a result, I=7 and Loss=2. The packets of general sequence numbers 13 and 14 are not added to the $Sn_{13}$ list.

Then, it goes back to the loop, and FSN+I is compared with the general sequence number stored in the pointer P (step S1406). As the result of the comparison of FSN+I=8+7=15 and the general sequence number stored in the pointer P being 15, it is concluded that "FSN+I=the general sequence number stored in the pointer P", and it goes to the step S1407. The priority sequence number 7 of packet stored in the pointer P is set as the MPSN (step S1407). The pointer of the next packet is set based on incrementing I by 1 (step S1408) and also incrementing the pointer P by 1 (step S1410). Consequently, I=8, MPSN=7, and the general sequence number stored in the pointer P is 16. As this does not meet the loop condition Ncur>P, it goes out of the loop, and FSN+I=8+8=16 is set to be FSN (step S1417).

Namely, as the value in SN list is 11, the packet loss detecting means 912 detects that the packet of the general sequence number of 11 has been lost.

(N+1)th operation is performed in the same way.

Referring to FIGS. 14 and 16, the operation of the (N+1)th packet loss detecting process will be described in detail. In this case, it is supposed that FSN=16 and Ncur has already been set to be (Nth Ncur+Nint)=16+8=24.

In the (N+1)th packet loss detecting process, the packet loss detecting means 912 sets the pointer of the packet with a general sequence number corresponding to FSN=16 in the reception buffer to be P (step S1402).

The packet loss detecting means 912 sets the priority sequence number 8 of packet stored in the pointer P of the reception buffer as the MPSN (step S1403). Consequently, MPSN=8.

Loss is set to be 0 as an initial value, I is set to be 0 as an initial value, and $SN_{13}$ list is set to be 0 as an initial value. (step S1404).

In the range of P<Ncur=24, the following process is executed (step S1405). First, FSN+I is compared with the general sequence number stored in the pointer P (step S1406). As the result of the comparison of FSN+I=16+0=16 and the general sequence number stored in the pointer P being 16, it is concluded that "FSN+I=the general sequence number stored in the pointer P", and it goes to the step S1407. The priority sequence number 8 of packet stored in the pointer P is set as MPSN (step S1407), and the pointer of the next packet is set based on incrementing I by 1 (step S1408) and also incrementing the pointer P by 1 (step S1410). Consequently, I=1, MPSN=8, and the general sequence number stored in the pointer P is 18.

Then, it goes back to the loop, and FSN+I is compared with the general sequence number stored in the pointer P again (step S1406). As the result of the comparison of FSN+I=16+1=17 and the general sequence number stored in the pointer P being 18, it is concluded that "FSN+I≠the sequence number stored in the pointer P", and it goes to the step S1409. At the step S1409, it is concluded, as the result of the comparison, that "FSN+1<the general sequence number stored in the pointer P", and it goes to the step S1411. At the step S1411, MPSN is compared with the priority sequence number of packet stored in the pointer P. Since MPSN=8 and the priority sequence number of packet stored in the pointer P is 8, it is concluded, as the result of the comparison, that "MPSN=the priority sequence number of packet stored in the pointer P", and it goes to the step S1412. At the step S1412, (the general sequence number of packet stored in the pointer P)–FSN=18–16=2 is set as I (step S1412). (The general sequence number of packet stored in the pointer P)–(FSN+I)=18–17=1 is set as the Loss (step S1413). As a result, I=2 and Loss=1. The packet of general sequence number 17 is not added to the $SN_{13}$ list.

Then, it goes back to the loop, and FSN+I is compared with the general sequence number stored in the pointer P (step S1406). As the result of the comparison of FSN+I=16+2=18 and the general sequence number stored in the pointer P being 18, it is concluded that "FSN+I=the general sequence number stored in the pointer P", and it goes to the step S1407. The priority sequence number 8 of packet stored in the pointer P is set as the MPSN (step S1407). The pointer of the next packet is set based on incrementing I by 1 (step S1408) and also incrementing the pointer P by 1 (step S1410). Consequently, I=3, MPSN=8, and the general sequence number stored in the pointer P is 19.

Then, it goes back to the loop, and FSN+I is compared with the general sequence number stored in the pointer P (step S1406). As the result of the comparison of FSN+I=16+3=19 and the general sequence number stored in the pointer P being 19, it is concluded that "FSN+I=the general sequence number stored in the pointer P", and it goes to the step S1407. The priority sequence number 9 of packet stored in the pointer P is set as the MPSN (step S1407). The pointer of the next packet is set based on incrementing I by 1 (step S1408) and also incrementing the pointer P by 1 (step S1410). Consequently, I=4, MPSN=8, and the general sequence number stored in the pointer P is 22.

Again, it goes back to the loop, and FSN+I is compared with the general sequence number stored in the pointer P (step S1406). As the result of the comparison of FSN+I=16+4=20 and the general sequence number stored in the pointer P being 22, it is concluded that "FSN+I≠the general sequence number stored in the pointer P", and it goes to the step S1409. At the step S1409, it is concluded, as the result of the comparison, that "FSN+I<the general sequence number stored in the pointer P", and it goes to the step S1411. At the step S1411, MPSN is compared with the priority sequence number of packet stored in the pointer P. Since MPSN=8 and the priority sequence number of packet stored in the pointer P is 10, it is concluded, as the result of the comparison, that "MPSN<the priority sequence number of packet stored in the pointer P", and it goes to the step S1414. At the step S1414, FSN+I=16+4=20 is added to the $SN_{13}$ list. Consequently, the value of the SN_list is switched to 20 from the blank. I is incremented by 1 and Loss is also incremented by 1 (step S1415). As a result, I=5 and Loss=2.

Then, it goes back to the loop, and FSN+I is compared with the general sequence number stored in the pointer P (step S1406). As the result of the comparison of FSN+I=16+5=21 and the general sequence number stored in the pointer P being 22, it is concluded that "FSN+I≠the general sequence number stored in the pointer P", and it goes to the step S1409. At the step S1409, it is concluded, as the result of the comparison, that "FSN+1<the general sequence number stored in the pointer P", and it goes to the step S1411. At the step S1411, MPSN is compared with the priority sequence number of packet stored in the pointer P. Since MPSN=8 and the priority sequence number of packet stored in the pointer P is 10, it is concluded, as the result of the comparison, that "MPSN<the priority sequence number of packet stored in the pointer P", and it goes to the step S1414. At the step S1414, FSN+I=16+5=21 is added to the $SN_{13}$ list. Consequently, the value of the SN_list is switched to "20 and 21" from "20". I is incremented by 1 and Loss is also incremented by 1 (step S1415). As a result, I=6 and Loss=3.

Then, it goes back to the loop, and FSN+I is compared with the general sequence number stored in the pointer P (step S1406). As the result of the comparison of FSN+I=16+6=22 and the general sequence number stored in the pointer P being 22, it is concluded that "FSN+I=the general sequence number stored in the pointer P", and it goes to the step S1407. The priority sequence number 10 of packet stored in the pointer P is set as the MPSN (step S1407). The pointer of the next packet is set based on incrementing I by 1 (step S1408) and also incrementing the pointer P by 1 (step S1410). Consequently, I=7, MPSN=10, and the general sequence number stored in the pointer P is 23.

Again, it goes back to the loop, and FSN+I is compared with the general sequence number stored in the pointer P again (step S1406). As the result of the comparison of FSN+I=16+7=23 and the general sequence number stored in the pointer P being 23, it is concluded that "FSN+I=the general sequence number stored in the pointer P", and it goes to the step S1407. The priority sequence number 11 of packet stored in the pointer P is set as the MPSN (step S1407). The pointer of the next packet is set based on incrementing I by 1 (step S1408) and also incrementing the pointer P by 1 (step S1410). Consequently, I=8, MPSN=11, and the general sequence number stored in the pointer P is 24.

As this does not meet the loop condition Ncur>P, it goes out of the loop, and FSN+I=16+8=24 is set to be FSN (step S1417).

Namely, as the values of $SN_{13}$ list are "20 and 21", the packet loss detecting means 912 detects that the packets of the general sequence numbers 20 and 21 have been lost.

After executing the packet loss detecting process (step S1108), when Loss>0, it is concluded that the packet loss is detected. Then, the retransmission sequence number adding means 913 sends an instruction to add the general sequence number of the lost packet registered in the SN_list to the retransmission list managing means 915 (step S1109). As shown in FIG. 13, receiving the add instruction, the retransmission list managing means 915 adds the general sequence number in the SN_list to the retransmission list (steps S1302 through S1307). In this case, no double registration is performed.

Going back to FIG. 11, the retransmission-request transmitting means 914 sends a retransmission-request about the general sequence numbers in the retransmission list to the transmission apparatus 901 (steps S1110, S1111). In this case, the retransmission-request transmitting means 914 puts the general sequence numbers in the retransmission list and the largest (latest) general sequence number of packet provided to the requestor (application) 903 at that time in one retransmission-request packet (step S1110) and transmits the retransmission-request packet to the transmission apparatus 901 (step s1111).

Next, with reference to the flowchart of FIG. 12 (Example 2), an example of requesting retransmission at the time when a packet having high priority to be retransmitted at the packet is lost will be explained.

In FIG. 12, explanation for the operations of the steps from S1201 to S1203 are omitted because these steps are the same as the steps from S1101 to S1103 in FIG. 11.

First, the priority sequence number RPSN of the received packet is compared with the largest priority sequence number MPSN in the reception buffer (step S1205). When RPSN−MPSN>1 (step S1205), the priority sequence numbers are not consecutive. Namely, it is concluded that one or greater than one packet of high priority to be retransmitted is lost certainly. For example, it is supposed that the packet of general sequence number 10 is kept in the reception buffer of FIG. 16 and the packet of general sequence number 12 is being received now. At this moment, RPSN=7 and MPSN=5. In this case, the priority sequence number is jumped to 7 from 5 to be apparently inconsecutive and RPSN−MPSN>1 (step S1205). Therefore, it is concluded that one or greater than one packet of high priority to be retransmitted is lost certainly. In this case, the packet of general sequence number 11 is lost. In order to request the retransmission of packets between the largest general sequence number MSN in the reception buffer and the general sequence number RSN of the RPSN packet, an instruction to add general sequence numbers from MSN+1 to RSN−1 (in this example, the packet of general sequence number 11) into the retransmission list is sent to the retransmission sequence number adding means (step S1208). In the case of "No" at the step S1205, that is the case RPSN and MPSN are equal or RPSN is larger than MPSN only by one, it is impossible to know whether a packet is lost or not, based only on the priority sequence numbers. However, in the case RPSN and MPSN are equal, even when a packet is lost, it is concluded that the packet is not important to be retransmitted, because the priority sequence number is not increased. If not RPSN−MPSN=1, (that is if RPSN−MPSN=0) (step S1206), it is not necessary to retransmit the packet, therefore, the retransmission sequence number adding process is not performed and it goes back to the step S1201 to perform a receiving process for the next packet (step S1201). At the step S1206, when RPSN−MPSN=1 (step S1206), it is also necessary to compare the general sequence numbers in order to know whether a packet is lost or not. Therefore, MSN is compared with RSN (step S1207). When RSN−MSN=1 (step S1207), it is concluded that no packet is lost because the general sequence numbers are consecutive. As there is no need to retransmit packets, the retransmission sequence number adding process is not performed and it goes back to the step S1201 to perform a receiving process for the next packet (step S1201). When RSN−MSN>1 at the step 1207, it is concluded that one or greater than one packet of high priority to be retransmitted is lost because the general sequence numbers are not consecutive. In order to request the retransmission of packets between MSN and RSN, an instruction to add general sequence numbers of MSN through RSN into the retransmission list is sent to the retransmission sequence number adding means. (step S1208)

As shown in FIG. 13, receiving the add instruction, the retransmission list managing means 915 adds the general sequence numbers in the SN_list to the retransmission list (steps S1302 through S1307). However, no double registration is performed.

Going back to FIG. 12, the retransmission-request transmitting means 914 sends a retransmission-request about the general sequence numbers in the retransmission list, to the transmission apparatus 901 (steps S1209, 1210). In this case, the retransmission-request transmitting means 914 puts the general sequence numbers in the retransmission list and the largest (latest) general sequence number of packet provided to the requester (application) 903 at that time in one retransmission-request packet (step S1209) and transmits this retransmission-request packet to the transmission apparatus 901 (step S1210).

The following explanation is for FIGS. 11 and 12 in common.

As shown in FIG. 10, the retransmission-request receiving means 906 of the transmission apparatus 901 receives the retransmission-request packet (step S1006), and identifies the general sequence number requested to be retransmitted and the largest (latest) general sequence number provided to the requester (application) 903 from the retransmission-request packet (steps S1007 and S1008).

The retransmission buffer deleting means 907 deletes packets of general sequence numbers smaller than the largest (latest) general sequence number provided to the requester (application) 903 in the retransmission buffer, because the packets of general sequence numbers smaller than the largest one are not requested to be retransmitted any more (step S1009).

The retransmission packet detecting means 908 searches the retransmission buffer and detects a general sequence number being equal to the general sequence number requested to be retransmitted (step S1010). This general sequence number indicating a sequence number of the packet of high priority to be retransmitted is called a retransmission sequence number.

The retransmission means 909 re-transfers a packet of the retransmission sequence number to the reception apparatus 902 (step S1011).

The requester (application) 903 requests payload of the packet received by the reception apparatus 902. When the requester (application) 903 requests the payload of the packet and a waiting time for the payload being provided, the packet providing means 916 of the reception apparatus 902 provides payload of the next packet (whose general sequence number is Tnext) coming after the last provided packet before the waiting time has passed. However, if it is impossible to provide the payload of the packet of Tnext within the waiting time because of a packet loss or an absence of retransmission, the packet providing means 916 notifies the requester (application) 903 that the packet of Tnext is lost.

As shown in FIG. 15, when the packet providing means 916 is requested to provide the packet payload and the waiting time for the payload being provided by the requester (application) 903 (step S1502), the packet providing means 916 sets the current time to be Tstart (step S1503), and inquires whether the packet of the general sequence number Tnext exists in the reception buffer or not (step S1504). When the packet of Tnext exists in the reception buffer, the packet providing means 119 provides the payload for the packet of Tnext (step S1505).

When the packet of Tnext does not exist in the reception buffer, the time-out is checked whether the current time is over the waiting time or not (step S1506). If the time-out case, the packet providing means 916 notifies the requester (application) 903 of the packet of Tnext being lost (step S1508). If not the time-out case, the packet providing means 916 inquires whether the sequence number Tnext exists in the retransmission-request list or not (step S1507).

If the Tnext does not exist in the retransmission list, it indicates that no packet is retransmitted from the transmission apparatus 901 even if the retransmission request is sent to the transmission apparatus. Therefore, the requester (application) 903 is notified of the packet of Tnext being lost (step 1508). If the Tnext exists in the retransmission list, it indicates that the retransmission-request packet does not reach or the retransmission packet does not reach in spite of the retransmission request.

In this case, Tnext is set to be FSN (step 1510), the general sequence number of the latest packet currently received is set to be Ncur (step 1511), and the time stamp of the latest packet currently received is set to be Tcur (step S1512). Then, again, the Tnext is requested to be retransmitted, and the latest packet loss is detected and retransmission is requested for the latest packet loss at the same time, by performing a packet loss detecting process (step S1513), a retransmission sequence number adding process (step S1514), and a retransmission-request transmitting process (step S1515, S1516).

However, in the case that retransmission request is performed at every loss of the packet of high priority to be retransmitted as the Example 2 of the packet loss detecting method described above, when the packet of Tnext does not exist in the reception buffer but exists in the retransmission list at the time of the packet providing means, the packet of Tnext is immediately requested retransmission without performing the packet loss detecting means.

When 0 (zero) is set as the waiting time, the packet providing means 119 inquires only whether the Tnext is in the reception buffer or not. If the Tnext does not exist in the reception buffer, requesting the retransmission of the Tnext packet is not performed. Instead, the requestor (application) 903 is immediately notified of the loss of the packet Tnext. In contrast, when the waiting time is set to be unlimited, if the Tnext does not exist in the reception buffer, the retransmission request is performed several times until the Tnext packet is retransmitted.

In the case that the Tnext does not exist in the retransmission list, requesting the retransmission of the Tnext packet is not performed. Instead, the requestor (application) 903 is notified of the loss of the packet Tnext. After the retransmission request transmitting means having transmitted the retransmission-request packet, the providing means waits for Tr being an interval for performing the retransmission request (step S1518) and inquires whether Tnext is in the reception buffer or not again. It is acceptable to change the Tr at every retransmission request.

At the steps S1517, S1518, and S1519, the waiting time is determined in connection with a sleep time. Referring to a simple example, this will be explained below. It is supposed that Twait=five seconds and Tr=two seconds. In this case, the reception buffer checking and the packet loss detecting process are performed at every two seconds during the five seconds. It is supposed that the packet providing process is started at 0 second, namely Tstart=0. Therefore, the current time passes such as one second, two seconds, three seconds, . . . . Until the current time becomes three seconds, it is judged "No" at the step S1517, and it goes to the step S1518. At the step S1518, it sleeps (delay) for two seconds. Then, after two seconds have passed, the reception buffer checking and the packet loss detecting process are performed again. Namely, the reception buffer checking and the packet loss detecting process can be periodically performed within a permitted time, that is the waiting time. However, after the current time has passed three seconds, it becomes over the waiting time Twait if it further sleeps for two seconds (=Tr). In this case, it sleeps (delay) for the difference time (ex. in the case of the current time being four seconds, the difference time is Twait−current time+Tstart=5−4=1 second) at the step S1519. After the sleep finished, the reception buffer checking is performed, but the packet loss detecting process is not performed because it is judged to be "time-out" at the step S1506. Immediately, the next general sequence number is provided (step S1505), which enables to provide packet data within the waiting time.

According to Embodiment 2, in addition to the effects of Embodiment 1, it is possible to retransmit only important packets having high priority by providing the general sequence number and the priority sequence number to the packet. Accordingly, it is possible to minimize the network load waste generated by the retransmission process, and to secure transmission amount for the packet having high priority even at the network congestion.

Embodiment 3

In addition to the configuration of the transmission apparatus 901 of FIG. 9 according to Embodiment 2, a priority information adding means 1705 is provided in the transmission apparatus, as shown in FIG. 17, according to the configuration of Embodiment 3. The priority information adding means 1705 adds priority information to a packet p. This priority information is information about important packets and packets judged to be retransmitted at a packet loss, which are located in the range of n packets from the packet p. The packet p to which the priority information is added comes every m packets (m≦n). m and n are decided depending upon the congestion status of the network. Except receiving means 1711, packet loss detecting means 1713, and packet providing means 1717 in a reception apparatus 1702, means in this Embodiment 3 perform the same processing as Embodiment 2.

FIG. 18 shows an example of a packet to which the priority information is added by the priority information adding means 1705. The example 1 of FIG. 18 (step 1801), in which n=8 and m=4, shows the case that priority information about the n packets including the packet P and located before the packet P is expressed by n bits. The priority information of n bits is added to the packet P which comes every m packets. In the priority information, the n-th bit from the left indicates the priority of the packet P and the top bit indicates the priority of a packet whose sequence number is [(sequence number of P)−n+1].

According to the above example, in which n=8, when the sequence number of P is 4, the top bit's sequence number in the priority information of P is expressed by:

(sequence number of P)−n+1=4−8+1=−3. Namely, when an integer k is 1≦k≦n, the value of k-th bit from the left indicates the priority of the packet whose sequence number is (sequence number of P)−n+k.

Regarding the priority information 1803 in the above example, the 1-st bit from the left indicates the priority of a packet whose sequence number is:

(sequence number of P)−n+k=4−8+1=−3 (not existing)

the 2-nd bit from the left indicates the priority of a packet whose sequence number is:

(sequence number of P)−n+k=4−8+2=−2 (not existing)

the 3-rd bit from the left indicates the priority of a packet whose sequence number is:

(sequence number of P)−n+k=4−8+3=−1 (not existing)

the 4-th bit from the left indicates the priority of a packet whose sequence number is:

(sequence number of P)−n+k=4−8+4=0 (not existing)

the 5-th bit from the left indicates the priority of a packet whose sequence number is:

(sequence number of P)−n+k=4−8+5=1 the 6-th bit from the left indicates the priority of a packet whose sequence number is:

(sequence number of P)−n+k=4−8+6=2 the 7-th bit from the left indicates the priority of a packet whose sequence number is:

(sequence number of P)−n+k=4−8+7=3 the 8-th bit from the left indicates the priority of a packet whose sequence number is:

(sequence number of P)−n+k=4−8+8=4

When the sequence number of P is 8, the top bit's sequence number in the priority information of P is expressed by:

(sequence number of P)−n+1=8−8+1=1

Therefore, in the priority information 1804, the 1-st bit from the left indicates the priority of a packet whose sequence number is:

(sequence number of P)−n+k=8−8+1=1 the 2-nd bit from the left indicates the priority of a packet whose sequence number is:

(sequence number of P)−n+k=8−8+2=2 the 3-rd bit from the left indicates the priority of a packet whose sequence number is:

(sequence number of P)−n+k=8−8+3=3

. . . , the 8-th bit from the left indicates the priority of a packet whose sequence number is:

(sequence number of P)−n+k=8−8+8=8

When the sequence number of P is 12, the top bit's sequence number in the priority information of P is expressed by:

(sequence number of P)−n+1=12−8+1=5

Therefore, in the priority information 1805, the 1-st bit from the left indicates the priority of a packet whose sequence number is:

(sequence number of P)−n+k=12−8+1=5 the 2-nd bit from the left indicates the priority of a packet whose sequence number is:

(sequence number of P)−n+k=12−8+2=6 the 3-rd bit from the left indicates the priority of a packet whose sequence number is:

(sequence number of P)−n+k=12−8+3=7

. . . , the 8-th bit from the left indicates the priority of a packet whose sequence number is:

(sequence number of P)−n+k=12−8+8=12

When the sequence number of P is 16, the top bit's sequence number in the priority information of P is expressed by:

(sequence number of P)−n+1=16−8+1=9

Therefore, in the priority information 1806, the 1-st bit from the left indicates the priority of a packet whose sequence number is:

(sequence number of P)−n+k=16−8+1=9 the 2-nd bit from the left indicates the priority of a packet whose sequence number is:

(sequence number of P)−n+k=16−8+2=10 the 3-rd bit from the left indicates the priority of a packet whose sequence number is:

(sequence number of P)−n+k=16−8+3=11

. . . , the 8-th bit from the left indicates the priority of a packet whose sequence number is:

(sequence number of P)−n+k=16−8+8=16

When the k-th bit from the left is 1, it indicates that the packet whose sequence number is [(sequence number of P)−n+k] has a high priority to be retransmitted, and when the k-th bit is 0, it indicates that the packet has a low priority not to be retransmitted. For example, in the priority information 1804 added to the packet of sequence number 8, the packets of sequence numbers 1, 4, 5, and 8 out of the packets of sequence numbers from 1 to 8 have high priority to be retransmitted. Therefore, it can be expressed by 10011001.

The example 2 of FIG. 18 (step 1802), in which n=8 and m=4, shows the case that priority information about n packets including the packet P, which are located in the range of n packets after the packet P is expressed by n bits. The priority information of n bits is added to the packet P which comes every m packets. In the priority information, the k-th bit indicates the priority of a packet whose sequence number is [(sequence number of P)+k−1].

Regarding the priority information 1807 in the above example, in which n=8, when the sequence number of P is 1, the sequence number of the 1-st bit from the left is:

(sequence number of P)+k−1=1+1−1=1, the sequence number of the 2-nd bit from the left is:

(sequence number of P)+k−1=1+2−1=2, the sequence number of the 3-rd bit from the left is:

(sequence number of P)+k−1=1+3−1=3, the sequence number of the 4-th bit from the left is:

(sequence number of P)+k−1=1+4−1=4, the sequence number of the 5-th bit from the left is:

(sequence number of P)+k−1=1+5−1=5, the sequence number of the 6-th bit from the left is:

(sequence number of P)+k−1=1+6−1=6, the sequence number of the 7-th bit from the left is:

(sequence number of P)+k−1=1+7−1=7, the sequence number of the 8-th bit from the left is:

(sequence number of P)+k−1=1+8−1=8.

When the sequence number of P is 5, in the priority information 1808, the sequence number of the 1-st bit from the left is:

(sequence number of P)+k−1=5+1−1=5, the sequence number of the 2-nd bit from the left is:

(sequence number of P)+k−1=5+2−1=6, the sequence number of the 3-rd bit from the left is:

(sequence number of P)+k−1=5+3−1=7,

. . . , the sequence number of the 8-th bit from the left is:

(sequence number of P)+k−1=5+8−1=12.

When the sequence number of P is 9, in the priority information 1805, the sequence number of the 1-st bit from the left is:

(sequence number of P)+k−1=9+1−1=9, the sequence number of the 2-nd bit from the left is:

(sequence number of P)+k−1=9+2−1=10, the sequence number of the 3-rd bit from the left is:

(sequence number of P)+k−1=9+3−1=11,

. . . , the sequence number of the 8-th bit from the left is:

(sequence number of P)+k−1=9+8−1=16.

When the sequence number of P is 13, in the priority information 1810, the sequence number of the 1-st bit from the left is:

(sequence number of P)+k−1=13+1−1=13, the sequence number of the 2-nd bit from the left is:

(sequence number of P)+k−1=13+2−1=14, the sequence number of the 3-rd bit from the left is:

(sequence number of P)+k−1=13+3−1=15,

. . . , the sequence number of the 8-th bit from the left is:

(sequence number of P)+k−1=13+8−1=20.

It is also acceptable to dynamically set n and m depending upon the congestion status of the network. For instance, as a packet loss would often occur in the congestion status, by way of making n large and m small, the priority information missing caused by the packet loss can be prevented at the reception apparatus side.

The packet loss detecting means 1713 according to Embodiment 3 detects the sequence number of a lost important packet or of a packet judged to be retransmitted at the packet loss time, based upon the sequence number of the packet in the reception buffer or of the received packet and upon the priority information added by the priority information adding means in the transmission apparatus. This detection by the packet loss detecting means 1713 is performed at intervals depending upon the number of times of receiving packets and a receiving time, and at the time of finding the important packet loss based on sequence number inconsistency.

The receiving means performs the same processing as the one in Embodiment 2. However, after receiving a packet to which priority information is added, the process of updating the priority information table is performed.

Figure 19:
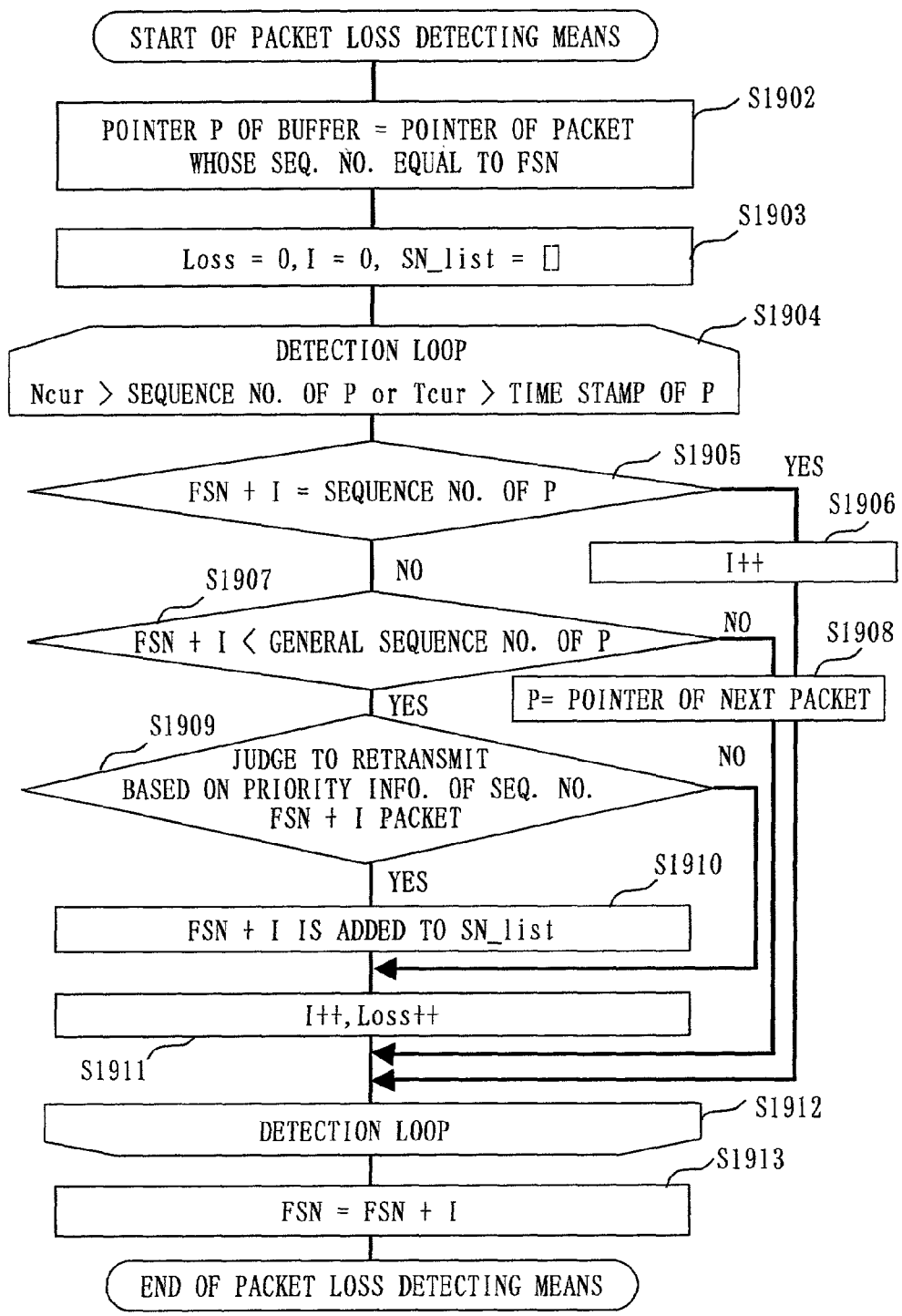
FIG. 19 shows a flowchart of a packet loss detecting process of a reception apparatus according to Embodiment 3.

FIG. 19 is a flowchart showing a flow example of the packet loss detecting means of the reception apparatus according to Embodiment 3, and FIG. 20 shows an example of a packet loss and the packet loss detecting means.

The interval of the packet loss detecting process by the packet loss detecting means 1713 is decided based on, for instance, a difference between the sequence number or the time stamp of the last packet in the last packet loss detecting process and the sequence number or the time stamp of the packet being currently received. It is also acceptable to perform the packet loss detecting process at every packet loss time. It is supposed that the interval between the sequence numbers for performing the packet loss detecting process is Nint, the interval between the time stamps is Tint, the sequence number of the last packet in the last packet loss detecting process by the packet loss detecting means is Ncur, and the time stamp of the last packet in the last packet loss detecting process is Tcur.

When the sequence number of the packet being currently received by the receiving means is equal to or greater than Ncur+Nint, or when the time stamp of the packet being currently received by the receiving means is equal to or greater than Tcur+Tint, the packet loss detecting process (step S306) is performed after substituting the sequence number and the time stamp of the packet being currently received for Ncur and Tcur. By this substitution, the values of Ncur and Tcur become the last sequence number and the last time stamp of the new packets being currently received. Regarding Nint and Tint, it is acceptable to use fixed values for them or to decide variable values for them depending upon the congestion status of the network.

Referring to the reception buffer in which packets are sorted in order of sequence number, the packet loss detecting means 1713 checks the consistency of the sequence numbers and the priority information and detects a lost packet of high priority to be retransmitted, at the range from the packet coming next after the last packet in the last packet loss detecting process to the packet of the sequence number of Ncur (the sequence number of the last packet out of the packets being currently received), but the packet of Ncur being excluded from the range, or to the packet of the time stamp of Tcur (the time stamp of the last packet out of the packets being currently received), but the packet of Tcur being excluded from the range.

FIG. 19 shows a detailed flow of the packet loss detecting process performed by the packet loss detecting means 1713. In FIG. 19, the packet loss detecting means 1713 firstly sets the pointer of the packet whose sequence number equals FSN to be P out of packets in the reception buffer (step S1902). FSN is the sequence number of the packet coming next after the last packet in the last packet loss detecting process. It is defined that the number of lost packets is Loss, the distance from FSN is I, and a list of sequence numbers of lost packets having high priority to be retransmitted is $SN_{13}$ list. Loss and FSN are set to be 0 as initial values, and blank (blank list) is set as an initial value of the $SN_{13}$ list (step S1903).

Next, at the range shown in the step 1904 of the packet loss detecting process, that is the range from the packet coming next after the last packet in the last packet loss detecting process to the packet of sequence number of Ncur (the sequence number of the last packet out of the packets being currently received), but the packet of Ncur being excluded from the range, or to the packet of time stamp of Tcur (the time stamp of the last packet out of the packets being currently received), but the packet of Tcur being excluded from the range, the sequence number of the packet stored in the pointer P in the reception buffer is compared with FSN+I (step S1905). When FSN+I is equal to the sequence number of the packet stored in the pointer P at the step S1905, it indicates that the packet of the sequence number of FSN+I has been received without loss. Then, I is incremented (step S1906), and the pointer of the next packet is set to be P (step S1908).

If FSN+I is not equal to the sequence number of the packet stored in the pointer P at the step S1905, it goes to the step S1907. When FSN+I is smaller than the sequence number of the packet stored in the pointer P (step S1907), it indicates that the packet of sequence number of FSN+I is lost. Then, it goes to the step S1909. At the step S1909, it is judged whether the priority information of the packet of sequence number FSN+I in the priority information table 2001 should be retransmitted or not. (step S1909). If it is judged based on the priority information that the packet of sequence number FSN+I is a packet of high priority to be retransmitted (step 1909), FSN+I is added to the SN list (step S1910), and I and Loss are incremented (1911) in order to request the retransmission of the sequence number FSN+I. If it is judged based on the priority information that the packet of sequence number FSN+I is a packet of low priority not to be retransmitted (step 1909), the retransmission request is not performed. Therefore, FSN+I is not added to the $Sn_{13}$ list, and I and Loss are incremented (step 1911).

After the sequence number comparison is finished (step S1912) at the range shown in the step S1904, that is the range from the packet coming next after the last packet in the last packet loss detecting process to the packet of the sequence number of Ncur (the sequence number of the last packet out of the packets being currently received), but the packet of Ncur being excluded from the range, or to the packet of time stamp of Tcur (the time stamp of last packet out of the packets being currently received), but the packet of Tcur being excluded from the range, I is added to FSN (step 1913) and the added FSN is defined to be the starting sequence number of the next packet loss detecting process (step S511). In this situation, numbers in the SN_list are the sequence numbers of the lost packets at the above range and Loss is the number of lost packets.

FIG. 20 shows an example of the reception buffer in which a packet loss is occurred and the result of the packet loss detecting process execution. In FIG. 20, a priority information table 2001 is shown in which a sequence number corresponds to priority information which is assigned based on the importance degree of packet of the sequence number. The reception buffer in the case of Nint=8 is denoted by 2002, the status of FSN, Ncur, I, Loss, and $Sn_{13}$ list in the Nth packet loss detecting process is denoted by 2003, and the status of FSN, Ncur, I, Loss, and $Sn_{13}$ list in the (N+1)th packet loss detecting process is denoted by 2004.

In the packet loss example of FIG. 20, the packet sequence numbers in the reception buffer 2002 are . . . , 8, 9, 10, 12, 15, 16, 18, 19, 22, 23, 24, 25, 26, . . . , the priority information is shown as the priority information table 2001, and Nint=8. In the case of FSN=8 and Ncur=16 at the Nth packet loss detecting process execution (step 2003), a lost number is detected within the range of sequence numbers from 8 to 15. In the priority information, 1 indicates a packet of high priority to be retransmitted and 0 indicates a packet of low priority not to be retransmitted.

In this example, three sequence numbers 11, 13, and 14 are omitted, and it is concluded that these three packets are lost. As the priority information of the packet of sequence number 11 is 1, it is concluded that this packet has a high priority to be retransmitted and 11 is added to the SN_list. However, since the priority information of the packets of sequence numbers 13 and 14 is 0, it is concluded that the priority of these packets is low not to be retransmitted. As no retransmission request is performed, the numbers are not added to the SN_list. In the (N+1)th packet loss detecting process (step 2004), FSN is (Nth FSN+I)=8+8=16 and Ncur is (Nth Ncur+Nint)=16+8=24. In the same way, a lost number is detected within the range of sequence numbers from 16 to 24. In this example, three sequence numbers 17, 20, and 21 are omitted, and it is concluded that these three packets are lost.

As the priority information of the packet of sequence number 21 is 1, it is concluded that this packet has a high priority to be retransmitted and 21 is added to the SL list. However, since the priority information of the packets of sequence numbers 17 and 20 is 0, it is concluded that the priority of these packets is low not to be retransmitted. As no retransmission request is performed, the numbers are not added to the SN_list.

After the packet loss detecting means, when Loss>0, it indicates that a packet loss is detected. Then, the retransmission sequence number adding means sends an instruction to add the sequence number to the SN_list, to the retransmission-request list managing means. The packet providing means, which is the same as the one in Embodiment 2, deletes the priority information of sequence numbers smaller than the sequence number of the last provided packet, from the priority information table.

According to Embodiment 3, in addition to the effects of Embodiments 1 and 2, as the priority information adding means is provided, the total transmission amount can be less than the case of providing priority sequence numbers to all the transmission packets. Besides, the priority of the packet lost at the reception apparatus can be recognized more accurately. Then, the retransmission-request response packet by the retransmission-request responding means described in claim 5 becomes unnecessary, which reduces the waste of the network and the load of responding to the retransmission request in the transmission apparatus. By dint of adjusting data size of the priority information and frequency of sending the priority information, it has an effect that the missing of priority information caused by packet loss at the reception apparatus side hardly happens even at the network congestion.

INDUSTRIAL APPLICABILITY

As stated above, the packet retransmission system according to the present invention is suitable for the communication of high reliability with making much of real time, in the transfer of high real-time data such as video and a speech.

The invention claimed is:

1. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the transmission apparatus comprising:

a retransmission buffer for storing one or more packets, which have been transmitted to the reception apparatus;

retransmission-request receiving means for identifying the sequence number and a latest sequence number provided to the request application unit, in a retransmission-request packet received from the reception apparatus, and notifying the sequence number and the latest sequence number;

retransmission packet detecting means for detecting whether a notified sequence number exists in the retransmission buffer;

retransmission buffer deleting means for comparing the sequence numbers of the packets stored in the retransmission buffer to the latest sequence number notified by the retransmission-request receiving means, and deleting packets from the retransmission buffer based on the comparison; and retransmission means for retransmitting all packets detected by the retransmission packet detecting means to the reception apparatus.

2. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the reception apparatus comprising:

a reception buffer for storing packets with added sequence numbers received from the transmission apparatus;

receiving means for storing the packets received from the transmission apparatus in the reception buffer, the packets being stored in order of the sequence numbers;

packet loss detecting means for detecting a lost packet;

retransmission sequence number adding means for sending an instruction to add the sequence number of the lost packet detected by the packet loss detecting means to a retransmission-request list;

retransmission-request list managing means for adding the sequence number to the retransmission-request list based on the instruction to add;

retransmission-request transmitting means for putting the sequence number stored in the retransmission-request list, in a retransmission-request packet and sending the retransmission-request packet to the transmission apparatus; and packet providing means for providing the packets in the reception buffer to the request application unit, wherein the retransmission-request transmitting means is operable to include a latest sequence number in the retransmission-request packet, the latest sequence number being the sequence number of the packet most recently received and provided to the request application unit.

3. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus at a loss of the packet in packet transmission, wherein the transmission apparatus comprises:

a retransmission buffer for storing one or more packets which have been transmitted to the reception apparatus;

retransmission-request receiving means for identifying the sequence number and a latest sequence number provided to the request application unit, in a retransmission-request packet received from the reception apparatus, and notifying the sequence number and the latest sequence number;

retransmission packet detecting means for detecting whether a notified sequence number exists in the retransmission buffer;

retransmission buffer deleting means for comparing the sequence numbers of the packets stored in the retransmission buffer to the largest sequence number notified by the retransmission-request receiving means, and deleting packets from the retransmission buffer based on the comparison; and retransmission means for retransmitting all packets detected by the retransmission packet detecting means to the reception apparatus, and wherein the reception apparatus comprises:

a reception buffer for storing packets with added sequence numbers received from the transmission apparatus;

receiving means for storing the packets received from the transmission apparatus in the reception buffer, the packets being stored in the reception buffer in order of the sequence numbers;

a packet loss detecting means for detecting a lost packet;

retransmission sequence number adding means for sending an instruction to add the sequence number of the lost packet detected by the packet loss detecting means to a retransmission-request list;

retransmission-request list managing means for adding the sequence number to the retransmission-request list based on the instruction to add;

retransmission-request transmitting means for putting the sequence number stored in the retransmission-request list, in the retransmission-request packet and sending the retransmission-request packet to the transmission apparatus; and packet providing means for providing the packets in the reception buffer to the request application unit, wherein the retransmission-request transmitting means is operable to include the latest sequence number in the retransmission-request packet, the latest sequence number being the sequence number of the packet most recently received and provided to the request application unit by the reception apparatus.

4. The packet retransmission system of claim 3, the transmission apparatus including:

retransmission packet storing means for storing one of a specific packet and a packet to be retransmitted at packet loss, in the retransmission buffer, and retransmission means for retransmitting one of the specific packet and the packet to be retransmitted at packet loss, the reception apparatus including:

receiving means for receiving one of the specific packet and the packet to be retransmitted at packet loss, and storing one of the specific packet and the packet to be retransmitted at packet loss, with sorting in order of the sequence number, in the reception buffer.

5. The packet retransmission system of claim 2, 3, or 4, the reception apparatus including retransmission-request list managing means for creating a retransmission-request list which stores a sequence number of a packet currently being requested to retransmit and a sequence number of a packet to be requested retransmission at a next retransmission request time, for adding and deleting the sequence number, and for switching a status of the packet of the sequence number stored in the retransmission-request list to be a retransmission request status.

6. The packet retransmission system of claim 2, 3, or 4, the reception apparatus including:

packet loss detecting means for detecting a sequence number of a lost packet based on sequence number inconsistency of packets in the reception buffer, at packet receiving intervals depending upon a number of times of receiving packets and a receiving time, retransmission sequence number adding means for sending an instruction to add the sequence number of the lost packet detected by the packet loss detecting means into the retransmission-request list, to the retransmission-request list managing means, and retransmission-request notifying means for sending an instruction to make a status of the retransmission-request list "READY" indicating a waiting status for receiving a retransmission packet, to the retransmission-request list managing means.

7. The packet retransmission system of claim 3 or claim 4, the reception apparatus including retransmission-request transmitting means for creating one retransmission-request packet including at least one sequence number of packet to be retransmitted existing in the retransmission-request list, and transmitting the retransmission-request packet to the transmission apparatus, the transmission apparatus including:
retransmission-request receiving means for extracting the sequence number in the retransmission-request packet received from the reception apparatus and notifying the sequence number;
retransmission packet detecting means for detecting whether the packet of notified sequence number exists in the retransmission buffer;
retransmission-request responding means for putting sequence numbers of all packets detected by the retransmission packet detecting means in one retransmission-request response packet and transmitting the retransmission-request response packet to the reception apparatus; and
retransmission means for retransmitting all the packets detected by the retransmission packet detecting means to the reception apparatus.

8. The packet retransmission system of claim 3 or claim 4,
the reception apparatus including
retransmission-request transmitting means for creating a retransmission-request packet including the largest (latest) sequence number of packet provided to the request application unit by the packet providing means, and transmitting the retransmission-request packet to the transmission apparatus,
the transmission apparatus including:
retransmission-request receiving means for extracting the largest sequence number in the retransmission-request packet received from the reception apparatus and notifying the largest sequence number; and
retransmission buffer deleting means for deleting packets of sequence numbers smaller than the largest sequence number notified by the retransmission-request receiving means, from the retransmission buffer.

9. The packet retransmission system of claim 3 or claim 4,
the reception apparatus including
retransmission-request transmitting means for creating a retransmission-request packet including at least one sequence number of packet to be retransmitted existing in the retransmission-request list and the largest (latest) sequence number of packet provided to the request application unit by the packet providing means, and transmitting the retransmission-request packet to the transmission apparatus,
the transmission apparatus including:
retransmission-request receiving means for extracting the sequence number and the largest sequence number in the retransmission-request packet received from the reception apparatus, and notifying the sequence number and the largest sequence number, and
retransmission packet detecting means for detecting whether the packet of notified sequence number means exists in the retransmission buffer,
retransmission buffer deleting means for deleting packets of sequence numbers smaller than the largest sequence number notified by the retransmission-request receiving means, from the retransmission buffer;
retransmission-request responding means for putting sequence numbers of all packets detected by the retransmission packet detecting means in one retransmission-request response packet and transmitting the retransmission-request response packet to the reception apparatus; and
retransmission means for retransmitting packets detected by the retransmission packet detecting means to the reception apparatus.

10. The packet retransmission system of claim 3 or claim 4,
the reception apparatus including:
retransmission-request response receiving means for receiving a retransmission-request response packet including the sequence number of the packet to be retransmitted, from the transmission apparatus; and
retransmission sequence number deleting means for extracting the sequence number from the retransmission-request response packet, and sending an instruction to delete a same sequence number as an extracted sequence number from the retransmission-request list, to the retransmission-request list managing means.

11. The packet retransmission system of claim 3 or claim 4,
the reception apparatus including:
retransmission-request response receiving means for receiving a retransmission-request response packet including the sequence number of the packet to be retransmitted, from the transmission apparatus;
retransmission sequence number deleting means for extracting the sequence number from the retransmission-request response packet, and sending an instruction to delete a same sequence number as an extracted sequence number from the retransmission-request list, to the retransmission-request list managing means; and
retransmission-request response notifying means for sending an instruction to make a status of the retransmission-request list "ACTIVE" to the retransmission-request list managing means, where the ACTIVE indicates a status that no packet will be retransmitted from the transmission apparatus though retransmission of the packet whose sequence number is in the retransmission-request list has been requested.

12. The packet retransmission system of claim 2, 3, or 4,
the reception apparatus including:
packet providing means for providing payload (data) of at least one packet out of packets stored in the reception buffer to the request application unit,
deleting sequence numbers smaller than a sequence number of the packet, from the retransmission-request list,
providing payload of packet of next sequence number (N+1) coming after a sequence number (N being a natural number) of a packet provided last time, within a specific time, and
when the packet of next sequence number (N+1) does not exist in the reception buffer and is not inserted into the reception buffer within the specific time, notifying the request application unit of a loss of the packet to be provided.

13. The packet retransmission system of claim 8
the reception apparatus including
packet providing means, when a packet to be provided within a specific time does not exist in the reception buffer, for performing a packet loss detection and a retransmission-request transmission at least once within the specific time.

14. The packet retransmission system of claim 8
the reception apparatus including
packet providing means, when a status of the retransmission-request list is ACTIVE indicating a status that no packet will be retransmitted from the transmission apparatus though retransmission of the packet whose sequence number is in the retransmission-request list has been requested, and when a sequence number of a packet to be provided to the request application unit exists in the retransmission-request list, for judging that no packet will be retransmitted even if retransmission-request is performed, and notifying a requester, without waiting for the specific time having passed, that the packet to be provided is lost.

15. The packet retransmission system of claim 3 or claim 4, for the packet transmission between the transmission apparatus and the reception apparatus at the loss of the packet, where a general sequence number is added to each of all packets and a priority sequence number is added to one of a specific packet and a packet to be retransmitted at packet loss,
the transmission apparatus including:
retransmission packet storing means for storing one of the specific packet and the packet to be retransmitted at packet loss, in the retransmission buffer; and
retransmission means for retransmitting one of the specific packet and the packet to be retransmitted at packet loss,
the reception apparatus including
receiving means for receiving one of the specific packet and the packet to be retransmitted at packet loss, and storing one of the specific packet and the packet to be retransmitted at packet loss, with sorting in order of the general sequence number, in the reception buffer.

16. The packet retransmission system of claim 15,
the reception apparatus including
retransmission list managing means for creating a retransmission list which stores the general sequence number of packet to be retransmitted, and adding and deleting the general sequence number.

17. The packet retransmission system of claim 15,
the reception apparatus including:
retransmission sequence number deleting means, when the general sequence number of packet received by the receiving means exists in a retransmission list, for sending an instruction to delete the general sequence number from the retransmission list to retransmission list managing means;
packet loss detecting means for detecting a general sequence number of a specific packet of high priority which has been lost and the general sequence number of the packet to be retransmitted at packet loss, which has been lost, based on the general sequence number and the priority sequence number of the packet in the reception buffer and of a received packet, at packet receiving intervals depending upon a number of times of receiving packets and a receiving time and at every loss of packet of high priority found based on inconsistency of priority sequence numbers, and
retransmission sequence number adding means for sending an instruction to add the general sequence number of the specific packet of high priority whose loss is detected by the packet loss detecting means and the general sequence number of the packet to be retransmitted at packet loss, whose loss is detected by the packet loss detecting means, into the retransmission list, to the retransmission list managing means.

18. The packet retransmission system of claim 15,
the reception apparatus including
retransmission-request transmitting means for creating a retransmission-request packet including at least one general sequence number of packet existing in the retransmission list, and transmitting the retransmission-request packet to the transmission apparatus,
the transmission apparatus including:
retransmission-request receiving means for extracting the general sequence number in the retransmission-request packet received from the reception apparatus and notifying the general sequence number,
retransmission packet detecting means for detecting whether a packet of notified general sequence number exists in the retransmission buffer, and
retransmission means for retransmitting the packet of the general sequence number detected by the retransmission packet detecting means to the reception apparatus.

19. The packet retransmission system of claim 15,
the reception apparatus including
retransmission-request transmitting means for creating a retransmission-request packet including a largest (latest) general sequence number of packet provided to the request application unit by the packet providing means, and transmitting the retransmission-request packet to the transmission apparatus,
the transmission apparatus including:
retransmission-request receiving means for extracting the largest general sequence number in the retransmission-request packet received from the reception apparatus, and notifying the largest general sequence number; and
retransmission buffer deleting means for deleting packets of general sequence numbers smaller than the largest general sequence number notified by the retransmission-request receiving means, from the retransmission buffer.

20. The packet retransmission system of claim 15,
the reception apparatus including
retransmission-request transmitting means for creating a retransmission-request packet including at least one general sequence number in the retransmission list and a largest (latest) general sequence number of packet provided to the request application unit by the packet providing means, and transmitting the retransmission-request packet to the transmission apparatus,
the transmission apparatus including:
retransmission-request receiving means for extracting the general sequence number and the largest general sequence number in the retransmission-request packet received from the reception apparatus and notifying the general sequence number and the largest general sequence number,
retransmission buffer deleting means for deleting packets of general sequence numbers smaller than the largest general sequence number notified by the retransmission-request receiving means, from the retransmission buffer,
retransmission packet detecting means for detecting whether the packet of notified general sequence number exists in the retransmission buffer, and
retransmission means for retransmitting packets of the general sequence numbers detected by the retransmission packet detecting means, to the reception apparatus.

21. The packet retransmission system of claim 15, the reception apparatus including:
packet providing means for providing payload (data) of at least one packet out of packets stored in the reception buffer to the request application unit,
deleting general sequence numbers smaller than a general sequence number of the packet, from the retransmission-request list,
providing payload of packet of next general sequence number (N+1) coming after a general sequence number (N being a natural number) of a packet provided last time, within a specific time, and
when the packet of next general sequence number (N+1) does not exist in the reception buffer and is not inserted into the reception buffer within the specific time, notifying the request application unit of a loss of the packet to be provided.

22. The packet retransmission system of claim 20, the reception apparatus including
packet providing means, when a packet to be provided within a specific time does not exist in the reception buffer, for performing a packet loss detection and a retransmission-request transmission several times within the specific time.

23. The packet retransmission system of claim 20, the reception apparatus including
packet providing means, when a general sequence number of a packet to be provided does not exist in the retransmission list, for notifying the request application unit that the packet to be provided is lost, without waiting for the specific time having passed.

24. The packet retransmission system of claim 3 or claim 4,
the transmission apparatus including
priority information adding means for adding priority information to an optional packet p coming every m packets (m≦n, m and n are natural numbers), wherein the priority information is information about packets of high priority and packets to be retransmitted at a packet loss, which are located in a range of n packets from the packet p, and for deciding values of m and n depending upon a network congestion status,
the reception apparatus including
packet loss detecting means for detecting a sequence number of a packet of high priority which has been lost and a sequence number of packet to be retransmitted at packet loss which has been lost, based on a packet in the reception buffer and sequence number of a received packet and on the priority information, at packet receiving intervals depending upon a difference between sequence numbers or time stamps of received packets, and a receiving time, and at every loss of important packet found based on inconsistency of sequence numbers.

25. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the transmission apparatus including a retransmission buffer for storing one or more packets, which have been transmitted to the reception apparatus, the method comprising:
a retransmission-request receiving step of identifying the sequence number and a latest sequence number provided to the request application unit, in a retransmission-request packet received from the reception apparatus, and notifying the sequence number and the test sequence number;
a retransmission packet detecting step of detecting whether a notified sequence number exists in the retransmission buffer;
a retransmission buffer deleting step for comparing the sequence numbers of the packets stored in the retransmission buffer to the latest sequence number notified by the retransmission-request receiving step, and deleting packets from the retransmission buffer based on the comparison; and
a retransmitting step of retransmitting all packets detected by the retransmission packet detecting step to the reception apparatus.

26. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the reception apparatus including a reception buffer for storing packets with added sequence numbers received from the transmission apparatus, the method comprising:
a receiving step of storing the packet received from the transmission apparatus in the reception buffer, the packets being stored in order of the sequence numbers;
a packet loss detecting step of detecting a lost packet;
a retransmission sequence number adding step of sending an instruction to add the sequence number of the lost packet detected by the packet loss detecting step to a retransmission-request list;
a retransmission-request list managing step of adding the sequence number to the retransmission-request list based on the instruction to add;
a retransmission-request transmitting step of putting the sequence number stored in the retransmission-request list, in a retransmission-request packet and sending the retransmission-request packet to the transmission step; and
a packet providing step of providing the packet in the reception buffer to the request application unit,
wherein the retransmission-request transmitting step includes a latest sequence number in the retransmission-request packet, the latest sequence number being the sequence number of the packet most recently received and provided to the request application unit.

27. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus at a loss of the packet in packet transmission, the transmission apparatus including a retransmission buffer for storing one or more packets, which have been transmitted to the reception apparatus, the method comprising:
at the transmission apparatus,
a retransmission-request receiving step of identifying the sequence number and a latest sequence number provided to the request application unit, in a retransmission-request packet received from the reception apparatus, and notifying the sequence number and the latest sequence number;

a retransmission packet detecting step of detecting whether a notified sequence number exists in the retransmission buffer;

a retransmission buffer deleting step of comparing the sequence numbers of the packets stored in the retransmission buffer to the largest sequence number notified by the retransmission-request receiving step, and deleting packets from the retransmission buffer based on the comparison, and a retransmitting step of retransmitting all packets detected by the retransmission packet detecting step to the reception apparatus, and at the reception apparatus, which includes a reception buffer for storing packets with added sequence numbers received from the transmission apparatus, a receiving step of storing the packet received from the transmission apparatus in the reception buffer, the packets being stored in the reception buffer in order of the sequence numbers;

a packet loss detecting step of detecting a lost packet;

a retransmission sequence number adding step of sending an instruction to add the sequence number of the detected lost packet to a retransmission-request list;

a retransmission-request list managing step of adding the sequence number to the retransmission-request list based on the instruction to add;

a retransmission-request transmitting step of putting the sequence number stored in the retransmission-request list, in a retransmission-request packet and sending the retransmission-request packet to the transmission apparatus; and a packet providing step of providing the packet in the reception buffer to the request application unit, wherein the retransmission-request transmitting step includes a latest sequence number in the retransmission-request packet, the latest sequence number being the sequence number of the packet most recently received and provided to the request application unit by the reception apparatus.

28. The packet retransmission method of claim 27, the transmission apparatus including:

a retransmission packet storing step of storing one of a specific packet and a packet to be retransmitted at packet loss, in the retransmission buffer, and a retransmitting step of retransmitting one of the specific packet and the packet to be retransmitted at packet loss, the reception apparatus including:

a receiving step of receiving one of the specific packet and the packet to be retransmitted at packet loss, and storing one of the specific packet and the packet to be retransmitted at packet loss, with sorting in order of the sequence number, in the reception buffer.

29. The packet retransmission method of claim 26, 27, or 28, the reception apparatus including a retransmission-request list managing step of creating a retransmission-request list which stores a sequence number of a packet currently being requested to retransmit and a sequence number of a packet to be requested retransmission at a next retransmission request time, of adding and deleting the sequence number, and of switching a status of the packet of the sequence number stored in the retransmission-request list to be a retransmission request status.

30. The packet retransmission method of claim 26, 27, or 28, the reception apparatus including:

a packet loss detecting step of detecting a sequence number of a lost packet based on sequence number inconsistency of packets in the reception buffer, at packet receiving intervals depending upon a number of times of receiving packets and a receiving time;

a retransmission sequence number adding step of sending an instruction to add the sequence number of the lost packet detected by the packet loss detecting step into the retransmission-request list, to the retransmission-request list managing step; and a retransmission-request notifying step of sending an instruction to make a status of the retransmission-request list "READY" indicating a waiting status for receiving a retransmission packet, to the retransmission-request list managing step.

31. The packet retransmission method of claim 27 or claim 28, the reception apparatus including a retransmission-request transmitting step of creating one retransmission-request packet including at least one sequence number of packet to be retransmitted existing in the retransmission-request list, and transmitting the retransmission-request packet to the transmission apparatus, the transmission apparatus including:

a retransmission-request receiving step of extracting the sequence number in the retransmission-request packet received from the reception apparatus and notifying the sequence number;

a retransmission packet detecting step of detecting whether the packet of notified sequence number exists in the retransmission buffer;

a retransmission-request responding step of putting sequence numbers of all packets detected by the retransmission packet detecting step in one retransmission-request response packet and transmitting the retransmission-request response packet to the reception apparatus; and a retransmitting step of retransmitting all the packets detected by the retransmission packet detecting step to the reception apparatus.

32. The packet retransmission method of claim 27 or claim 28, the reception apparatus including a retransmission-request transmitting step of creating a retransmission-request packet including the largest (latest) sequence number of packet provided to the request application unit by the packet providing step, and transmitting the retransmission-request packet to the transmission apparatus, the transmission apparatus including:

a retransmission-request receiving step of extracting the largest sequence number in the retransmission-request packet received from the reception apparatus and notifying the largest sequence number; and a retransmission buffer deleting step of deleting packets of sequence numbers smaller than the largest sequence number notified by the retransmission-request receiving step, from the retransmission buffer.

33. The packet retransmission method of claim 27 or claim 28, the reception apparatus including a retransmission-request transmitting step of creating a retransmission-request packet including at least one sequence number of packet to be retransmitted existing in the retransmission-request list and the largest (latest) sequence number of packet provided to the request application unit by the packet providing step, and transmitting the retransmission-request packet to the transmission apparatus, the transmission apparatus including:
- a retransmission-request receiving step of extracting the sequence number and the largest sequence number in the retransmission-request packet received from the reception apparatus, and notifying the sequence number and the largest sequence number;
- a retransmission packet detecting step of detecting whether the packet of notified sequence number exists in the retransmission buffer;
- a retransmission buffer deleting step of deleting packets of sequence numbers smaller than the largest sequence number notified by the retransmission-request receiving step, from the retransmission buffer;
- a retransmission-request responding step of putting sequence numbers of all packets detected by the retransmission packet detecting step in one retransmission-request response packet and transmitting the retransmission-request response packet to the reception apparatus; and
- a retransmitting step of retransmitting packets detected by the retransmission packet detecting step to the reception apparatus.

34. The packet retransmission method of claim 27 or claim 28, the reception apparatus including:
- a retransmission-request response receiving step of receiving a retransmission-request response packet including the sequence number of the packet to be retransmitted, from the transmission apparatus; and
- a retransmission sequence number deleting step of extracting the sequence number from the retransmission-request response packet, and sending an instruction to delete a same sequence number as an extracted sequence number from the retransmission-request list, to the retransmission-request list managing step.

35. The packet retransmission method of claim 27 or claim 28, the reception apparatus including:
- a retransmission-request response receiving step of receiving a retransmission-request response packet including the sequence number of the packet to be retransmitted, from the transmission apparatus;
- a retransmission sequence number deleting step of extracting the sequence number from the retransmission-request response packet, and sending an instruction to delete a same sequence number as an extracted sequence number from the retransmission-request list, to the retransmission-request list managing step; and
- a retransmission-request response notifying step of sending an instruction to make a status of the retransmission-request list "ACTIVE" to the retransmission-request list managing step, where the ACTIVE indicates a status that no packet will be retransmitted from the transmission apparatus though retransmission of the packet whose sequence number is in the retransmission-request list has been requested.

36. The packet retransmission method of claim 26, 27, or 28, the reception apparatus including:
- a packet providing step of providing payload (data) of at least one packet out of packets stored in the reception buffer to the request application unit,
- deleting sequence numbers smaller than a sequence number of the packet, from the retransmission-request list,
- providing payload of packet of next sequence number (N+1) coming after a sequence number (N being a natural number) of a packet provided last time, within a specific time, and
- when the packet of next sequence number (N+1) does not exist in the reception buffer and is not inserted into the reception buffer within the specific time, notifying the request application unit of a loss of the packet to be provided.

37. The packet retransmission method of claim 32 the reception apparatus including
- a packet providing step, when the packet to be provided within a specific time does not exist in the reception buffer, of performing a packet loss detection and a retransmission-request transmission at least once within the specific time.

38. The packet retransmission method of claim 32 the reception apparatus including
- a packet providing step, when a status of the retransmission-request list is ACTIVE indicating a status that no packet will be retransmitted from the transmission apparatus though retransmission of the packet whose sequence number is in the retransmission-request list has been requested, and when a sequence number of a packet to be provided to the request application unit exists in the retransmission-request list, of judging that no packet will be retransmitted even if retransmission-request is performed, and notifying a requestor, without waiting for the specific time having passed, that the packet to be provided is lost.

39. The packet retransmission method of claim 27 or claim 28, for the packet transmission between the transmission apparatus and the reception apparatus at the loss of the packet, where a general sequence number is added to each of all packets and a priority sequence number is added to one of a specific packet and a packet to be retransmitted at packet loss, the transmission apparatus including:
- a retransmission packet storing step of storing one of the specific packet and the packet to be retransmitted at packet loss, in the retransmission buffer; and
- a retransmitting step of retransmitting one of the specific packet and the packet to be retransmitted at packet loss, the reception apparatus including
- a receiving step of receiving one of the specific packet and the packet to be retransmitted at packet loss, and storing one of the specific packet and the packet to be retransmitted at packet loss, with sorting in order of the general sequence number, in the reception buffer.

40. The packet retransmission method of claim 39, the reception apparatus including
- a retransmission list managing step of creating a retransmission list which stores the general sequence number of packet to be retransmitted, and adding and deleting the general sequence number.

41. The packet retransmission method of claim 39, the reception apparatus including:
- a retransmission sequence number deleting step, when the general sequence number of packet received by the receiving step exists in a retransmission list, of sending an instruction to delete the general sequence number from the retransmission list to retransmission list managing step;

a packet loss detecting step of detecting a general sequence number of a specific packet of high priority which has been lost and the general sequence number of the packet to be retransmitted at packet loss, which has been lost, based on the general sequence number and the priority sequence number of the packet in the reception buffer and of a received packet, at packet receiving intervals depending upon a difference between sequence numbers or time stamps of received packets, and a receiving time, and at every loss of packet of high priority found based on inconsistency of priority sequence numbers, and a retransmission sequence number adding step of sending an instruction to add the general sequence number of the specific packet of high priority whose loss is detected by the packet loss detecting step and the general sequence number of the packet to be retransmitted at packet loss, whose loss is detected by the packet loss detecting step, into the retransmission list, to the retransmission list managing step.

42. The packet retransmission method of claim 39, the reception apparatus including a retransmission-request transmitting step of creating a retransmission-request packet including at least one general sequence number of packet existing in the retransmission list, and transmitting the retransmission-request packet to the transmission apparatus, the transmission apparatus including:

a retransmission-request receiving step of extracting the general sequence number in the retransmission-request packet received from the reception apparatus and notifying the general sequence number;

a retransmission packet detecting step of detecting whether a packet of notified general sequence number exists in the retransmission buffer; and a retransmitting step of retransmitting the packet of the general sequence number detected by the retransmission packet detecting step to the reception apparatus.

43. The packet retransmission method of claim 39, the reception apparatus including a retransmission-request transmitting step of creating a retransmission-request packet including a largest (latest) general sequence number of packet provided to the request application unit by the packet providing step, and transmitting the retransmission-request packet to the transmission apparatus, the transmission apparatus including:

a retransmission-request receiving step of extracting the largest general sequence number in the retransmission-request packet received from the reception apparatus, and notifying the largest general sequence number; and a retransmission buffer deleting step of deleting packets of general sequence numbers smaller than the largest general sequence number notified by the retransmission-request receiving step, from the retransmission buffer.

44. The packet retransmission method of claim 39, the reception apparatus including:

a retransmission-request transmitting step of creating a retransmission-request packet including at least one general sequence number in the retransmission list and a largest (latest) general sequence number of packet provided to the request application unit by the packet providing step, and transmitting the retransmission-request packet to the transmission apparatus, the transmission apparatus including:

a retransmission-request receiving step of extracting the general sequence number and the largest general sequence number in the retransmission-request packet received from the reception apparatus and notifying the general sequence number and the largest general sequence number;

a retransmission buffer deleting step of deleting packets of general sequence numbers smaller than the largest general sequence number notified by the retransmission-request receiving step, from the retransmission buffer;

a retransmission packet detecting step of detecting whether the packet of notified general sequence number exists in the retransmission buffer; and a retransmitting step of retransmitting packets of the general sequence numbers detected by the retransmission packet detecting step, to the reception apparatus.

45. The packet retransmission method of claim 39, the reception apparatus including:

a packet providing step of providing payload (data) of at least one packet out of packets stored in the reception buffer to the request application unit, deleting general sequence numbers smaller than a general sequence number of the packet, from the retransmission-request list, providing payload of packet of next general sequence number (N+1) coming after a general sequence number (N being a natural number) of a packet provided last time, within a specific time, and when the packet of next general sequence number (N+1) does not exist in the reception buffer and is not inserted into the reception buffer within the specific time, notifying the request application unit of a loss of the packet to be provided.

46. The packet retransmission method of claim 44, the reception apparatus including a packet providing step, when a packet to be provided within a specific time does not exist in the reception buffer, of performing a packet loss detection and a retransmission-request transmission several times within the specific time.

47. The packet retransmission method of claim 44, the reception apparatus including a packet providing step, when a general sequence number of a packet to be provided does not exist in the retransmission list, of notifying the request application unit that the packet to be provided is lost, without waiting for the specific time having passed.

48. The packet retransmission method of claim 27 or claim 28, the transmission apparatus including a priority information adding step of adding priority information to an optional packet p coming every m packets (m≦n, m and n are natural numbers), wherein the priority information is information about packets of high priority and packets to be retransmitted at a packet loss, which are located in a range of n packets from the packet p, and for deciding values of m and n depending upon a network congestion status, the reception apparatus including a packet loss detecting step of detecting a sequence number of a packet of high priority which has been lost and a sequence number of packet to be retransmitted at packet loss which has been lost, based on a packet in the reception buffer and sequence number of a received packet and on the priority information, at packet receiving intervals depending upon a difference between sequence numbers or time stamps of received packets, and a receiving time, and at every loss of important packet found based on inconsistency of sequence numbers.

49. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the transmission apparatus comprising:
  a retransmission buffer for storing one or more packets, which have been transmitted to the reception apparatus;
  retransmission-request receiving means for identifying the sequence number and a latest sequence number provided to the request application unit, in a retransmission-request packet received from the reception apparatus, and notifying the sequence number and the latest sequence number;
  retransmission packet detecting means for detecting whether a notified sequence number exists in the retransmission buffer; and
  retransmission means for retransmitting all packets detected by the retransmission packet detecting means to the reception apparatus,
  wherein a priority status of each packet being transmitted to the reception apparatus is dependent upon whether the corresponding sequence number exists in the retransmission buffer.

50. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the reception apparatus comprising:
  a reception buffer for storing packets with added sequence numbers received from the transmission apparatus;
  receiving means for storing the packets received from the transmission apparatus in the reception buffer, the packets being stored in order of the sequence numbers;
  packet loss detecting means for detecting a lost packet;
  retransmission sequence number adding means for sending an instruction to add the sequence number of the lost packet detected by the packet loss detecting means to a retransmission-request list;
  retransmission-request list managing means for adding the sequence number to the retransmission-request list based on the instruction to add;
  retransmission-request transmitting means for putting the sequence number stored in the retransmission-request list, in a retransmission-request packet and sending the retransmission-request packet to the transmission apparatus; and
  packet providing means for providing the packet in the reception buffer to the request application unit,
  wherein, in response to receiving the retransmission-request packet, the transmission apparatus notifies the reception apparatus whether the sequence number stored in the retransmission-request list exists in the retransmission buffer, thereby indicating to the reception apparatus a priority status associated with the lost packet.

51. A packet retransmission system which includes a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus at a loss of the packet in packet transmission,
  wherein the transmission apparatus comprises:
    a retransmission buffer for storing one or more packets, which have been transmitted to the reception apparatus;
    retransmission-request receiving means for identifying the sequence number and a latest sequence number provided to the request application unit, in a retransmission-request packet received from the reception apparatus, and notifying the sequence number and the latest sequence number;
    retransmission packet detecting means for detecting whether a notified sequence number exists in the retransmission buffer; and
    retransmission means for retransmitting all packets detected by the retransmission packet detecting means to the reception apparatus, and
  wherein the reception apparatus comprises:
    a reception buffer for storing packets with added sequence numbers received from the transmission apparatus;
    receiving means for storing the packets received from the transmission apparatus in the reception buffer, the packets being stored in the reception buffer in order of the sequence number;
    a packet loss detecting means for detecting a lost packet;
    retransmission sequence number adding means for sending an instruction to add the sequence number of the lost packet detected by the packet loss detecting means to a retransmission-request list;
    retransmission-request list managing means for adding the sequence number to the retransmission-request list based on the instruction to add;
    retransmission-request transmitting means for putting the sequence number stored in the retransmission-request list, in the retransmission-request packet and sending the retransmission-request packet to the transmission apparatus; and
    packet providing means for providing the packets in the reception buffer to the request application unit,
  wherein, in response to receiving the retransmission-request packet, the transmission apparatus notifies the reception apparatus whether the sequence number stored in the retransmission-request list exists in the retransmission buffer, thereby indicating to the reception apparatus a priority status associated with the lost packet.

52. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the transmission apparatus including a retransmission buffer for storing one or more packets, which have been transmitted to the reception apparatus, the method comprising:
- a retransmission-request receiving step of identifying the sequence number and a latest sequence number provided to the request application unit, in a retransmission-request packet received from the reception apparatus, and notifying the sequence number and the latest sequence number;
- a retransmission packet detecting step of detecting whether a notified sequence number exists in the retransmission buffer; and
- a retransmitting step of retransmitting all packets detected by the retransmission packet detecting step to the reception apparatus,
- wherein a priority status of each packet being transmitted to the reception apparatus is dependent upon whether the corresponding sequence number exists in the retransmission buffer.

53. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus in response to a loss of the packet in packet transmission, the reception apparatus including a reception buffer for storing packets with added sequence numbers received from the transmission apparatus, the method comprising:
- a receiving step of storing the packet received from the transmission apparatus in the reception buffer, the packets being stored in order of the sequence numbers;
- a packet loss detecting step of detecting a lost packet;
- a retransmission sequence number adding step of sending an instruction to add the sequence number of the lost packet detected by the packet loss detecting step to a retransmission-request list;
- a retransmission-request list managing step of adding the sequence number to the retransmission-request list based on the instruction to add;
- a retransmission-request transmitting step of putting the sequence number stored in the retransmission-request list, in a retransmission-request packet and sending the retransmission-request packet to the transmission step; and
- a packet providing step of providing the packet in the reception buffer to the request application unit,
- wherein, in response to receiving the retransmission-request packet, the transmission apparatus notifies the reception apparatus whether the sequence number stored in the retransmission-request list exists in the retransmission buffer, thereby indicating to the retransmission apparatus a priority status associated with the lost packet.

54. A packet retransmission method, including a transmission apparatus for transmitting a packet with an added sequence number, a reception apparatus connected to the transmission apparatus through a network, and a request application unit connected to the reception apparatus, for retransmitting the packet with the added sequence number between the transmission apparatus and the reception apparatus at a loss of the packet in packet transmission, the transmission apparatus including a retransmission buffer for storing one or more packets, which have been transmitted to the reception apparatus, the method comprising:
- at the transmission apparatus,
  - a retransmission-request receiving step of identifying the sequence number and a latest sequence number provided to the request application unit, in a retransmission-request packet received from the reception apparatus, and notifying the sequence number and the latest sequence number;
  - a retransmission packet detecting step of detecting whether a notified sequence number exists in the retransmission buffer; and
  - a retransmitting step of retransmitting all packets detected by the retransmission packet detecting step to the reception apparatus, and
- at the reception apparatus, which includes a reception buffer for storing packets with the added sequence numbers received from the transmission apparatus,
  - a receiving step of storing the packet received from the transmission apparatus in the reception buffer, the packets being stored in the reception buffer in order of the sequence numbers;
  - a packet loss detecting step of detecting the lost packet;
  - a retransmission sequence number adding step of sending an instruction to add the sequence number of the detected lost packet to a retransmission-request list;
  - a retransmission-request list managing step of adding the sequence number to the retransmission-request list based on the instruction to add;
  - a retransmission-request transmitting step of putting the sequence number stored in the retransmission-request list, in a retransmission-request packet and sending the retransmission-request packet to the transmission apparatus; and
  - a packet providing step of providing the packet in the reception buffer to the request application unit,
- wherein, in response to receiving the retransmission-request packet, the transmission apparatus notifies the reception apparatus whether the sequence number stored in the retransmission-request list exists in the retransmission buffer, thereby indicating to the reception apparatus a priority status associated with the lost packet.

* * * * *